US008881013B2

(12) United States Patent  
Lyons et al.

(10) Patent No.: US 8,881,013 B2  
(45) Date of Patent: Nov. 4, 2014

(54) TOOL FOR TRACKING VERSIONS OF MEDIA SECTIONS IN A COMPOSITE PRESENTATION

(75) Inventors: Charles Lyons, San Francisco, CA (US); Patrick Vasta, San Francisco, CA (US); Jeff Roenning, Santa Cruz, CA (US); Lisa Diener, San Jose, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 12/688,855

(22) Filed: Jan. 15, 2010

(65) Prior Publication Data

US 2010/0281384 A1  Nov. 4, 2010

Related U.S. Application Data

(63) Continuation-in-part of application No. 12/433,875, filed on Apr. 30, 2009, and a continuation-in-part of application No. 12/551,557, filed on Aug. 31, 2009.

(60) Provisional application No. 61/174,490, filed on Apr. 30, 2009, provisional application No. 61/227,070, filed on Jul. 20, 2009, provisional application No. 61/174,491, filed on Apr. 30, 2009.

(51) Int. Cl.
*G06F 3/00* (2006.01)
*G06F 3/048* (2013.01)
*G11B 27/34* (2006.01)
*G11B 27/034* (2006.01)

(52) U.S. Cl.
CPC ............... *G06F 3/048* (2013.01); *G11B 27/34* (2013.01); *G11B 27/034* (2013.01)
USPC ............ 715/723; 715/720; 715/229; 715/784

(58) Field of Classification Search
CPC ....... G11B 27/34; G11B 27/034; G06F 3/048
USPC .......................................... 715/720, 723, 229
See application file for complete search history.

(56) References Cited

U.S. PATENT DOCUMENTS 5,307,456 A   4/1994  MacKay
5,467,288 A   11/1995 Fasciano et al.

(Continued)

FOREIGN PATENT DOCUMENTS

WO   WO 2007/120694   10/2007
WO   WO 2009/122213   10/2009

(Continued)

OTHER PUBLICATIONS

Kung et al., "Tortoise SVN: A Subversion client for Windows: Version 1.4.4", Nov. 22, 2006, downloaded from http://code.google.com/p/rpg-framework/downloads/list on Feb. 29, 2009, pp. xi, 13, 33-35, 49-51, 53-56.*

(Continued)

*Primary Examiner* — Kieu Vu
*Assistant Examiner* — Aaron Lowenberger
(74) *Attorney, Agent, or Firm* — Adeli LLP

(57) ABSTRACT

A computer readable medium storing a media editing application for creating media presentations is described. The application includes a graphical user interface (GUI). The GUI has (1) a composite display area for displaying graphical representations of a set of media clips that are part of the composite presentation, (2) a navigation tool including several selectable navigation markers associated with several navigable locations in the composite presentation, and (3) a version management feature for (a) indicating whether each location has been modified, (b) providing an option to create a new version of each location, and (c) providing access to previously-saved versions of each location.

29 Claims, 37 Drawing Sheets

(56) References Cited

U.S. PATENT DOCUMENTS

| | | |
|---|---|---|
| 5,519,828 A | 5/1996 | Rayner |
| 5,659,539 A | 8/1997 | Porter et al. |
| 5,659,792 A | 8/1997 | Walmsley |
| 5,659,793 A | 8/1997 | Escobar et al. |
| 5,664,216 A | 9/1997 | Blumenau |
| 5,682,326 A | 10/1997 | Klingler et al. |
| 5,760,767 A | 6/1998 | Shore et al. |
| 5,781,188 A | 7/1998 | Amiot et al. |
| 5,826,102 A | 10/1998 | Escobar et al. |
| 5,861,886 A | 1/1999 | Moran et al. |
| 5,930,446 A | 7/1999 | Kanda |
| 5,999,173 A | 12/1999 | Ubillos |
| 6,134,380 A | 10/2000 | Kushizaki |
| 6,154,600 A | 11/2000 | Newman et al. |
| 6,154,601 A | 11/2000 | Yaegashi et al. |
| 6,161,115 A | 12/2000 | Ohanian |
| 6,204,840 B1 | 3/2001 | Petelycky et al. |
| 6,324,335 B1 | 11/2001 | Kanda |
| 6,400,378 B1 | 6/2002 | Snook |
| 6,414,686 B1 | 7/2002 | Protheroe et al. |
| 6,477,315 B1 | 11/2002 | Ohomori |
| 6,486,896 B1 | 11/2002 | Ubillos |
| 6,539,163 B1 | 3/2003 | Sheasby et al. |
| 6,546,188 B1 | 4/2003 | Ishii et al. |
| 6,628,303 B1 | 9/2003 | Foreman et al. |
| 6,650,826 B1 | 11/2003 | Hatta |
| 6,658,194 B1 | 12/2003 | Omori |
| 6,674,955 B2 | 1/2004 | Matsui et al. |
| 6,714,216 B2 | 3/2004 | Abe |
| 6,744,968 B1 | 6/2004 | Imai et al. |
| 7,043,137 B2 | 5/2006 | Slone |
| 7,073,127 B2 | 7/2006 | Zhao et al. |
| 7,155,676 B2 | 12/2006 | Land et al. |
| 7,225,405 B1 | 5/2007 | Barrus et al. |
| 7,313,755 B2 | 12/2007 | Rahman et al. |
| 7,325,199 B1 | 1/2008 | Reid et al. |
| 7,356,242 B2 | 4/2008 | Nagasawa |
| 7,362,946 B1 | 4/2008 | Kowald |
| 7,383,508 B2 | 6/2008 | Toyama et al. |
| 7,432,940 B2 | 10/2008 | Brook et al. |
| 7,444,593 B1 | 10/2008 | Reid |
| 7,480,864 B2 | 1/2009 | Brook et al. |
| 7,561,160 B2 | 7/2009 | Fukuya |
| 7,614,012 B1 | 11/2009 | Dulaney |
| 7,623,755 B2 | 11/2009 | Kuspa |
| 7,640,501 B2 | 12/2009 | Suzuki et al. |
| 7,720,349 B2 | 5/2010 | Ogikubo |
| 7,788,592 B2 | 8/2010 | Williams et al. |
| 7,805,678 B1 | 9/2010 | Niles |
| 7,882,258 B1 | 2/2011 | Sumler et al. |
| 7,889,975 B2 | 2/2011 | Slone |
| 8,522,144 B2 | 8/2013 | Lyons et al. |
| 8,549,404 B2 | 10/2013 | Swenson et al. |
| 8,555,169 B2 | 10/2013 | Pendergast et al. |
| 8,701,007 B2 | 4/2014 | Meaney et al. |
| 2001/0020953 A1 | 9/2001 | Moriwake et al. |
| 2001/0036356 A1 | 11/2001 | Weaver et al. |
| 2002/0023103 A1 | 2/2002 | Gagne |
| 2002/0154140 A1 | 10/2002 | Tazaki |
| 2002/0154156 A1 | 10/2002 | Moriwake et al. |
| 2002/0156805 A1 | 10/2002 | Schriever et al. |
| 2002/0175917 A1 | 11/2002 | Chakravarty et al. |
| 2002/0188628 A1 | 12/2002 | Cooper et al. |
| 2003/0001880 A1 | 1/2003 | Holtz et al. |
| 2003/0002851 A1* | 1/2003 | Hsiao et al. ................ 386/52 |
| 2003/0016254 A1 | 1/2003 | Abe |
| 2003/0018609 A1 | 1/2003 | Phillips et al. |
| 2003/0090504 A1 | 5/2003 | Brook et al. |
| 2003/0117431 A1 | 6/2003 | Moriwake et al. |
| 2003/0234803 A1 | 12/2003 | Toyama et al. |
| 2004/0001079 A1 | 1/2004 | Zhao et al. |
| 2004/0056883 A1 | 3/2004 | Wierowski |
| 2004/0071441 A1 | 4/2004 | Foreman et al. |
| 2004/0078761 A1 | 4/2004 | Ohanian |
| 2004/0085354 A1* | 5/2004 | Massand .................. 345/751 |
| 2004/0151469 A1 | 8/2004 | Engholm et al. |
| 2004/0199395 A1 | 10/2004 | Schulz |
| 2004/0201609 A1 | 10/2004 | Obrador |
| 2004/0268224 A1 | 12/2004 | Balkus et al. |
| 2005/0108253 A1* | 5/2005 | Metsatahti et al. .......... 707/100 |
| 2005/0132293 A1 | 6/2005 | Herberger et al. |
| 2005/0257152 A1* | 11/2005 | Shimizu et al. ............. 715/723 |
| 2006/0008247 A1 | 1/2006 | Minami et al. |
| 2006/0059426 A1 | 3/2006 | Ogikubo |
| 2006/0064434 A1* | 3/2006 | Gilbert et al. ............. 707/104.1 |
| 2006/0101064 A1* | 5/2006 | Strong et al. ................ 707/102 |
| 2006/0156246 A1 | 7/2006 | Williams et al. |
| 2006/0233514 A1 | 10/2006 | Weng et al. |
| 2006/0265657 A1 | 11/2006 | Gilley |
| 2006/0277454 A1 | 12/2006 | Chen |
| 2007/0089152 A1 | 4/2007 | Patten et al. |
| 2007/0189708 A1 | 8/2007 | Lerman et al. |
| 2007/0245238 A1 | 10/2007 | Fugitt et al. |
| 2007/0262995 A1 | 11/2007 | Tran |
| 2008/0010585 A1 | 1/2008 | Schneider et al. |
| 2008/0034013 A1 | 2/2008 | Cisler et al. |
| 2008/0034039 A1* | 2/2008 | Cisler et al. ................ 709/204 |
| 2008/0034307 A1* | 2/2008 | Cisler et al. ................ 715/764 |
| 2008/0044155 A1 | 2/2008 | Kuspa |
| 2008/0111822 A1 | 5/2008 | Horowitz et al. |
| 2008/0120550 A1 | 5/2008 | Oakley et al. |
| 2008/0152297 A1 | 6/2008 | Ubillos |
| 2008/0152298 A1 | 6/2008 | Ubillos |
| 2008/0155420 A1 | 6/2008 | Ubillos et al. |
| 2008/0155421 A1 | 6/2008 | Ubillos et al. |
| 2008/0215983 A1 | 9/2008 | Wierowski et al. |
| 2008/0253735 A1 | 10/2008 | Kuspa et al. |
| 2009/0094039 A1 | 4/2009 | MacDonald et al. |
| 2009/0131177 A1 | 5/2009 | Pearce |
| 2009/0172543 A1 | 7/2009 | Cronin et al. |
| 2009/0196570 A1 | 8/2009 | Dudas et al. |
| 2009/0199251 A1 | 8/2009 | Badoiu et al. |
| 2009/0201316 A1 | 8/2009 | Bhatt et al. |
| 2010/0035682 A1 | 2/2010 | Gentile et al. |
| 2010/0049699 A1 | 2/2010 | Benschoter et al. |
| 2010/0281375 A1 | 11/2010 | Pendergast et al. |
| 2010/0281376 A1 | 11/2010 | Meaney et al. |
| 2011/0103772 A1 | 5/2011 | Suzuki |
| 2014/0059436 A1 | 2/2014 | Swenson et al. |

FOREIGN PATENT DOCUMENTS

| | | |
|---|---|---|
| WO | WO 2009/128227 | 10/2009 |
| WO | WO 2010/106586 | 9/2010 |

OTHER PUBLICATIONS

Chisan, James, et al., "Video Bench—Final Report: SEng 480a/CSc 586a," Apr. 11, 2003, University of Victoria.
Author Unknown, "Adobe Director 11: User Guide," Month Unknown, 2008, 498 pages, Adobe Systems Incorporated, San Jose, California, USA.
Author Unknown, "Adobe Premiere Pro CS4 Classroom in a Book," Dec. 17, 2008, 17 pages, Adobe Press.
Author Unknown, "Apple Announces Final Cut Pro 4," NAB, Apr. 6, 2003, pp. 1-3, Apple Inc., Las Vegas, Nevada, USA.
Author Unknown, "Adobe Premiere Pro CS3: User Guide," Apr. 1, 2008, 455 pages, Adobe Systems Incorporated, San Jose, California, USA.
Author Unknown, "FoxArc Movie Editor: Version 1.3.4," Sep. 21, 2009, 5 pages, FoxArc Software Technologies.
Author Unknown, "iMovie '08 Getting Started," Month Unknown, 2008, pp. 1-50, Apple Inc., USA.
Author Unknown, "Using Adobe Premiere Elements 8 Editor," Last Updated Aug. 12, 2010, 313 pages, Adobe Systems Incorporated, San Jose, California, USA.
Author Unknown, "Using Adobe Flash CS4 Professional," updated Mar. 5, 2009, 474 pages, Adobe Systems Incorporated, San Jose, California, USA.
Brenneis, Lisa, "Final Cut Pro 3 for Macintosh: Visual QuickPro Guide," Apr. 2002, 288 pages, Peachpit Press, Berkeley, California, USA.

(56) References Cited

OTHER PUBLICATIONS

Author Unknown, "Apple Aperture 3," Month Unknown, 2007, pp. 1-7, USA.
Author Unknown, "Using Adobe Premiere Elements 8 Editor," Month Unknown, 2009, 313 pages, Adobe Systems Incorporated, San Jose, California, USA.
Bennett, Eric P., et al., "Proscenium: A Framework for Spatio-Temporal Video Editing," Proceedings of ACM Multimedia, Nov. 2-8, 2003, 8 pages, Berkeley, CA.
Casares, Juan, et al., "Simplifying Video Editing Using Metadata," Proceedings of Designing Interactive Systems (DIS 2002), Jun. 2002, pp. 157-166, London, United Kingdom.
Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.
Wang, Yijin, et al., "My Videos—A System for Home Video Management", Proceedings of the 10th ACM International Conference on Multimedia, Dec. 1-6, 2002, pp. 412-413, Juan-les-Pins, France.

\* cited by examiner

TOOL FOR TRACKING VERSIONS OF MEDIA SECTIONS IN A COMPOSITE PRESENTATION

CLAIM OF BENEFIT TO PRIOR APPLICATIONS

This application claims benefit to U.S. Provisional Patent Application No. 61/174,490 entitled "Media Clip Auditioning Used to Evaluate Uncommitted Media Content", filed Apr. 30, 2009. This application also claims benefit to U.S. Provisional Patent Application No. 61/227,070 entitled "Segmented Timeline for a Media-Editing Application", filed Jul. 20, 2009. In addition, this application is a Continuation in Part of U.S. Non-provisional patent application Ser. No. 12/433,875 entitled "Navigation Tool for Video Presentations", filed on Apr. 30, 2009, now published as U.S. Patent Publication 2010/0281371. This application is also a Continuation in Part of U.S. Non-provisional patent application Ser. No. 12/551,557 entitled "Graphical User Interface for a Media-Editing Application With a Segmented Timeline", filed on Aug. 31, 2009, now issued as U.S. Pat. No. 8,769,421. U.S. Non-provisional patent application Ser. No. 12/551,557 claims the benefit of U.S. Provisional Patent Application No. 61/174,490 entitled "Media Clip Auditioning Used to Evaluate Uncommitted Media Content", filed Apr. 30, 2009, U.S. Provisional Patent Application No. 61/174,491 entitled "Editing Key-Indexed Graphs in Media Editing Applications", filed Apr. 30, 2009, and U.S. Provisional Patent Application No. 61/227,070 entitled "Segmented Timeline for a Media-Editing Application", filed Jul. 20, 2009.

CROSS REFERENCE TO RELATED APPLICATIONS

This Application is related to the following application: U.S. patent application Ser. No. 12/688,857, filed Jan. 15, 2010, now issued as U.S. Pat. No. 8,359,537.

BACKGROUND

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media content editing application. In so doing, the computer generates a graphical interface whereby designers digitally manipulate graphical representations of the media content to produce a desired result.

One difficulty in media editing is that a user cannot easily navigate to different locations within a media project. At any given time, the user may wish to quickly scroll to a different location along timeline and/or adjust the view of the timeline such that a particular region is visible (e.g., by adjusting a zoom control). In addition, a user may wish to insert various media clips or other content at a particular location within a media project without first having to manually navigate to the particular location by, for example, scrolling and zooming to a particular region along a timeline.

Furthermore, large media projects may include multiple clips, sections, parts, or other components that may be created, modified, reviewed, or accessed by various users. Such users may wish to control collaboration with respect to these project components such that the media project reflects the latest intention of the users.

Thus, there is a need for a media editing application that allows a user to easily and automatically navigate to various sections of a media project. In addition, there is a need for a media editing application that allows a user to manage and control versions of project components, while collaborating with others on a project.

BRIEF SUMMARY

For a media editing application that creates composite presentations, some embodiments of the invention provide a novel navigation tool that allows a user to navigate the representation of the composite presentation in order to view and edit the compositing of several media clips. The media editing application of some embodiments includes a composite display area (e.g., an area with multiple tracks that span a timeline) for displaying a graphical representation of a composite presentation. The graphical representation of the composite presentation is formed in some embodiments by graphical representations of the media clips that form a composite presentation. In some embodiments, the composite display area at times cannot display or cannot usefully display the entirety of the composite presentation due to the size and/or number of media clip representations that are included in the composite display area.

In some embodiments, the application's navigation tool includes several selectable navigation markers that are associated with several navigable locations in the composite presentation that is represented in the composite display area. When a navigation marker is selected, the composite display area presents the navigable location that is associated with the selected navigation marker. In this manner, the navigation tool allows a user to navigate through a large number of media clips that cannot be viewed in the composite display area even though they are part of the composite presentation, because they have scrolled off the finite display space provided by the composite display area.

In some embodiments, each navigable location corresponds to a fixed location in the composite presentation, or to a location of a media clip or a set of associated media clips in the composite display area. For instance, in some embodiments, the composite presentation in the composite display area spans a timeline. In some such embodiments, the navigable locations are instances along the timeline, where these instances are fixed locations along the timeline or temporal locations of media clips along the timeline. In some embodiments, the navigation markers are associated with the media clips in the composite display area, and in turn through this association, are associated with the locations in the composite presentation as the media clips have specified locations in the presentation. In other embodiments, the navigable locations are associated with sections along the timeline that may be of uniform or variable duration.

Different embodiments use different types of navigation markers. For instance, in some embodiments, the navigation markers are textual, graphical, or some other type of marker (e.g., prominent colors in a clip when the marker is small and compressed) from which a user can infer a corresponding location in the composite presentation. In some of these embodiments, the navigation markers are thumbnail images of the media clips in the composite presentation. For instance, in some of the embodiments that have fixed locations in the composite presentation as navigable locations, the thumbnail images are images of the media clips (e.g., frames of video clips, cover art of audio clips, etc.) that are at or near the fixed locations. Alternatively, for some of the embodiments that define each navigable location as the location of a media clip or a set of associated media clips, the thumbnail images are images of the media clips associated with the navigable locations. As another alternative, for some embodiments that define each navigable location as the location of a defined section along the timeline, the thumbnail images are images of media clips that are included in (or near) the defined sections.

For the embodiments that generate thumbnail images of media clips that are part of a composite presentation, different techniques can be used to generate the thumbnail images. For instance, when generating a thumbnail image for a particular video clip or set of video clips, some embodiments initially identify a representative video frame for the clip or set of clips, and then generate a thumbnail image from the identified frame. Different embodiments identify the representative video frame for a clip or set of clips differently. For example, some embodiments identify the frame based on location within the clip, based on an analysis of the clip, etc.

In some embodiments, the navigation tool and its associated navigation markers are placed within or adjacent to the composite display area, and span along the composite display area in a direction along which media clips are arranged in the composite display area. For instance, in some embodiments, the navigation markers are arranged in at least one row that spans along the composite display area in the direction of the timeline along which media clips are arranged. In some of these embodiments, the navigation markers are arranged in the same order as their associated locations within the composite display area. In this manner, each navigation marker of the navigation tool represents a relative location within the composite presentation representation in the composite display area. For instance, a first marker that is to the left of a second marker in the navigation tool corresponds to a location in the composite display area that is earlier than a location corresponding to the second marker.

Some embodiments present all the navigation markers in one display area simultaneously. Other embodiments allow the navigation markers to scroll through the navigation tool's display area. Some embodiments also provide zoom controls to adjust the size of the navigation markers that are displayed in the tool's display area. The navigation tool of some embodiments also includes a highlighting feature that highlights and/or enlarges each navigation marker as the marker becomes a candidate for selection by a user (e.g., as a cursor pans across the marker while the user is moving the cursor to a marker to select).

The navigation tool of some embodiments also includes selectable controls for navigating backward and forward through a stored navigation history of previously selected navigation markers or navigable locations. In some embodiments, each selectable control may cause a list of previously selected navigation markers or navigable locations to be displayed, from which a selection of a particular navigation marker or navigable location may be made.

The navigation tool of some embodiments further includes an insertion feature for placing multimedia items in the composite display area for inclusion in a media presentation. For instance, in some embodiments, the media editing application includes a media library for displaying a set of selectable representations that corresponds to a set of multimedia items that are available for placement in a media presentation. In some embodiments, a user can select a particular selectable representation from the media library and move it over a particular navigation marker of the navigation tool in order to cause the composite display area to display a particular navigable location that corresponds to the particular navigation marker. The user can then place the selectable graphical representation within the composite display area in the vicinity of the particular navigable location, in order to include the multimedia item corresponding to the particular selectable graphical representation in the media presentation.

The media editing application of some embodiments also includes a version management feature that allows a user to create and store multiple different composite-presentation part versions (referred to below as "versions") for a section of the composite presentation. The version management feature of some embodiments is capable of (1) indicating whether any section of the media presentation has been modified since a previous version of that section was created, (2) saving a new version or deleting an existing version of any section, (3) displaying and accessing previously-saved versions of any section, (4) selecting among previously-saved versions for each section, (5) managing the presentation of available versions (e.g., by allowing re-naming, re-ordering, etc. of versions), (6) retrieving information regarding each version (e.g., date saved, source version, etc.), and (7) allowing collaboration among multiple users of the media editing application. A section of a composite presentation may include a set of one or more media items, a particular range along the timeline, etc. For a section, different versions may differ in the media clips used to define each version, the attributes of the media clips (e.g., the number, temporal locations, the in- and out-frames for the clips, etc.), the types of operations performed on the media clips, etc.

In some embodiments, the version management feature operates in conjunction with the navigation tool. For instance, in some such embodiments, each section is associated with a particular navigation marker. Other embodiment employ the version management feature without employing the navigation tool, or without employing it in conjunction with the navigation tool (i.e., they employ both tools but do not interrelate the operation of the two tools in any manner). In some embodiments, the version management feature indicates which sections of the composite display area have been modified since the last version of each section was saved. Different embodiments use different types of visual indicators. For instance, in some embodiments, the visual indicators are textual, graphical, or some other type of marker from which a user can determine whether a section has been modified. In some embodiments, the visual indicators are placed at or near the navigation markers of the navigation tool (e.g., a colored line or other indication is placed under the navigation markers that correspond to modified sections).

Previously-saved versions may be accessed using the version management feature of some embodiments. For instance, some embodiments display a selectable version option for each section of the composite presentation using the selectable navigation markers of the navigation tool (e.g., by providing a drop-down menu associated with each navigation marker). When a particular selection option is chosen for a particular section of the composite presentation, the composite display area presents one or more versions that have been previously specified for the particular section, in order to allow a user to select among one of these versions for the particular section. If the user then selects a previously defined version that differs from the currently version that is currently in the composite display area for the particular section, the media editing application swaps out the current version with the previously defined version that the user selects.

Some embodiments include a version display area for simultaneously displaying the available versions for a number of sections of the composite presentation. In some embodiments, the version display area includes several sets of selectable version markers, where each set is associated with a particular section of the composite presentation. The version display area of some embodiments displays each set of selectable version markers as a column of thumbnail images. In some embodiments, each column is displayed under the navigation marker that is associated with the particular section. When a version marker is selected for a section, the composite display area presents the version of the section that is associated with the selected version marker, in place of any other version that was previously being displayed in the composite display area for the section. In this manner, the version display area allows a user to view and select among a large number of versions.

The available versions for a section may be displayed as a first in/last out stack in some embodiments, such that the most recently accessed version is displayed at the top of the stack. Alternatively, some embodiments may list the available versions chronologically (e.g., sorted by creation date), arranged according to user preference, or using some other appropriate sorting criteria. In addition, some embodiments display a currently-selected version for each section of the composite presentation (e.g., by modifying the selectable navigation marker of the navigation tool to indicate which version is currently selected, providing a textual indication, etc.).

The version management feature of some embodiments also allows a user to create new versions (e.g., by selecting a pop-up menu option, responding to a prompt, etc.) and delete unwanted versions (e.g., through one or more keystroke commands, through a drag operation that removes a version from the version display area, etc.). Deleted versions are not displayed by the version management feature of some embodiments. However, in some embodiments, the deleted versions may be restored at a later time.

Some embodiments provide a collaboration feature that allows multiple editors to simultaneously work on different sections of the composite presentation. For instance, some embodiments implement the collaboration feature in conjunction with the version management feature. In some such embodiments, the version management feature allows one user to check out one or more versions associated with one or more sections for review, approval, and/or modification, while another user is working on other versions of other sections of a composite presentation. The checked-out versions may be locked in some embodiments such that they cannot be modified until check-in. The checked-out versions may be indicated in various ways (e.g., by placing a graphical indicator at each selectable navigation marker corresponding to a version that is currently checked-out). In addition, some embodiments indicate when a checked-out version has been returned by a collaborator (e.g., by changing the color of the graphical indicator used to show the version was previously checked-out). A user may then check in the returned version such that the version is unlocked. In some embodiments, a new version is created when the returned version is checked in.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a media editing application that creates composite presentations, some embodiments of the invention provide a novel navigation tool that allows a user to navigate the representation of the composite presentation in order to view and edit the compositing of several media clips. A media clip is a graphical representation of a piece of media content that is stored on the computing device on which the media editing application executes, or on a computing device to which the media editing application has access. Examples of such content include audio data, video data, text data, pictures, and/or other media data. Accordingly, media clips are any kind of content clip (audio clip, video clip, text clip, picture clip, or other media clip) that can be used to create a composite presentation.

Figure 1:
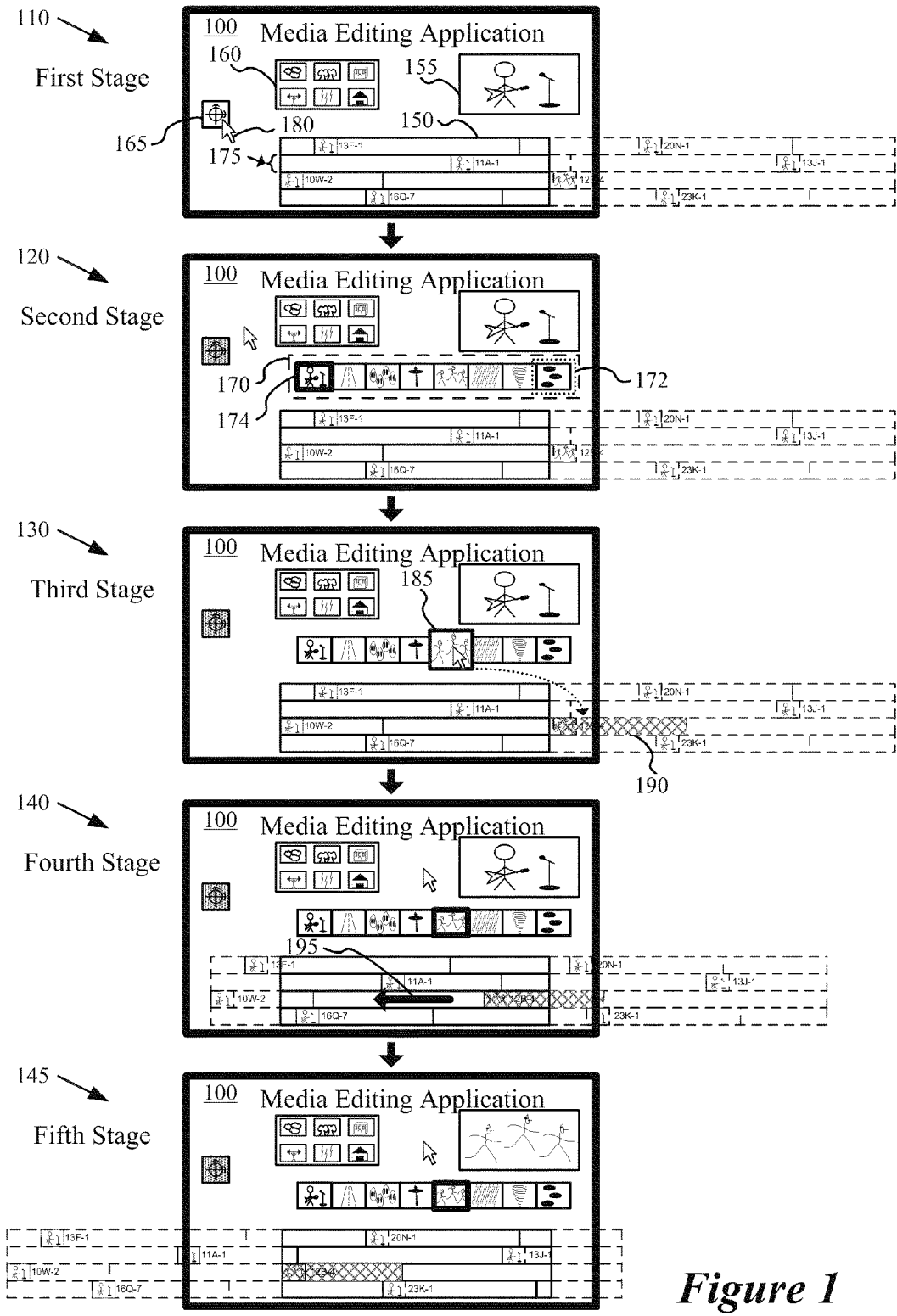
FIG. 1 illustrates a graphical user interface ("GUI") of a media editing application with a navigation tool of some embodiments and the use of the tool to navigate to a desired location in a composite project.

For some embodiments of the invention, FIG. 1 illustrates a graphical user interface ("GUI") 100 of a media editing application with such a navigation tool. Specifically, this figure illustrates the GUI 100 at five different stages 110, 120, 130, 140, and 145 that show how the navigation tool can be used to navigate a composite presentation in some embodiments. Each of these stages will be described in more detail below after an introduction of the elements of GUI 100.

As shown in FIG. 1, the GUI 100 includes a composite display area 150, a preview display area 155, a media library 160, a navigation tool activation GUI item 165, a navigation tool 170, and one or more tracks (e.g., track 175) in the composite display area. The composite display area 150 includes multiple tracks that span a timeline and displays a graphical representation of the composite presentation (also called a "composite representation") by displaying media clips that form the composite presentation. The preview display area 155 displays a preview of a composite presentation that the application creates by compositing several media clips. The media library 160 is an area in the GUI 100 through which the application's user can select media clips to add to a presentation that the user is compositing with the application. As shown, media clips may be displayed with different appearances in different areas of the GUI 100. For instance, the media clips in the media library 160 in this example are represented using thumbnail view (i.e., represented using a set equally-sized images), while the media clips in the composite display area are represented using a clip view (i.e., represented using a set of rectangular representations where the length of the rectangle provides a visual indicator of the length of the associated clip).

The navigation tool activation item 165 is a conceptual illustration of one or more user interface ("UI") items that allow the navigation tool 170 to be invoked. Different embodiments of the invention implement this UI item differently. Some embodiments implement it as a UI button, others as an option that can be selected in a pull-down or drop-down menu, and still others as a command that can be invoked through one or more keystroke operations. Yet other embodiments allow the user to invoke the navigation tool through two or more of such UI implementations or other UI implementations. In some embodiments, the media editing application displays the navigation tool 170 once it is invoked through the activation item 165.

In the example of FIG. 1, the application's navigation tool 170 includes several selectable navigation markers (e.g., marker 172) that are associated with several navigable locations in the composite representation that is displayed in the composite display area. When a navigation marker is selected, the composite display area presents the navigable location that is associated with the selected navigation marker. In this manner, the navigation tool allows a user to navigate through a large number of media clips that cannot be viewed in the composite display area even though they are part of the composite representation, because they have scrolled off the finite display space provided by the composite display area.

In some embodiments, each navigable location corresponds to a fixed location in the composite representation, or to a location of a media clip or a set of associated media clips in the composite display area. For instance, in the example of FIG. 1, the composite representation in the composite display area spans a timeline. In some such embodiments, the navigable locations are instances along the timeline, where these instances are fixed locations along the timeline or temporal locations of media clips along the timeline. In some embodiments, the navigation markers are associated with the media clips in the composite display area, and in turn through this association, are associated with the locations in the composite representation as the media clips have specified locations in the composite representation. In other embodiments, the navigable locations are associated with sections along the timeline that may be of uniform or variable duration.

Different embodiments use different types of navigation markers. For instance, in some embodiments, the navigation markers are textual, graphical, or some other type of marker (e.g., prominent colors in a clip when the marker is small and compressed) from which a user can infer a corresponding location in the composite representation. In the example of FIG. 1, the navigation markers are thumbnail images of the media clips in the composite presentation. In some of the embodiments that have fixed locations in the composite representation as navigable locations, the thumbnail images are images of the media clips (e.g., thumbnail images of frames of video clips, cover art of audio clips, etc.) that are at or near the fixed locations. Alternatively, for some of the embodiments that define each navigable location as the location of a media clip or a set of associated media clips, the thumbnail images are images of the media clips associated with the navigable locations. As another alternative, for some embodiments that define each navigable location as the location of a defined section along the timeline, the thumbnail images are images of media clips that are included in (or near) the defined sections.

For the embodiments that generate thumbnail images of media clips that are part of a composite presentation, different techniques can be used to generate the thumbnail images. For instance, when generating a thumbnail image for a particular video clip or set of video clips, some embodiments initially identify a representative video frame for the clip or set of clips, and then generate a thumbnail image from the identified frame. Different embodiments identify the representative video frame for a clip or set of clips differently. For example, some embodiments identify the frame based on location within the clip, based on an analysis of the clip, etc.

In the example illustrated in FIG. 1, the navigation tool 170 and its associated navigation markers 172 are placed in one row that is adjacent to the composite display area and spans along the composite display area in a direction along which media clips are arranged in the composite display area. Other embodiments arrange the navigation tool and its markers differently. For instance, some embodiments place this tool and its markers in one row in the composite display area, or in more than one row adjacent or within the composite display area.

Also, in the example illustrated in FIG. 1, the media editing application presents all the navigation markers in one display area simultaneously. Other embodiments allow the navigation markers to scroll through the navigation tool's display area. Some embodiments also provide zoom controls to adjust the size of the navigation markers that are displayed in the tool's display area. The navigation tool 170 also includes a highlighting feature that highlights and/or enlarges each navigation marker 172 as the marker becomes a candidate for selection by a user (e.g., as a cursor pans across the marker while the user is moving the cursor to a marker to select).

The navigation markers 172 are arranged in the same order as their associated locations within the composite display area. In this manner, each navigation marker 172 of the navigation tool 170 represents a relative location within the composite representation in the composite display area. For instance, a first marker that is to the left of a second marker in the navigation tool corresponds to a location in the composite display area that is earlier than a location corresponding to the second marker.

The operation of the GUI 100 will now be described by reference to the state of this GUI during the five stages 110, 120, 130, 140, and 145 that are illustrated in FIG. 1. In the first stage 110, the composite display area 150 displays a composite representation that includes several clips that span along a timeline (not shown). A user might have added these clips to the composite representation in a current editing session or by opening a composite project (alternatively referred to as a "project") that was defined in a previous editing session. In the first stage 110, the navigation tool has not yet been activated.

The second stage 120 displays GUI 100 after the navigation tool 170 has been activated upon the selection of the navigation activation item 165 (e.g., through a cursor click operation). This stage 120 illustrates this activation by changing the appearance of GUI item 165 and by displaying the navigation tool 170 above the composite display area 150. Other embodiments might indicate the activation of the navigation tool without any change in appearance of any UI items or by changing the appearance of other UI items. For instance, in some embodiments where the GUI item 165 is implemented as a command that is invoked through one or more keystrokes (or a selection from a drop-down menu, etc.), the activation of the navigation tool is only indicated by the appearance of the navigation tool above the composite display area. As mentioned above, the navigation tool may have a different look or may be placed in a different location with respect to the composite display area in other embodiments.

In this example, a navigation marker 174 has been shown with a thicker border to indicate that the navigation marker corresponds to the location shown in the composite display area. Different embodiments may indicate such a navigation maker in different ways or not at all. By differentiating the navigation marker that corresponds to the currently displayed location (if any), the navigation tool provides, at startup, an indication of the location displayed in the composite display area.

When the navigation tool is invoked in the second stage 120, the composite display area 150 displays the composite representation at a particular zoom level that allows only a portion of the composite representation to appear within the display area 150. The remainder of the composite representation is outside of the display area 150. FIG. 1 uses dashed lines to illustrate portions of the composite representation that fall outside of the display area 150.

In the third stage 130, a user moves a cursor 180 to a location over the navigation tool. As shown, this action has caused a selectable navigation marker 185 to be enlarged and highlighted, in order to highlight this marker and to indicate that it is a candidate for selection by the user. In this example, the navigation marker corresponds to a particular clip 190 in the composite representation. The particular clip 190 is highlighted with a cross-hatch pattern. This highlighting is not performed by the media editing application but rather is presented in FIG. 1 in order to identify this clip 190 in this figure. The clip 190 is completely outside of the composite display area in the third stage 130.

The fourth stage 140 illustrates the GUI 100 after the user has selected the navigation marker 185 (e.g., by clicking on this marker). This selection causes the composite representation to scroll through the composite display area 150 in order to cause the particular clip 190 to appear in the display area 150. The fourth stage 140 illustrates an arrow 195 to indicate that the scrolling is in midstream, i.e., it is before the clip 190 has reached its final location in response to the selection of the marker 185.

The fifth stage 145 shows the GUI 100 after the clip 190 has reached its final destination after the selection of the marker 185. The selected clip is now visible in the composite display area. In this example, the clip has been positioned at the far left of the composite display area, however different embodiments may position the selected location at different places within the composite display area (e.g., at an offset from the far left, at a location selected by a user, etc.).

In the fifth stage 145, the clip 190 is fully visible in the composite display area along with other clips that neighbor it. Some embodiments automatically perform zoom adjustments (adjustments without direct user input) to adjust the zoom level in the composite display area so that a desired number of neighboring clips (or desired neighboring ranges along the timeline) are presented along with the clip that is brought up in response to a navigation selection through the tool 170. In some embodiments, the desired number of neighboring clips and the location of the retrieved clip in the composite display area can be specified by a user through preference settings of the media editing application.

In some embodiments, the navigation tool includes selectable controls for navigating backward and forward through a stored navigation history of previously selected navigation markers or navigable locations. In some embodiments, each selectable control may cause a list of previously selected navigation markers or navigable locations to be displayed, from which a selection of a particular navigation marker or navigable location may be made.

Figure 2:
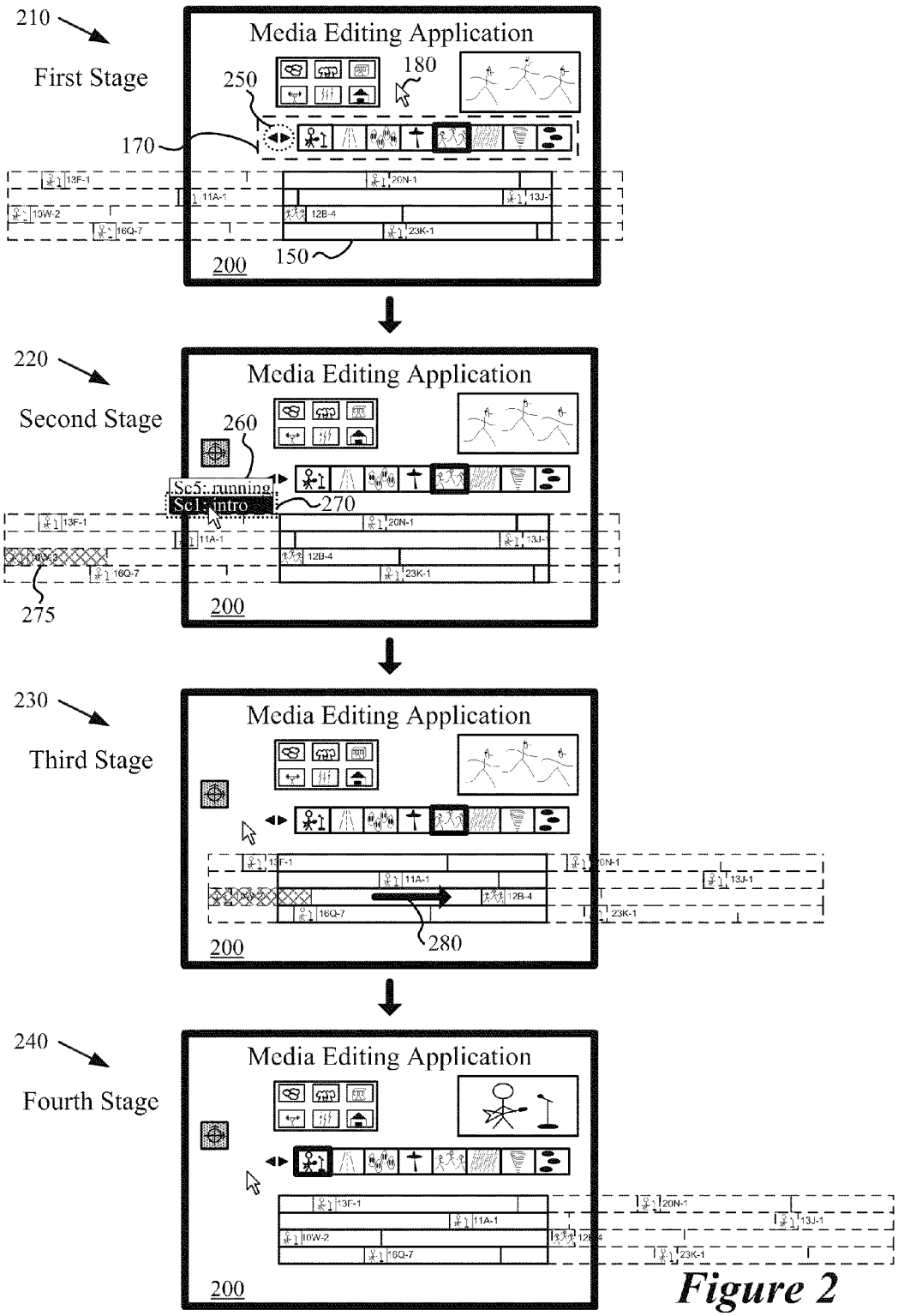
FIG. 2 illustrates an example GUI including a navigation tool with selectable controls of some embodiments for navigating backward and forward through a stored navigation history of previously selected navigable locations.

FIG. 2 illustrates an example of a GUI 200 that includes a navigation tool 170 with such selectable controls 250. The GUI 200 is the same GUI 100 described above in reference to FIG. 1, except that the GUI 200 includes the selectable controls 250. In this example, the selectable controls 250 includes (1) a backward arrow that allows a user to select previously selected navigation locations that were selected before a currently selected navigation location, and (2) a forward arrow that allows a user to select previously selected navigation locations that were selected after a currently selected navigation location.

FIG. 2 illustrates the GUI 200 at four different stages 210-240 that illustrate an example of using the navigation tool to navigate backward within a composite representation. An analogous example for navigating forward within the composite representation will be provided below by reference to FIG. 18.

In FIG. 2, the first stage 210 illustrates the composite display area 150 displaying a particular navigable location within the composite representation. In this example, the location is the same location that was displayed in the fifth stage 145 of FIG. 1. The second stage 220 then illustrates a user selecting the back button of the selectable controls 250 (e.g., by moving a cursor 180 over the back button and performing a click operation). As shown, this action has caused a pop-up menu 260 to be displayed. The pop-up menu then displays the previously-selected navigable locations. In some embodiments, the locations are displayed as a first-in/last-out list, such that the backward button displays the most recently selected backward location (i.e., the mostly recently selected location before the current location) at the top of the list. The second stage 220 illustrates that user's selection of backward option 270 (e.g., by positioning the cursor over the desired option 270 and performing a click operation). The location corresponding to option 270 is the location of the clip 275, which has been indicated by a cross-hatch pattern in order to identify its location for illustrative purposes in this figure.

The third stage 230 illustrates the GUI 200 after the user has selected the backward option 270. This selection causes the composite representation to scroll through the composite display area 150 in order to cause the particular clip 275 to appear in the display area 150. The third stage 230 illustrates an arrow 280 to indicate that the scrolling is in midstream, i.e., it is before the clip 275 has reached its final location in response to the selection of the option 270. The fourth stage 240 shows the GUI 200 after the clip 275 has reached its final destination after the selection of the option 270. The selected clip is now visible in the composite display area. In this example, the clip has been positioned at the far left of the composite display area, but other embodiments may position the selected location at different places within the composite display area (e.g., at an offset from the far left, at a location selected by a user, etc.).

In the fourth stage 240, the clip 275 is fully visible in the composite display area along with other clips that neighbor it. As mentioned above, some embodiments allow a user through preference settings of the media editing application to specify the desired number of neighboring clips and the location of the retrieved clip in the composite display area. The forward navigation may be performed in a similar manner to that shown in FIG. 2. One such example will be described below by reference to FIG. 18. One of ordinary skill in the art will realize that other embodiments also implement the forward and backward navigation feature differently than the embodiments illustrated in FIGS. 2 and 18. For instance, some embodiments simply navigate to the most recently-selected backward or forward location upon the selection of backward or forward arrows without first presenting a list of backward or forward selectable options.

Figure 3:
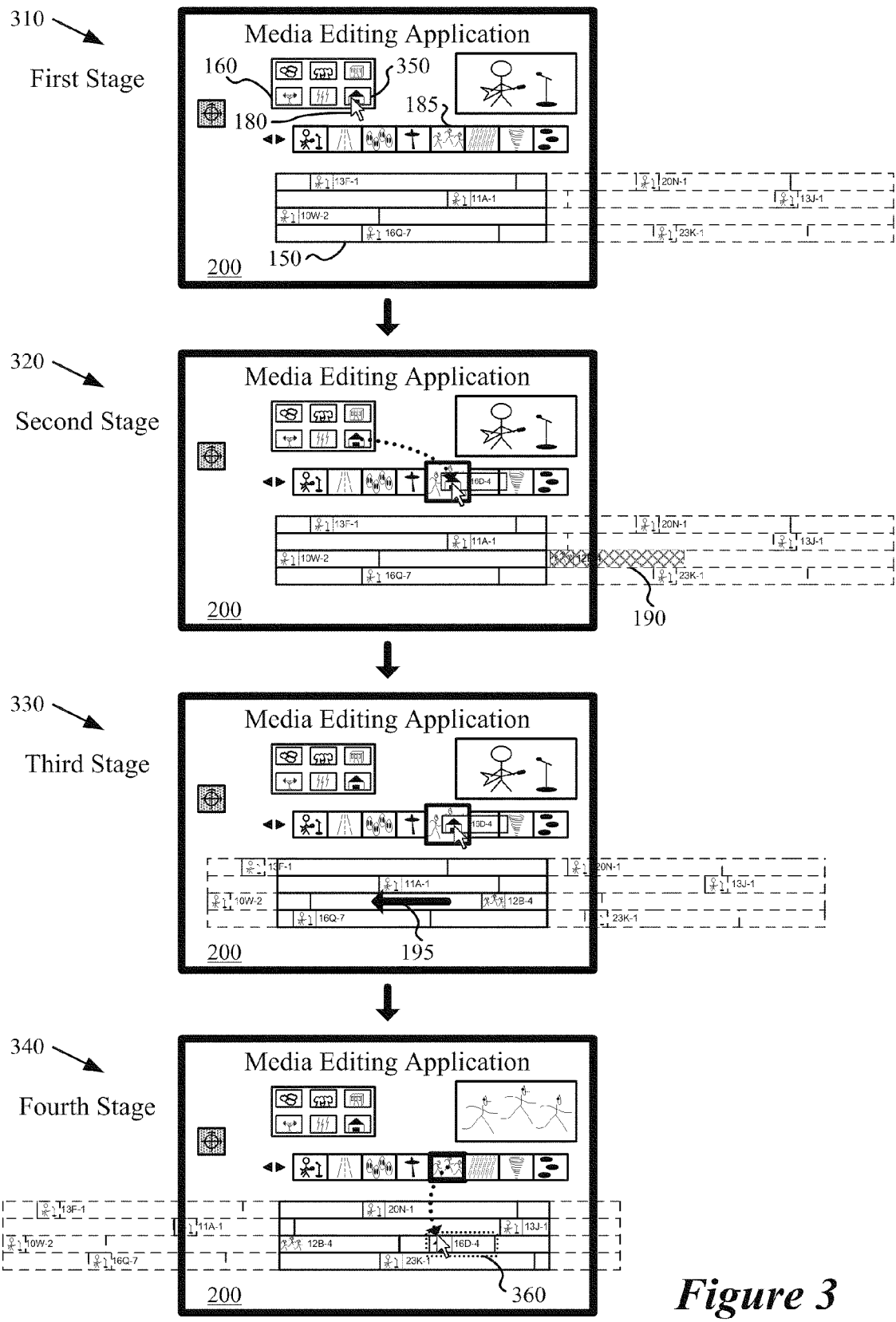
FIG. 3 illustrates an example GUI including a navigation tool with an insertion feature of some embodiments.

In some embodiments, the navigation tool allows a user to combine a clip insertion operation with a navigation operation. FIG. 3 illustrates an example of performing such a combined operation in the GUI 200, which is identical to the GUI 200 of FIG. 2. FIG. 3 illustrates the GUI 200 at four different stages 310-340 that illustrate one example of using the navigation tool to insert a media clip at a desired location within a composite representation. The first stage 310 shows the composite display area 150 as being in the same state in which this area started in the example in FIG. 1 and ended in the example in FIG. 2. In this stage, a user selects a particular clip 350 from the media library 160 by moving the cursor 180 to a location over the particular clip and performing a click operation. In the second stage 320, the user moves the selected clip to a location over the navigation tool. As shown, this action has caused selectable navigation marker 185 to be enlarged and highlighted in order to indicate that this marker has been selected. As mentioned above, the navigation marker corresponds to clip 190, which again has been highlighted with a cross-hatch pattern to help identify this clip in FIG. 3. At this stage, the clip 190 is completely outside of the composite display area in the third stage 130.

The third stage 330 illustrates that the selection of the navigation marker 185 has caused the composite representation to scroll through the composite display area 150 in order to cause the particular clip 190 to appear in the display area 150. The third stage 330 illustrates an arrow 195 to indicate that the scrolling is in midstream, i.e., it is before the clip 190 has reached its final location in response to the selection of the marker 185. The fourth stage 340 shows the GUI 200 after the clip 190 has reached its final destination after the selection of the marker 185. The selected clip is positioned at the far left of the composite display area and is completely visible in the composite display area. However, as mentioned above, other embodiments may position the selected location at different places within the composite display area (e.g., at an offset from the far left, at a location selected by a user, etc.), and may allow a user to specify the desired number of neighboring clips and the location of the selected clip in the composite display area.

The fourth stage 340 shows the insertion of clip 350 in the composite display area at a location 360 near the location of the clip 190 in the composite display area. This insertion is done by dragging the clip 350 from its previous position over the marker 185 to the location 360. Accordingly, through a single click-and-drag operation, the user (1) selects the clip 350 from the media library 160, (2) drags this clip to the marker 185 to cause the display area 150 to present the location adjacent to clip 190, and (3) drags and drops the clip 350 at the presented location. By so placing the clip 350 in the composite representation in the composite display area, the user edits the composite presentation to include the clip at the particular location in the composite presentation specified by the user.

The media editing application of some embodiments also includes a version management feature that allows a user to create and store multiple different composite-presentation part versions (referred to below as "versions") for a section of the composite representation. The version management feature of some embodiments is capable of (1) indicating whether any section of the media presentation has been modified since a previous version of that section was created, (2) saving a new version or deleting an existing version of any section, (3) displaying and accessing previously-saved versions of any section, (4) selecting among previously-saved versions for each section, (5) managing the presentation of available versions (e.g., by allowing re-naming, re-ordering, etc. of versions), (6) retrieving information regarding each version (e.g., date saved, source version, etc.), and (7) allowing collaboration among multiple users of the media editing application. A section of a composite representation may include a set of one or more media items, a particular range along the timeline, etc. For a section, different versions may differ in the media clips used to define each version, the attributes of the media clips (e.g., the number, temporal locations, the in- and out-frames for the clips, etc.), the types of operations performed on the media clips, etc.

In some embodiments, the version management feature operates in conjunction with the navigation tool. For instance, in some such embodiments, each section is associated with a particular navigation marker. Other embodiment employ the version management feature without employing the navigation tool, or without employing it in conjunction with the navigation tool (i.e., they employ both tools but do not interrelate the operation of the two tools in any manner). In some embodiments, the version management feature indicates which sections of the composite display area have been modified since the last version of each section was saved. Different embodiments use different types of visual indicators. For instance, in some embodiments, the visual indicators are textual, graphical, or some other type of marker from which a user can determine whether a section has been modified. In some embodiments, the visual indicators are placed at or near the navigation markers of the navigation tool (e.g., a colored line or other indication is placed under the navigation markers that correspond to modified sections).

Previously-saved versions may be accessed using the version management feature of some embodiments. For instance, some embodiments display a selectable version option for each section of the composite representation using the selectable navigation markers of the navigation tool (e.g., by providing a drop-down menu associated with each navigation marker). When a particular selection option is chosen for a particular section of the composite representation, the composite display area presents one or more versions that have been previously specified for the particular section, in order to allow a user to select among one of these versions for the particular section. If the user then selects a previously defined version that differs from the current version that is displayed in the composite display area for the particular section, the media editing application swaps out the current version with the previously defined version that the user selects.

Figure 4:
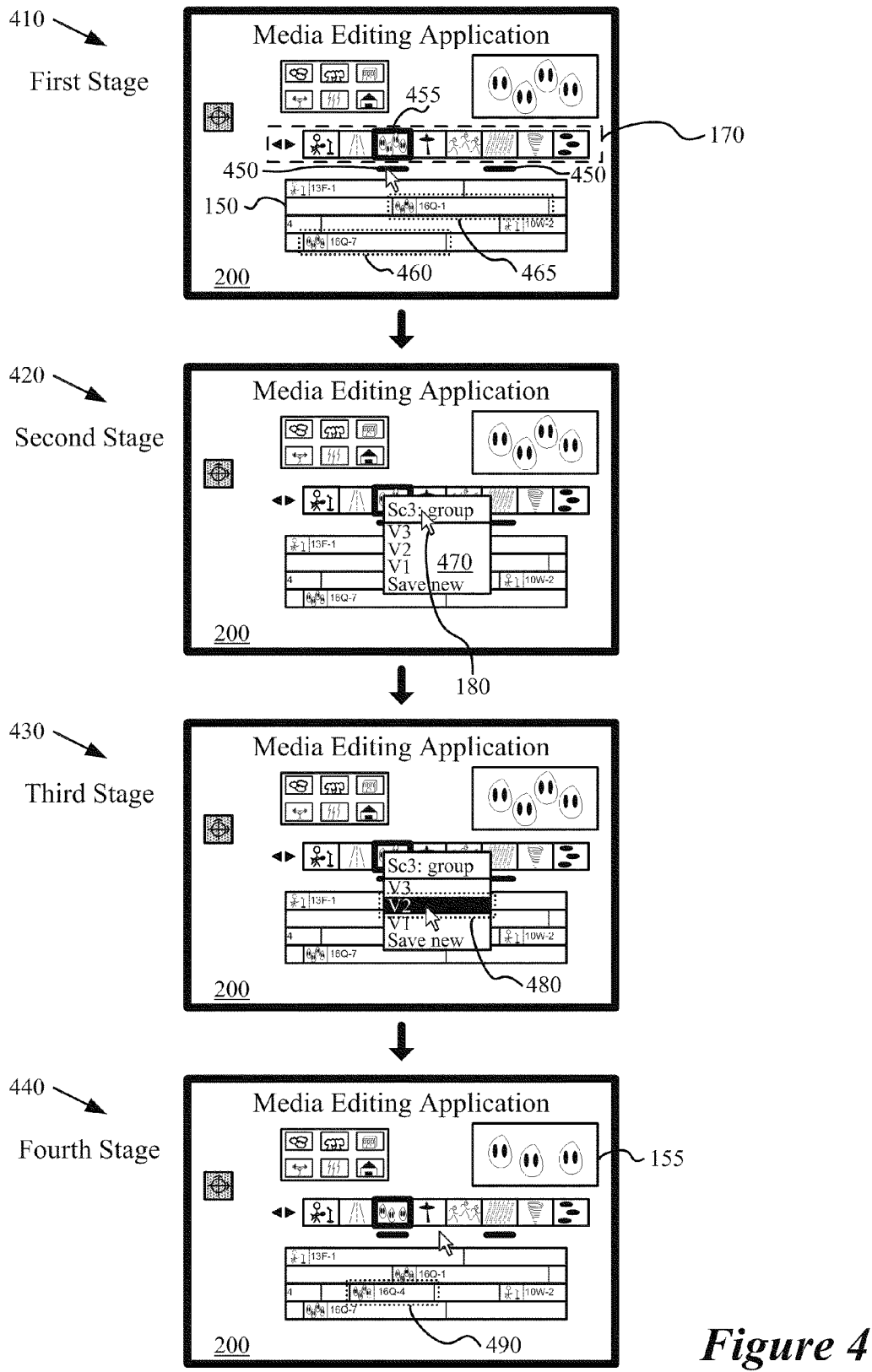
FIG. 4 illustrates an example GUI including a version management feature of some embodiments.

FIG. 4 illustrates an example of how such a version management feature is implemented by some embodiments. Specifically, this figure illustrates the GUI 200 at four different stages 410-440 that show an example of using the version management feature to select a different version of a particular section. The GUI 200 is the same GUI described above in reference to FIGS. 2-3.

The first stage 410 illustrates the composite display area 150 as displaying a particular location of the composite representation. The first stage also shows selectable indicators 450 placed under various navigation markers. These indicators are used to show which navigation markers refer to sections that have multiple available versions. At this stage, the composite display area displays a particular version for a navigation marker 455 within the navigation tool 170. In this example, the navigation marker 455 corresponds to several clips 460 and 465 that form a set of associated clips. In other examples, the navigation marker 455 might correspond to just one clip, to a temporal location in the composite display area, or to a section in the composite display area.

When a navigation marker has multiple versions associated with it (as indicated by an indicator 450), a user can view the associated versions by selecting the indicator 450. The second stage 420 illustrates a selection of the navigation marker 455 by moving the cursor 180 to a location over the indicator and performing a click operation. Other mechanisms (such as right-click operation over a navigation marker, keystroke commands, etc.) can also be used in some embodiments to select the navigation maker 455 in order to view the versions associated with it. As shown in the second stage 420, the selection of the navigation marker 455 causes a display area 470 (a pop-up menu in this example) to be presented. This display area 470 provides a list of the versions associated with the navigation maker 455.

The third stage 430 illustrates the user selecting a particular version 480 from the pop-up menu 470. This version 480 differs from the version that was previously displayed in the composite display area in the first and second stages 410 and 420. As mentioned above, this prior version was formed by clips 460 and 465. The fourth stage 440 shows the result of the selection of the version 480. As shown in this stage, the selection of this version has added clip 490 to the composite display area. In other words, this version includes the clips 460 and 465 in the same temporal locations as the previous version shown in the first and second stages 410 and 420. The version 480 also includes the clip 490 on the track between the tracks that holds the clips 460 and 465.

The fourth stage 440 also illustrates that the swapping of version 480 for the prior version changes the thumbnail of the navigation marker 455. In some embodiments, this does not always happen when one version is swapped with another version. However, when the representative thumbnail image differs between two versions, some embodiments modify the thumbnail image of the marker associated with the two images to provide an accurate pictorial representation of the version that is currently deployed in the composite display area. As an additional indication of the swapping of the two versions, the fourth stage 440 further illustrates an updated preview display in the preview display area 155. This updated preview corresponds to an image (e.g., a frame) associated with the new clip 490, whereas the preview in this display area 155 previously displayed a preview of an image associated with one of the other clips 460 and 465.

Some embodiments include a version display area for simultaneously displaying the available versions for a number of sections of the composite representation. In some embodiments, the version display area includes several sets of selectable version markers, where each set is associated with a particular section of the composite representation. The version display area of some embodiments displays each set of selectable version markers as a column of thumbnail images. In some embodiments, each column is displayed under the navigation marker that is associated with the particular section. When a version marker is selected for a section, the composite display area presents the version of the section that is associated with the selected version marker, in place of any other version that was previously being displayed in the composite display area for the section. In this manner, the version display area allows a user to view and select among a large number of versions.

The available versions for a section may be displayed as a first in/last out stack in some embodiments, such that the most recently accessed version is displayed at the top of the stack. Alternatively, some embodiments may list the available versions chronologically (e.g., sorted by creation date), arranged according to user preference, or using some other appropriate sorting criteria. In addition, some embodiments display a currently-selected version for each section of the composite presentation (e.g., by modifying the selectable navigation marker of the navigation tool to indicate which version is currently selected, providing a textual indication, etc.). Such a version display area is described in more detail below in reference to FIG. 25.

The version management feature of some embodiments also allows a user to create new versions (e.g., by selecting a pop-up menu option, responding to a prompt, etc.) and delete unwanted versions (e.g., through one or more keystroke commands, through a drag operation that removes version of the version display area, etc.). Deleted versions are not displayed by the version management feature of some embodiments. However, in some embodiments, the deleted versions may be restored at a later time.

Some embodiments provide a collaboration feature that allows multiple editors to simultaneously work on different sections of the composite representation. For instance, some embodiments implement the collaboration feature in conjunction with the version management feature. In some such embodiments, the version management feature allows one user to check out one or more versions associated with one or more sections for review, approval, and/or modification, while another user is working on other versions of other sections of a composite presentation. The checked-out versions may be locked in some embodiments such that they cannot be modified until check-in. The checked-out versions may be indicated in various ways (e.g., by placing a graphical indicator at each selectable navigation marker corresponding to a version that is currently checked-out). In addition, some embodiments indicate when a checked-out version has been returned by a collaborator (e.g., by changing the color of the graphical indicator used to show the version was previously checked-out). A user may then check in the returned version such that the version is unlocked. In some embodiments, a new version is created when the returned version is checked in.

Figure 5:
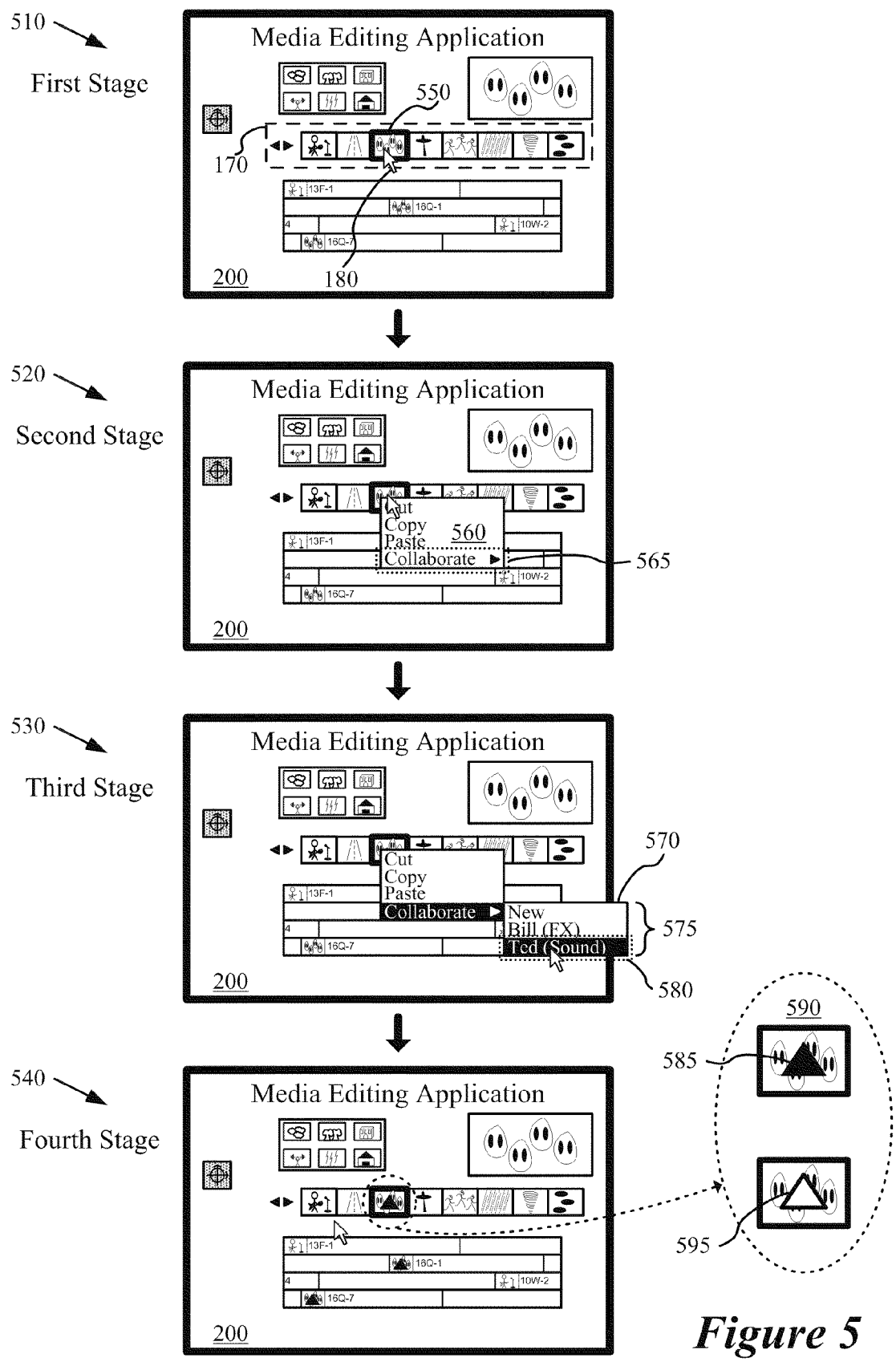
FIG. 5 illustrates an example GUI including a collaboration feature of some embodiments.

FIG. 5 illustrates an example of GUI 200 that implements the collaboration feature with the version management feature in the manner mentioned above. This figure presents the GUI 200 at four different stages 510-540 that illustrate an example of using the navigation markers of the navigation tool 170 to implement the collaboration feature of some embodiments. The GUI 200 is the same GUI described above in reference to FIGS. 2-4.

The first stage 510 of FIG. 5 shows the positioning of the cursor 180 over a navigation marker 550. This positioning has resulted in the highlighting of the navigation marker 550 to indicate that it is a candidate for selection by a user. At this point, the user performs one or more keystroke commands (e.g., a hot key command) and/or cursor commands (e.g., a right click operation) in order to open a pop-up menu associated with the navigation marker 550.

The second stage 520 illustrates the opening of this pop-up menu 560. As shown, the pop-up menu provides access to various edit operations (such as cut, copy and paste) with respect to the composite-presentation section associated with the navigation marker 550. It also provides access to a selectable collaboration item 565 that is associated with the composite-presentation section corresponding to navigation marker 550.

The third stage 530 illustrates that the selection of the collaboration item 565 and presents another display area 570 that lists several selectable collaboration options 575. These options 575 specify two previously-specified collaborators, "Bill" and "Ted", as well as a "New" option for specifying a new collaborator for the composite presentation section associated with the marker 550. In the third stage 530, the user selects a particular collaboration option 580, which in this example is the collaborator Ted for working on the audio component of the composite presentation section associated with the marker 550. In this example, the user selects Ted by moving the cursor over the name Ted and performing a click operation; however, the user can select Ted through other keystroke and/or cursor commands in some embodiments. After selecting one of the collaboration options 575, some embodiments prompt the user for various information (e.g., the name and e-mail address of the collaborator if not previously entered, the format of data to be sent to the collaborator, etc.) that is needed for initiating or resuming a collaboration with the selected collaborator.

The fourth stage 540 shows the result of the user's selection of the collaborator "Ted". The section associated with the selected navigation marker is now locked, as indicated by marker 585 shown in detail in breakout section 590. The breakout section shows an enlarged version of the marker 585 to better highlight the appearance of this marker.

The breakout section 590 also illustrates a second marker 595 that some embodiments use to highlight the need for a user to review a collaborator's returned review and/or revisions to a section. Specifically, when the collaborator returns the section associated with the navigation marker 550, the GUI 200 of some embodiments allows the user that checked out this section to the collaborator to decide whether to accept the collaborator's review and/or revision to this section. For some of these embodiments, the GUI 200 uses the second marker 595 to indicate that the section has been returned to the user by the collaborator and is ready for the user's review to determine whether to accept the collaborator's review and/or revisions to this section. The user may then accept or decline to check in the collaborator's review and/or revision (e.g., through a pop-up menu similar to menu 560). After check in is approved or declined, the indicator 585 or 595 may be removed from the display.

While many embodiments were described above by reference to a timeline, media editing applications may use other types of representations of composite presentations. For instance, some media editing applications (such as Shake® sold by Apple Inc.) use a tree-based graph approach to illustrate the compositing of a multi-media project. In such editing applications, each node may represent media and/or image processing operations while the links between nodes sometimes represent a sequence of operations. In these embodiments, the navigable locations may refer to nodes, groups of nodes, links among nodes, a combination of nodes and links, etc.

In addition, although many examples refer to a navigation tool that provides direct navigation to various locations without any hierarchical relationship between the locations, different embodiments may allow different types of navigation. For instance, some embodiments may include hierarchical navigation where the selection of a particular navigation marker may provide a set of markers corresponding to sub-locations of the selected marker. Furthermore, although many examples below show GUI items and controls similar to a video editing application, one of ordinary skill in the art will understand that other types of applications may be used (e.g., video playing applications, photo viewing applications, audio editing applications, etc.).

Several more detailed embodiments of the invention are described in the sections below. Section I provides a description of a media editing application that uses the navigation tool of some embodiments of the invention. This section also further describes various ways to invoke and use the navigation tool in some embodiments. Section II then describes using the navigation tool to perform clip insertion. Section III then describes the versioning and collaboration aspects of the navigation tool of some embodiments. Section IV follows that discussion with a description of the software modules and data structures used to implement the media editing application of some embodiments. Next, Section V describes the process used to define the media editing application of some embodiments. Lastly, Section VI describes a computer system which implements some of the embodiments of the invention.

I. Navigation Tool

Sub-section I.A below describes the environment in which the navigation tool operates in some embodiments by reference to FIGS. 6-8. Sub-section I.B then describes various types of navigable locations that may be included in a project by reference to FIG. 9. Next, sub-section I.C describes various ways to invoke and display the navigation tool by reference to FIGS. 10-14. Lastly, sub-section I.D describes navigating with the navigation tool by reference to FIGS. 15-16.

A. Media Editing Application Environment

Figure 6:
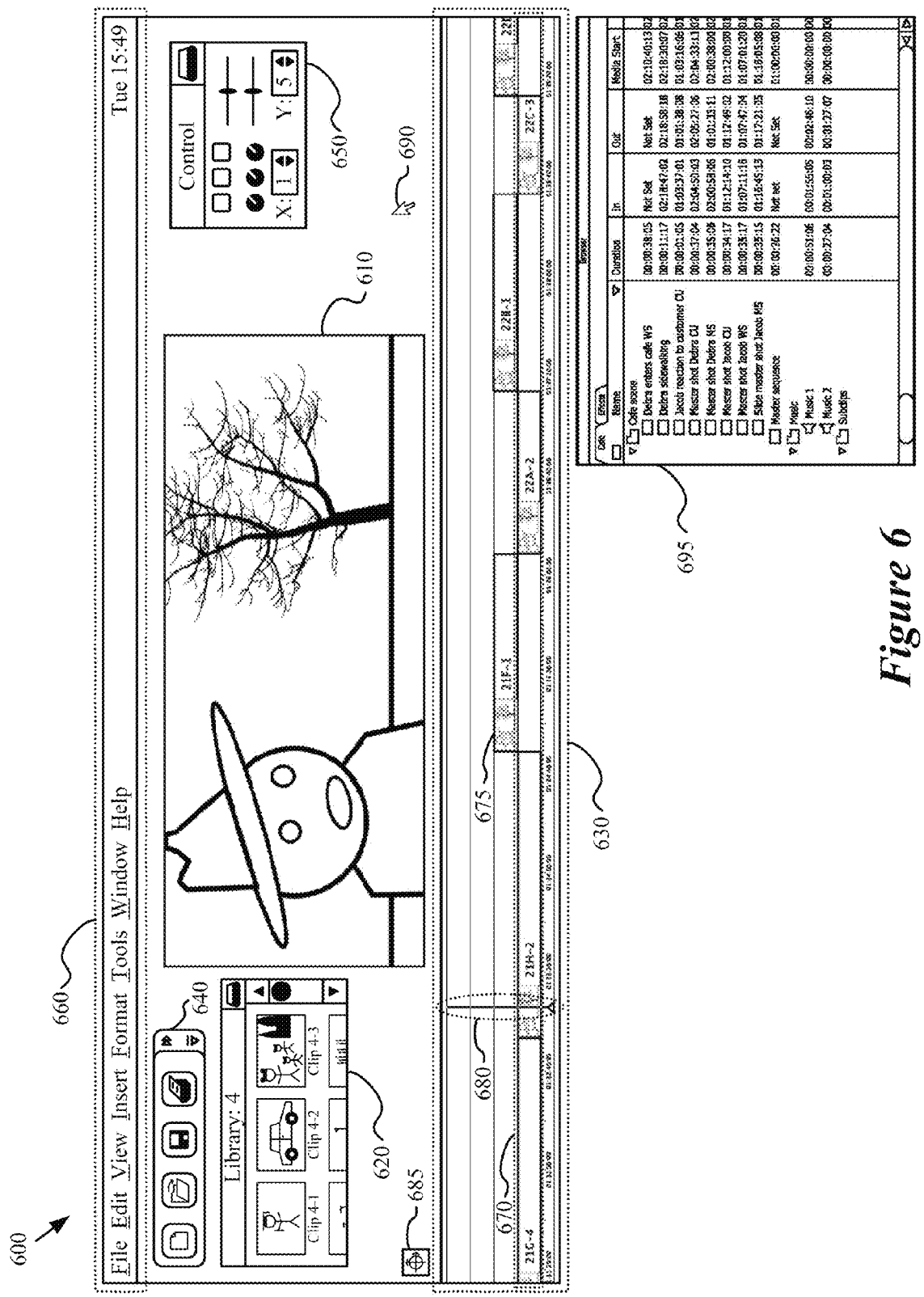
FIG. 6 illustrates an example GUI of a media editing application of some embodiments.

For some embodiments of the invention, FIG. 6 illustrates a GUI 600 of a media editing application. Specifically, this figure illustrates one example layout of various components included in a typical user interface of a media editing application. As shown in FIG. 6, the GUI 600 includes a preview display area 610, a media library 620, a composite display area 630, various buttons 640 and other controls 650, a menu bar 660, one or more tracks (e.g., track 670) in the composite display area, a playhead 680, a navigation tool selection GUI item 685, and a cursor 690.

The preview display area 610 displays a preview of a composite presentation that the application creates by compositing several media clips. The media library 620 is an area in the GUI 600 through which the application's user can select media clips to add to a presentation that the user is compositing with the application. In the example of FIG. 6, the clips in the media library are represented as thumbnails that can be selected and added to the composite display area 630 (e.g., through a drag-and-drop operation or a menu selection operation). The clips in the media library may also be represented as a list, a set of icons, or some other representation that allows a user to view and select the various clips in the library. In some embodiments, the media library 620 may include audio clips, video clips, text overlays, pictures, and/or other media. The media library 620 may provide access to media that is stored locally or at a central location (e.g., a location accessed through a network).

In some embodiments media content may be selected from locations outside the media library 620 or the GUI 600. For instance, in some embodiments a user selects media clips using other components of GUI 600 (e.g., by using menu commands provided by the menu bar 660, by copying a clip that is displayed in the composite display area 630, etc.). In addition, some embodiments allow a user to select media clips from a location outside the GUI 600 (e.g., the desktop, a folder that includes media content, a browser window, a GUI provided by another application, etc.) and place the content at a location within the GUI (e.g., in the media library 620, at a location in the composite display area 630, etc.).

The composite display area 630 displays one or more media clips that are part of the composite representation. In the example illustrated in FIG. 6, the composite display area 630 is an area that includes multiple tracks that span a timeline (e.g., track 670). One or more media clips 675 can be placed on each track. The various buttons and controls 640-650 are conceptual representations of UI items that allow the user to adjust and/or control various aspects of the media editing application (e.g., by selecting various options, executing various commands, specifying the values of certain parameters, etc.). The menu bar 660 provides several grouped sets of menu commands and options for the media editing application.

The playhead 680 is for highlighting an instance in time in the composite representation that is being shown in the composite display area. Highlighting this instance in time is useful for a variety of reasons. For example, when viewing a preview of the composite presentation in the preview display area 610, the playhead 680 scrolls across the timeline to identify the location in the composite representation in the composite display area 630 that is being currently displayed in the preview display area 610. In addition, as further described below, the playhead 680 location also acts as an insertion point when adding clips, effects, or other media to the project. The navigation tool selection GUI item 685 is a conceptual representation of one or more UI items for activating a navigation tool of some embodiments. The cursor 690 provides feedback to a user and operates various selection items or other controls included in the GUI 600. The cursor 690 also allows a user to select or manipulate various representations of content that are included in the GUI 600. The operation of the GUI 600 will be described below.

In addition to the components included in GUI 600, FIG. 6 shows a list of video clips in a browser window 695 that is displayed separately from the GUI 600. The browser window 695 in this example includes a list of video clips along with metadata (e.g., time code information) about the video clips. In some embodiments, the list of video clips is the list of video clips in a particular sequence of video clips, and the metadata specifies in and out points, durations, etc. for the video clips. In this example, the browser window is displayed separately from the other components of the GUI 600; however, the browser window may alternatively be displayed within the GUI 600. Similarly, various other elements of GUI 600 may be displayed at a location external to GUI 600. In addition, although the browser window 695 is displayed separately from the GUI 600, the browser window and GUI may conjunctively perform various operations (e.g., modifications to items in the browser window may affect the display of the GUI 600, the data included in a composite project that is active in the GUI 600, etc.).

Figure 7:
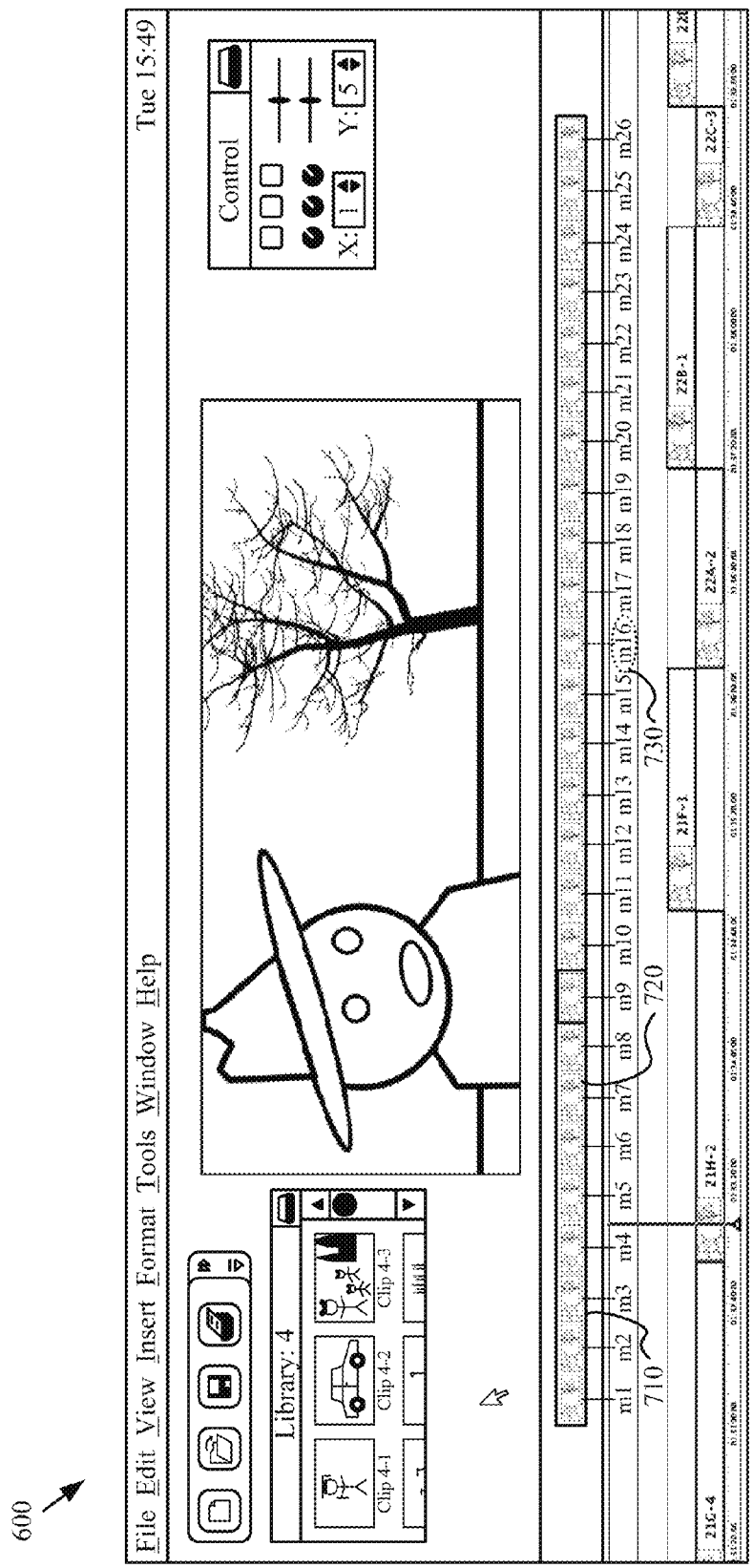
FIG. 7 illustrates an example GUI of a media editing application including a navigation tool of some embodiments.

FIG. 7 illustrates another example GUI 600 of a media editing application of some embodiments. Specifically, this figure shows a GUI that includes a navigation tool 710 of some embodiments. The GUI 600 is the same GUI described above in reference to FIG. 6. As shown, in addition to the elements described above in reference to FIG. 6, the GUI 600 of FIG. 7 includes the navigation tool 710 for navigating to different locations within a composite representation. In this example, the navigation tool includes various thumbnail images 720 that serve as selectable navigation markers associated with different navigable locations of the composite representation. In this example, the thumbnail images are all the same, however, a typical application would use different thumbnails for different markers. Different embodiments use different types of markers (e.g., textual, graphical, etc.). In some embodiments, a user may customize the display of the navigation tool 710 by selecting the desired type of marker from a set of available options.

The navigation tool of some embodiments also includes labels 730 associated with each of the navigation markers in order to provide information to a user regarding the navigable locations associated with the markers. In some embodiments, the labels are not displayed unless a user explicitly activates the labels (e.g., by selecting a menu option, through one or more keystroke commands, etc.). Different embodiments display the labels in different ways or do not display the labels at all. The labels are generated automatically in some embodiments (i.e., without direct user intervention). In some embodiments, a user may manually enter some or all of the labels (e.g., by labeling navigation markers with relevant information such as "intro", "scene 1", "clip 3", etc.). The operation of the navigation tool 710 under various different scenarios will be described below in sub-section I.C.

Figure 8:
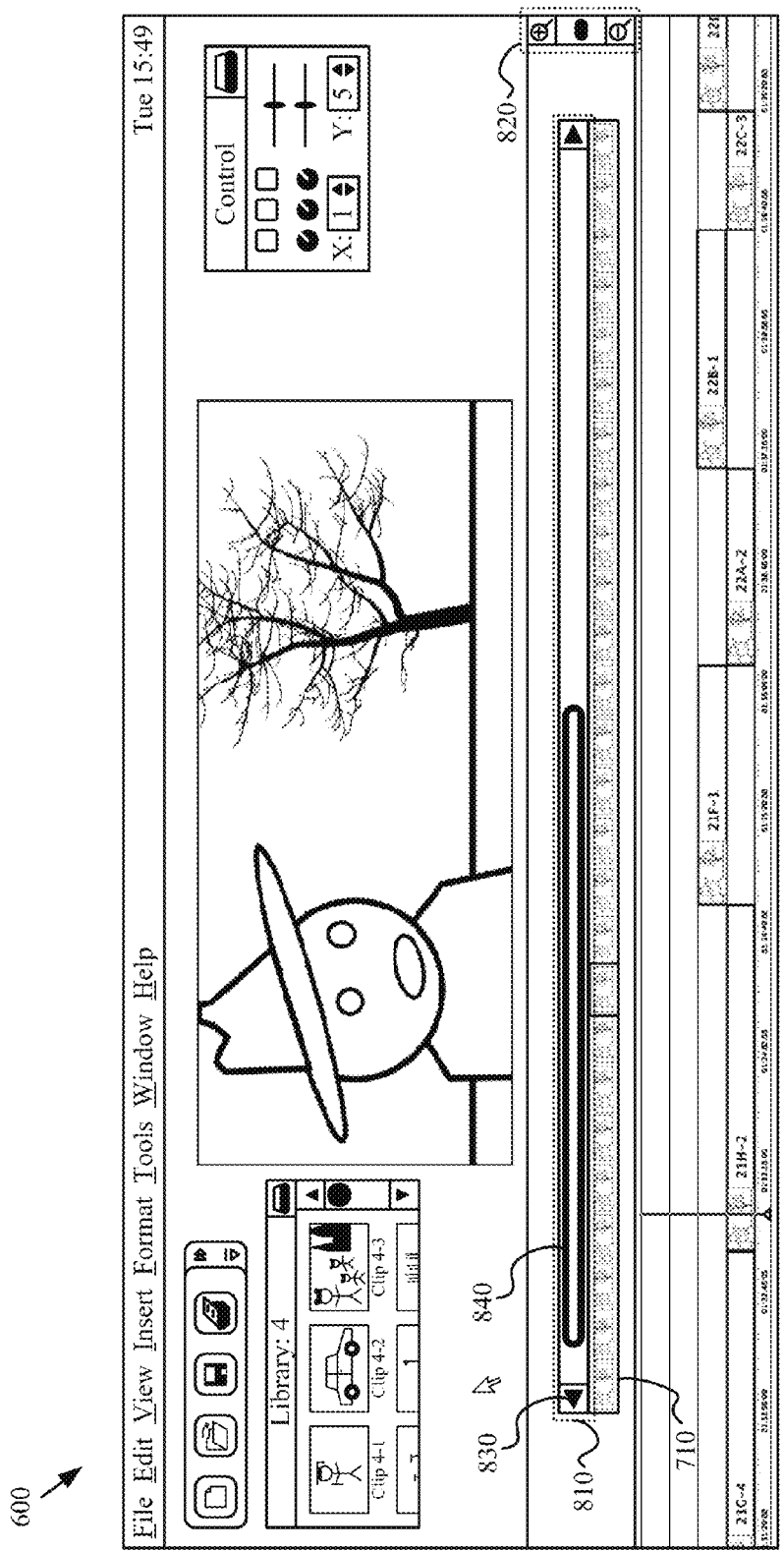
FIG. 8 illustrates an example navigation tool including scroll and zoom controls of some embodiments.

FIG. 8 illustrates another example navigation tool 710 of some embodiments. Specifically, this figure shows a GUI that includes a navigation tool with conceptual scroll and zoom controls of some embodiments. The GUI 600 is the same GUI described above in reference to FIGS. 6-7. As shown, in addition to the elements described above in reference to FIGS. 6-7, the GUI 600 of FIG. 8 includes a scroll control 810 and a conceptual zoom control 820 for adjusting the display of the navigation tool. Different embodiments of the invention implement these UI items differently. Some embodiments implement each UI item as a UI button, others as an option that can be selected in a pull-down or drop-down menu, still others as a command that can be invoked through one or more keystroke operations, and yet others as a command that can be invoked through one or more cursor operations. Yet other embodiments allow the user to manipulate the scroll and/or zoom control through a combination of two or more of such UI implementations or other UI implementations.

In some embodiments, a user manipulates the scroll control 810 in order to specify which navigation markers are displayed within the navigation tool. For instance, if a user is interested in viewing navigation markers toward the left of the navigation tool, the user may select a left arrow 830 or drag an indicator bar 840 to a different position in order to display the navigation markers toward the left of the navigation tool. Different embodiments implement the scroll control in different ways. For instance, in some embodiments the scrolling is controlled based on cursor position (and/or keyboard input) while no scroll control UI item is displayed (e.g., the markers may scroll to the left when the cursor is moved to the far left of the navigation tool). In some embodiments, the scrolling is performed automatically (e.g., the navigation tool may be scrolled such that any selected marker is placed in the center of the tool).

A user may manipulate the zoom control 820 of some embodiments in order to specify the relative size of each navigation marker compared to other GUI elements. For instance, if a user wishes to display fewer navigation markers, where each marker is larger, the user may increase the zoom adjustment (e.g., by selecting an arrow of the zoom control, positioning an indicator bar, through one or more keystroke commands, etc.). Conversely, if a user wishes to see more navigation markers, where each marker is smaller, the user may decrease the zoom adjustment. Different embodiments implement the zoom control in different ways. For instance, in some embodiments the zoom adjustment may be controlled based on a combination keystrokes and cursor operations (e.g., by pressing a "ctrl" key while manipulating a cursor wheel) while no zoom control UI item is displayed. By adjusting the scroll and/or zoom controls, a user is able to customize the display of the navigation tool such that only a subset of markers are displayed at any time, based on the user's preference.

One of ordinary skill in the art will recognize that actual implementations of various media editing applications may differ from the conceptual representations shown in FIGS. 6-8. For instance, a particular implementation may include different and/or additional display areas, menus, controls, etc. than those shown in FIGS. 6-8. In addition, although various examples below show specific controls, selection options, etc., one of ordinary skill in the art will recognize that other specific controls, selection options, and/or other components may be implemented in various different ways. For instance, although shown as buttons 640 in GUI 600, the operations associated with such buttons 640 may be associated with various other controls and/or operations (e.g., an option of a pull-down menu, a series of keystrokes, a voice command, etc.).

B. Navigable Locations of a Composite Project

Figure 9:
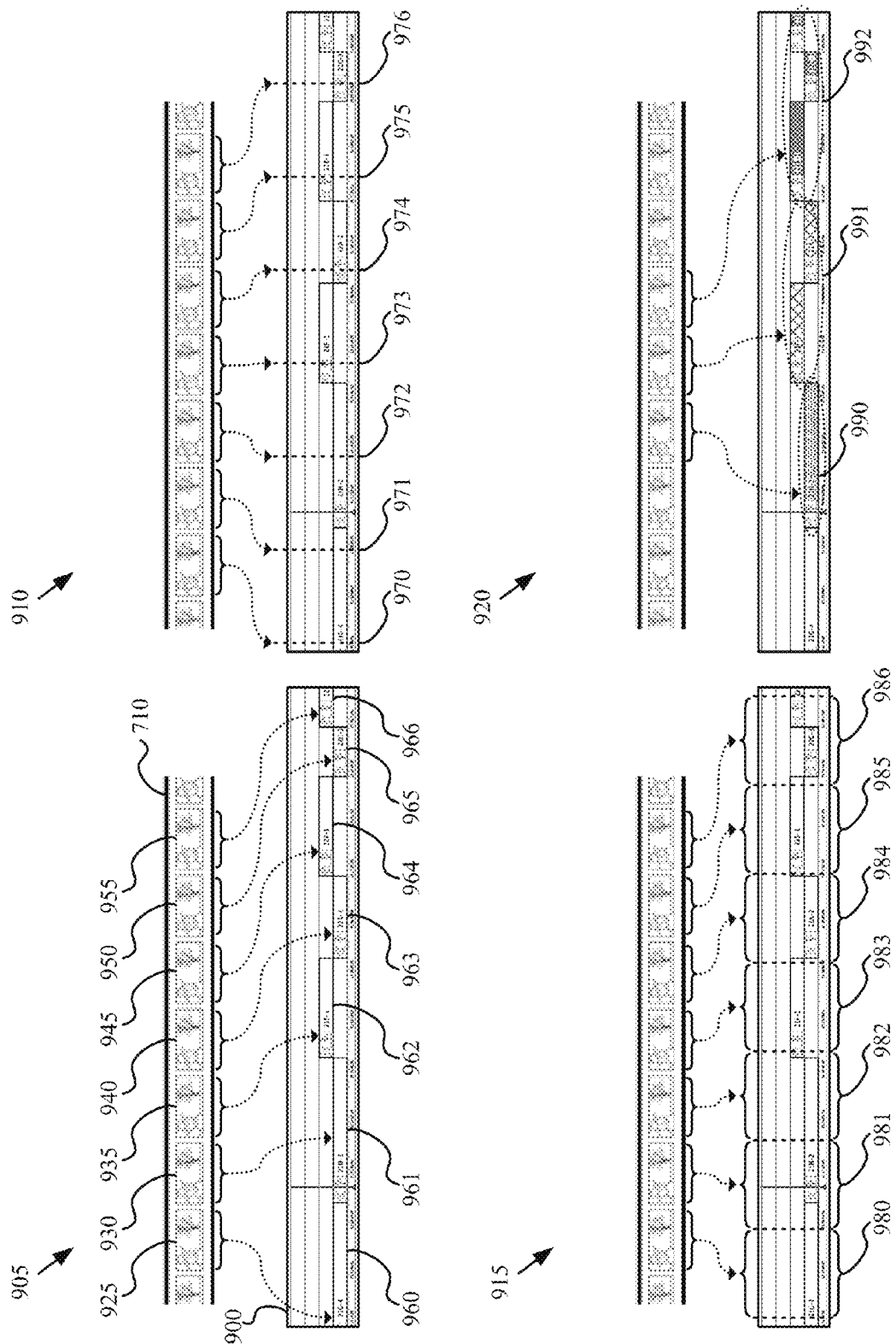
FIG. 9 illustrates several potential associations between the selectable navigation markers of the navigation tool and navigable locations of the composite project in some embodiments.

For some embodiments, FIG. 9 illustrates several potential associations between selectable navigation markers of a navigation tool 710 and navigable locations of the composite representation as shown in a composite display area 900. Specifically, this figure shows four potential associations 905-920 between various selectable navigation markers 925-955 and different types of navigable locations of a composite representation.

In some embodiments, a user may be able to select from among the different associations between the selectable navigation markers and navigable locations of the composite representation (e.g., by selecting a menu option, through one or more keystroke commands, etc.). In some embodiments, the selection of a particular association may be made by default, may be based on the type of media included in the composite project, may be based on information stored in the composite project file, etc. In addition, different embodiments provide various other potential associations.

In the first association 905, each navigation marker 925-955 is associated with (e.g., linked to the location of) a media clip, such as one of media clips 960-966, that is part of the composite representation and may be displayed in the composite display area 900. In some embodiments, only a sub-set of media clips may correspond to a particular navigation marker (i.e., the navigation markers may correspond to every third media clip or some other increment). Such an increment may be based on a user selection, the number of media clips in the composite project, a desired number of navigation markers, etc.

The selection of a navigation marker that corresponds to a media clip causes the media clip to be displayed at a particular location of the composite display area 900 (e.g., at the far-left of the composite display area, at a fixed offset from the far-left of the composite display area, at the playhead location, etc.). In some embodiments, the navigation tool scrolls the composite representation across composite display area 900 such that the media clip is displayed at the particular location of the composite display area. In addition, the navigation tool of some embodiments adjusts the zoom of the composite display area such that a particular range of the composite representation is displayed in the composite display area. Some embodiments automatically determine whether to scroll and/or zoom the display, while other embodiments allow a user to select whether to scroll and/or zoom (and/or allow the user to select under what conditions to scroll and/or zoom). Navigation will be described in more detail in sub-section I.C below.

In the second association 910, each navigation marker 925-955 is associated with a navigable location point along the timeline, such as one of points 970-976, that may be displayed in the composite display area 900. Although the navigable location points are shown as evenly spaced in this example, one of ordinary skill in the art will recognize that some or all of the navigable location points may be placed at irregular intervals along the timeline. Different embodiments set the location of each navigable location point in different ways (e.g., by a user selection, by automatically determining the location based on the media content included in the composite project, etc.).

The selection of a navigation marker that corresponds to a navigable location point causes the navigable location point to be displayed at a particular location of the composite display area. As mentioned above, the navigation tool scrolls the display of the composite display area such that the navigable location point is displayed at the particular location of the composite display area. In addition, the navigation tool may adjust the zoom of the composite display area such that a particular range along the timeline is displayed in the composite display area.

In the third association 915, each navigation marker 925-955 corresponds to a section of the composite representation, such as one of sections 980-986, that may be displayed in the composite display area 900. Although the sections are shown as evenly spaced in this example, one of ordinary skill in the art will recognize that the sections may have various durations along the timeline. In some embodiments, the section boundaries may not be adjacent as shown (i.e., there may be portions of the composite representation that are not included in any section). Different embodiments define section boundaries in different ways (e.g., the boundaries may be set by a user, may be generated by dividing the composite representation into a particular number of sections of equal duration, etc.).

The selection of a navigation marker that corresponds to a section causes the selected section to be displayed at a particular location of the composite display area. As mentioned above, the navigation tool scrolls the display of the composite display area such that the section (or a particular point within the section) is displayed at the particular location of the composite display area. In addition, the navigation tool may adjust the zoom of the composite display area such that only the selected section is displayed in the composite display area. Alternatively, some embodiments adjust the zoom such that the composite display area includes portions of the composite representation adjacent to the selected section.

In the fourth association 920, each navigation marker 935-945 corresponds to a set of media clips, such as one of sets 990-992, that may be displayed in the composite display area 900. For clarity, in this example not all navigation markers 925-955 are shown as corresponding to a set of media clips. However, one of ordinary skill in the art will recognize that each navigation marker corresponds to a set of media clips, where some of the sets of media clips are not displayed in the composite display area (i.e., where some of the media clips included in the composite representation have scrolled off the visible display of the composite display area).

The selection of a navigation marker that corresponds to a set of media clips causes the selected set of clips to be displayed at a particular location of the composite display area. As mentioned above, the navigation tool scrolls the display of the composite display area such that the set of clips (or a particular point within the set of clips) is displayed at the particular location of the composite display area. In addition, the navigation tool may adjust the zoom of the composite display area such that only the selected set of clips is displayed in the composite display area. Alternatively, some embodiments adjust the zoom such that the composite display area includes portions of the composite representation adjacent to the selected set of clips.

Different embodiments define sets of media clips in different ways (e.g., the sets may be defined by a user, may be generated by dividing the composite project into sets of media clips based on an evaluation of content in the media clips, etc.). A set of media clips may include one media clip (such as section 990) or more than one media clip (such as section 991 or 992).

One of ordinary skill in the art will recognize that the navigable locations may differ from the conceptual representations shown in FIG. 9. For instance, in some embodiments the navigable locations may not be arranged in the same order as the navigation markers. In addition, although various examples below may reference particular types of navigable locations (e.g., sections), one of ordinary skill in the art will recognize that other types of navigable locations may be used (e.g., a set of media clips). Furthermore, some embodiments may use a combination of types of navigable locations in a single navigation tool (e.g., one navigation marker may correspond to a clip while a second marker corresponds to a section along the timeline).

Although many examples refer to a navigation tool that provides direct navigation to various locations, different embodiments allow different types of navigation. For instance, some embodiments may include hierarchical navigation where the selection of a particular navigation marker provides a set of markers corresponding to sub-locations of the selected marker. A more detailed explanation of such hierarchical segmenting of media projects is provided in U.S.

patent application Ser. No. 12/551,557 entitled "Graphical User Interface for a Media-Editing Application With a Segmented Timeline," filed on Aug. 31, 2009, now issued as U.S. Pat. No. 8,769,421, incorporated herein by reference.

C. Invoking and Displaying the Navigation Tool

1. Invocation Process

Figure 10:
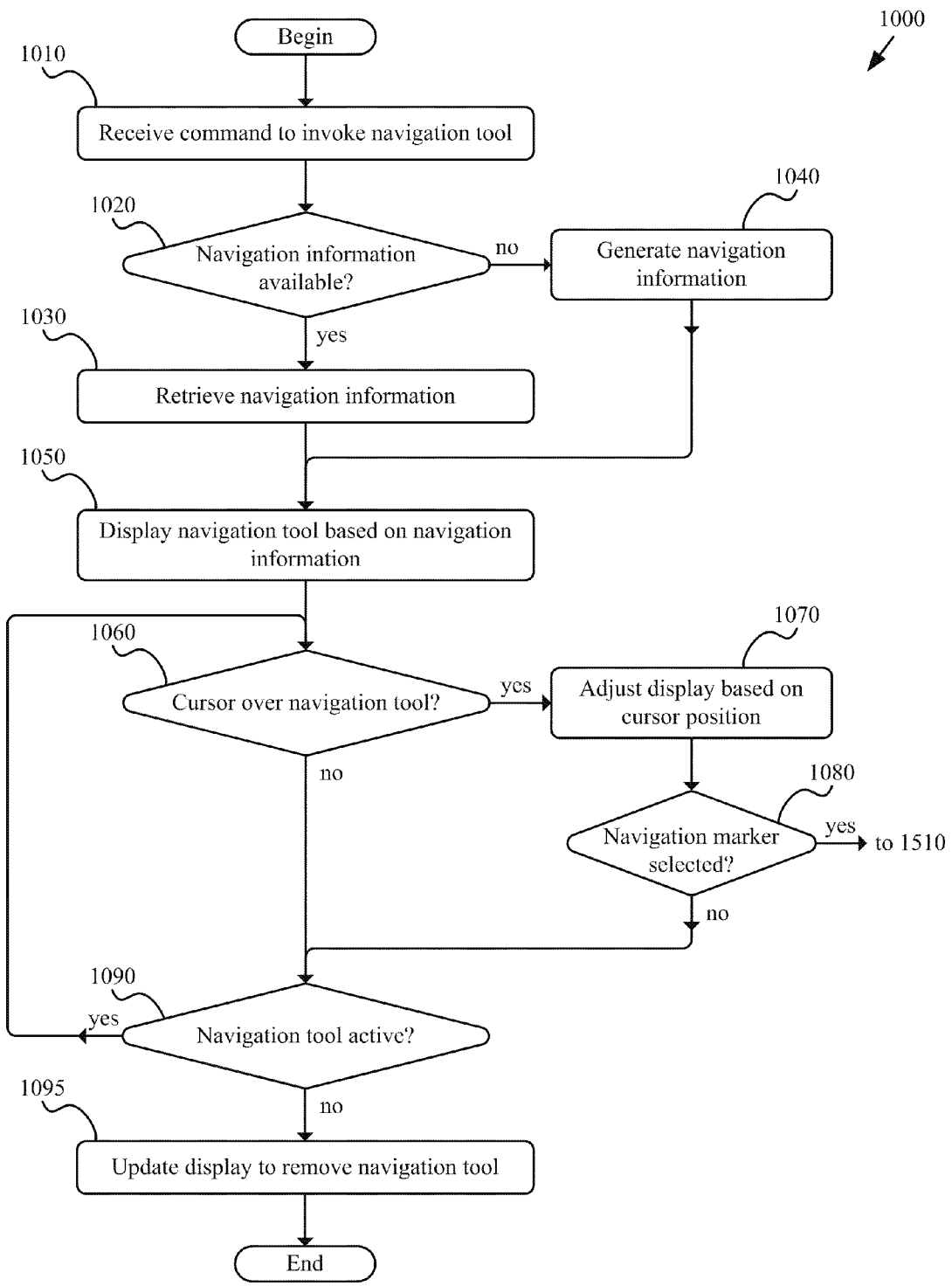
FIG. 10 conceptually illustrates an example of a process that some embodiments use to invoke and display the navigation tool.

As described above, some embodiments provide a navigation tool for navigating to different locations within a composite representation. FIG. 10 conceptually illustrates an example of a process 1000 that some embodiments use to invoke and display the navigation tool. Process 1000 will be described by reference to FIGS. 11-13 which illustrate an example user interface interaction.

Figure 11:
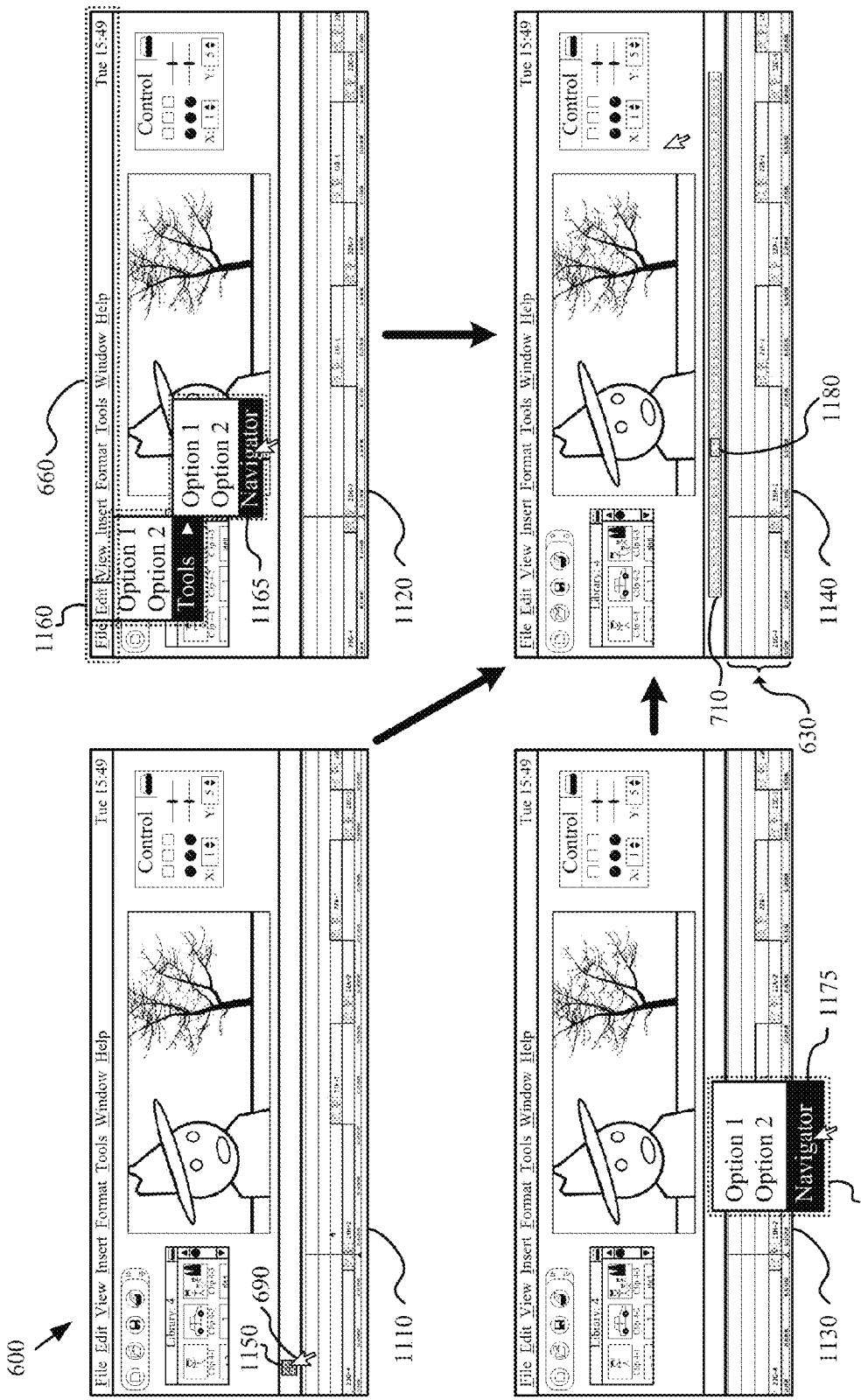
FIG. 11 illustrates several ways of invoking the navigation tool of some embodiments.
Figure 12:
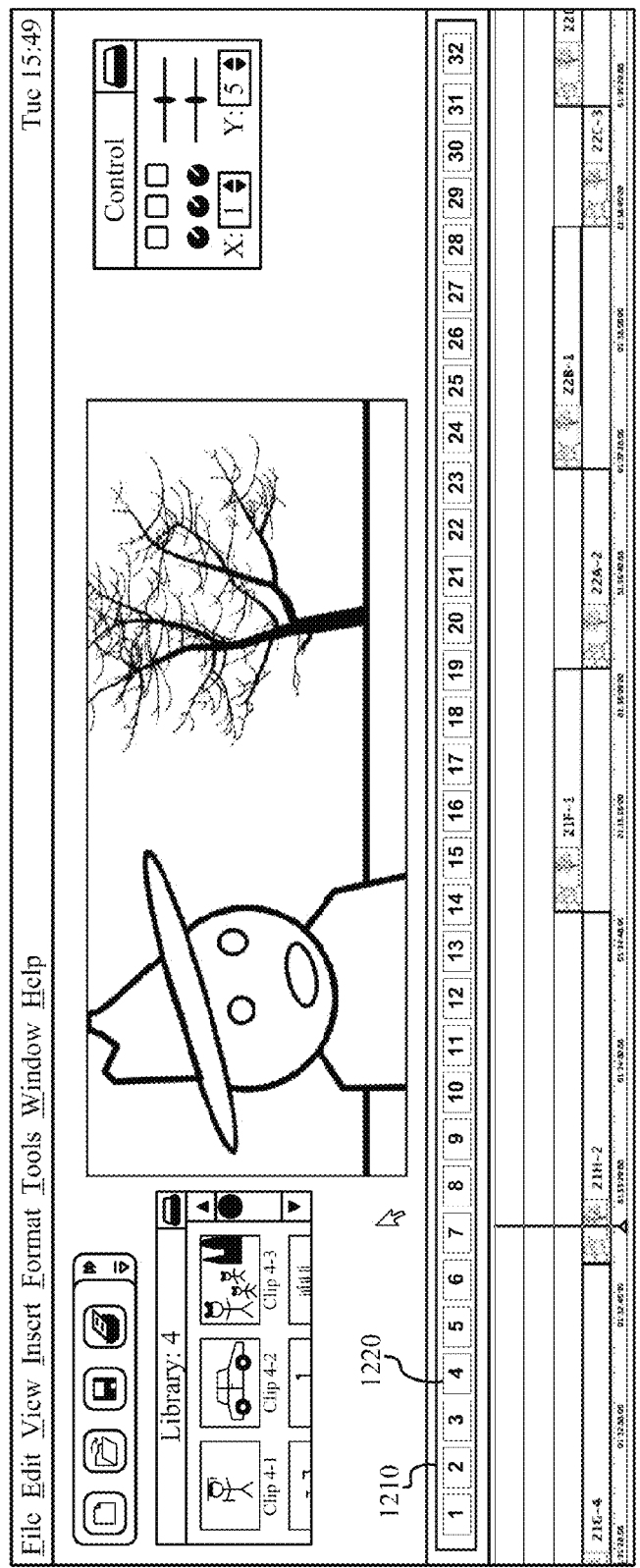
FIG. 12 illustrates an alternative navigation tool.
Figure 13:
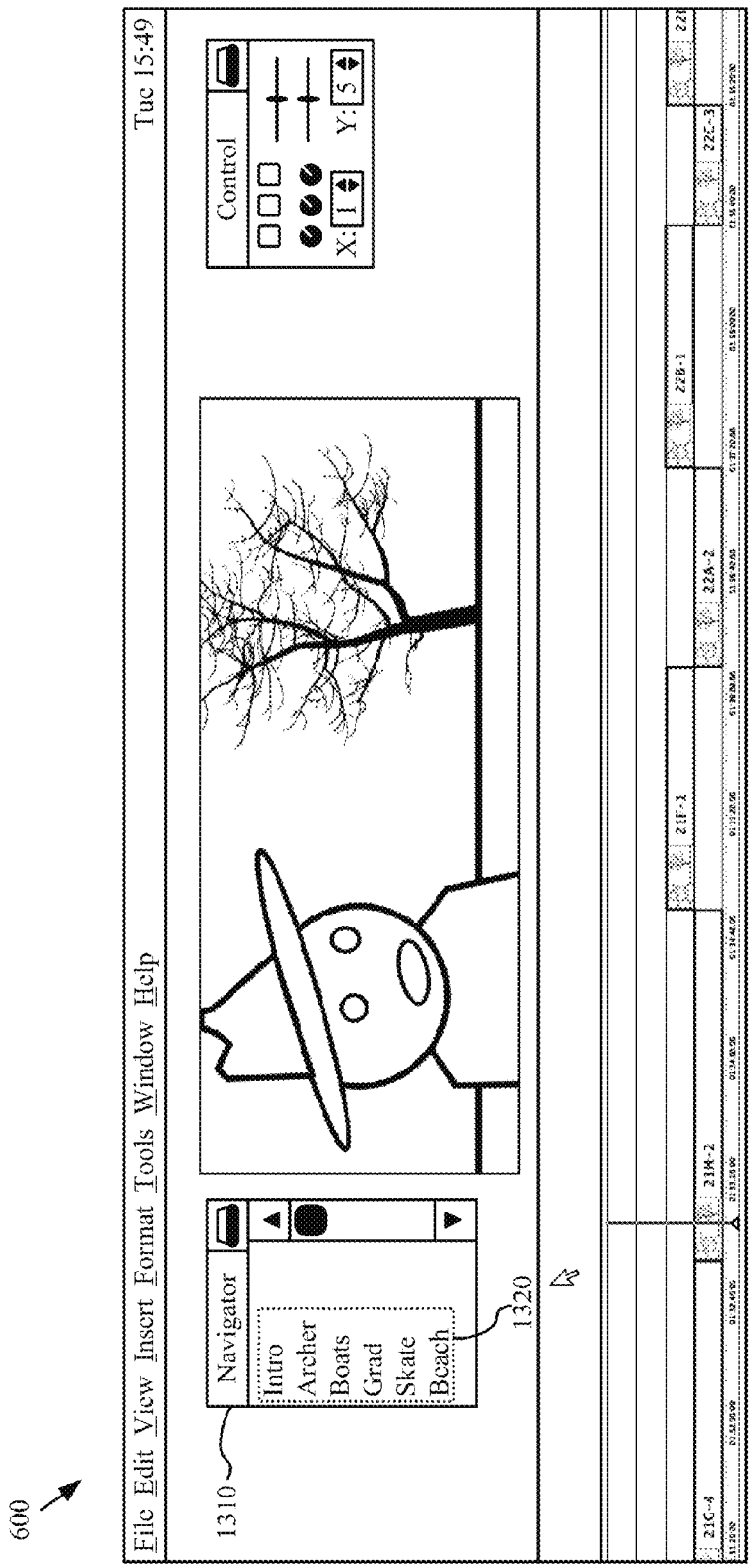
FIG. 13 illustrates another alternative navigation tool.

FIG. 11 illustrates several ways of invoking the navigation tool 710 of some embodiments. Specifically, this figure shows the activation of the navigation tool using various GUI items of some embodiments. FIGS. 12-13 illustrate two alternative navigation tools to that shown in FIG. 11. Specifically, FIG. 12 shows a navigation tool 1210 that includes an alternative set of navigation markers 1220 while FIG. 13 shows a navigation tool 1310 that includes a list of textual options 1320 that serve as navigation markers.

FIGS. 11-13 illustrate the same GUI 600 as described above in reference to FIGS. 6-8. To illustrate the example of invoking the navigation tool, FIG. 11 describes three alternative first stages 1110-1130 and a second stage 1140 of a user's interaction with the GUI 600.

As shown in FIG. 10, process 1000 begins when a media editing application that includes the navigation tool is launched. Next, the process receives (at 1010) a command to invoke the navigation tool. This command could be received automatically (e.g., the media editing application may invoke the navigation tool at start-up, when a project is loaded, etc.). Alternatively, a user may invoke the navigation tool using various GUI items as described below.

FIG. 11 shows a first stage 1110 that is before the user has activated the navigation tool. In this stage, the user selects a navigation tool button 1150 (e.g., by moving the cursor 690 to a location over the button 1150 and performing a click operation). As shown, in this example, activating the button has caused the button to be displayed with a dark background. Different embodiments change the display of the button in different ways or not at all when a user activates the button (e.g., by showing the button with a thicker border, changing the color of the button, etc.).

FIG. 11 further shows an alternative first stage 1120 of user interaction that is before the user has activated the navigation tool. In this stage, the user activates a pull-down menu 1160 (e.g., by performing a cursor click operation over the menu bar 660) and selects an option 1165 from the menu (e.g., by moving the cursor 690 to a location over the desired option and performing a click operation). Different embodiments present different options and/or sub-options. In this example, the selection is indicated by a darker background, however different embodiments may indicate the selection in different ways.

FIG. 11 also shows another alternative first stage 1130 of user interaction that is before the user has activated the navigation tool. In this stage, the user activates a pop-up menu 1170 (e.g., by performing a right-cursor click operation while the cursor is positioned over the GUI 600) and selects an option 1175 from the menu (e.g., by moving the cursor 690 to a location over the desired option and performing a click operation). Different embodiments present different options and/or sub-options. In addition, a right-click operation may present different pop-up menus when is performed over different areas of the GUI. In this example, the selection is indicated by a darker background, however different embodiments indicate the selection in different ways.

Returning to FIG. 10, process 1000 then determines (at 1020) whether navigation information is available for the project. In some cases, the project file will include information regarding navigation markers (e.g., a list of thumbnail images) and the associated navigable locations of the composite representation (e.g., a list of instances along a timeline). Conceptual data structures used by some embodiments will be described in more detail in reference to FIG. 34 below. When process 1000 determines that navigation information is available, the process retrieves (at 1030) the navigation information for the composite project. Otherwise, the process generates (at 1040) navigation information for the composite project.

Different embodiments generate navigation information in different ways. For instance, some embodiments specify a set of equally-spaced points that span the timeline of the composite representation. These points may then form the navigable locations of the composite project, as described above in reference to FIG. 9. In addition, some embodiments automatically generate a set of navigation markers. The markers may be generated in this example by selecting a frame of video from a media clip included in the composite representation at the associated navigable location. In addition, a user may be asked to generate the navigation information in some embodiments (e.g., the user may select navigation markers and associated navigable locations using GUI controls of the media editing application).

After retrieving (at 1030) or generating (at 1040) the navigation information, the process displays (at 1050) the navigation tool based on the navigation information. One example way of performing the selection and sizing of the navigation tool elements will be described in more detail in reference to FIG. 14 below. The display of the navigation tool is described below.

FIG. 11 shows a second stage 1140 of user interaction that is after the GUI 600 has been updated to display the navigation tool 710. The second stage may follow any one of the first stages 1110-1130. In addition, a user may perform various other operations to invoke the navigation tool of some embodiments (e.g., a series of keystrokes, a hot key selection, etc.).

FIGS. 12-13 illustrate two other example navigation tools 1210 and 1310 that may be invoked in a similar manner to those described in reference to FIG. 11. The navigation tool 1210 shown in FIG. 12 includes several sequentially-numbered navigation markers 1220.

The navigation markers 1220 may be labeled automatically (i.e., without direct user intervention), the labels may be specified by a user, or the labels may be generated in some other way. The navigation tool 1310 shown in FIG. 13 includes a list 1320 of textual navigation markers. In some such embodiments, the textual navigation markers are labeled such that the labels provide an indication to the user of the location of the composite representation that corresponds to each marker.

In the example of FIG. 11, the navigation tool 710 has been updated to highlight the navigation marker 1180 associated with the navigable location shown in the composite display area 630 (as indicated by the thicker border). In some cases, no navigation marker is highlighted, as no associated navigable location has been selected. In addition, the last-selected navigation marker is highlighted in some embodiments, without regard for the location shown in the composite display area.

Next, the process determines (at 1060) whether a cursor is positioned over the navigation tool. When the process determines that the cursor is not positioned over the tool, the process proceeds to operation 1090, described below. Otherwise, the process adjusts (at 1070) the display of the tool based on the cursor position. In some embodiments, the display adjustment includes increasing the size of one or more navigation markers, as described above in reference to the third stage 130 of FIG. 1. Different embodiments adjust the display in different ways or not at all (e.g., by changing the color of a navigation marker, displaying a navigation marker with a thicker border, displaying text with inverted colors, etc.). In addition, different embodiments may adjust the display based on various other criteria than cursor position (e.g., based on adjustment of scroll and/or zoom controls for the navigation tool, based on modifications to the composite project, etc.).

After adjusting (at 1070) the display of the tool, the process determines (at 1080) whether a navigation marker has been selected. The selection may be made using a cursor click operation, a menu selection, or some other appropriate way. When the process determines that a navigation marker has been selected, the process proceeds to operation 1510 of process 1500, described below in reference to FIG. 15.

When the process determines (at 1080) that no navigation marker has been selected, or after performing process 1500, the process determines (at 1090) whether the navigation tool is still active. In some embodiments, a user may deactivate the navigation tool (i.e., remove the tool from the GUI display) using similar operations to those described in reference to FIG. 11. For instance, the navigation tool may be de-invoked by pressing the button 1150 after the tool has been invoked, by making a pull-down menu selection such as that described above in reference to stage 1120, by making a pop-up menu selection such as that described above in reference to stage 1130, a series of keystrokes, etc. Alternatively, the tool is deactivated automatically in some embodiments (e.g., when a user selects an option or tool of the media editing application that is incompatible with the navigation tool, when loading a project that does not include navigation information, etc.).

When the process determines (at 1090) that the tool is still active, the process performs operations 1060-1090, as described above. Otherwise, the process updates (at 1095) the GUI display to remove the navigation tool and ends. One example of the media editing GUI displayed without the navigation tool was described above in reference to FIG. 6. Alternatively or conjunctively to updating (at 1095) the display, some embodiments perform other operations when the tool is deactivated. For instance, in some embodiments the functionality provided by the tool may be deactivated without updating the GUI display at all.

One of ordinary skill in the art will recognize that the operations of process 1000 are conceptual and may not necessarily be performed in the order shown. For instance, in some embodiments, the process retrieves navigation information (if available) before receiving a command to invoke the navigation tool. Furthermore, different specific operations may be performed in different embodiments. For instance, some embodiments receive an interrupt signal that triggers some responsive action rather than determining whether a user has selected a particular option. Also, the process may not be performed as one continuous series of operations. In addition, the process could be implemented using several sub-processes, or as part of a larger macro-process.

Although various specific examples of navigation tools have been provided, one of ordinary skill in the art will recognize that different embodiments may use different navigation tools without departing from the spirit of the invention. For instance, in some embodiments the navigation tool presents differently-colored navigation markers. As another example, some embodiments display navigation markers using different shapes than those described above. In addition, some embodiments of the navigation tool operate without any visible navigation markers and/or controls. For instance, some embodiments may provide a voice-controlled navigator where certain words or phrases are used to select among navigable locations (e.g., "navigate to intro", "select scene 1", etc.). As another example, some embodiments provide a keyboard-controlled navigator where different combinations of physical keystrokes are used to select among navigable locations.

2. Generating the Navigation Tool Display

Figure 14:
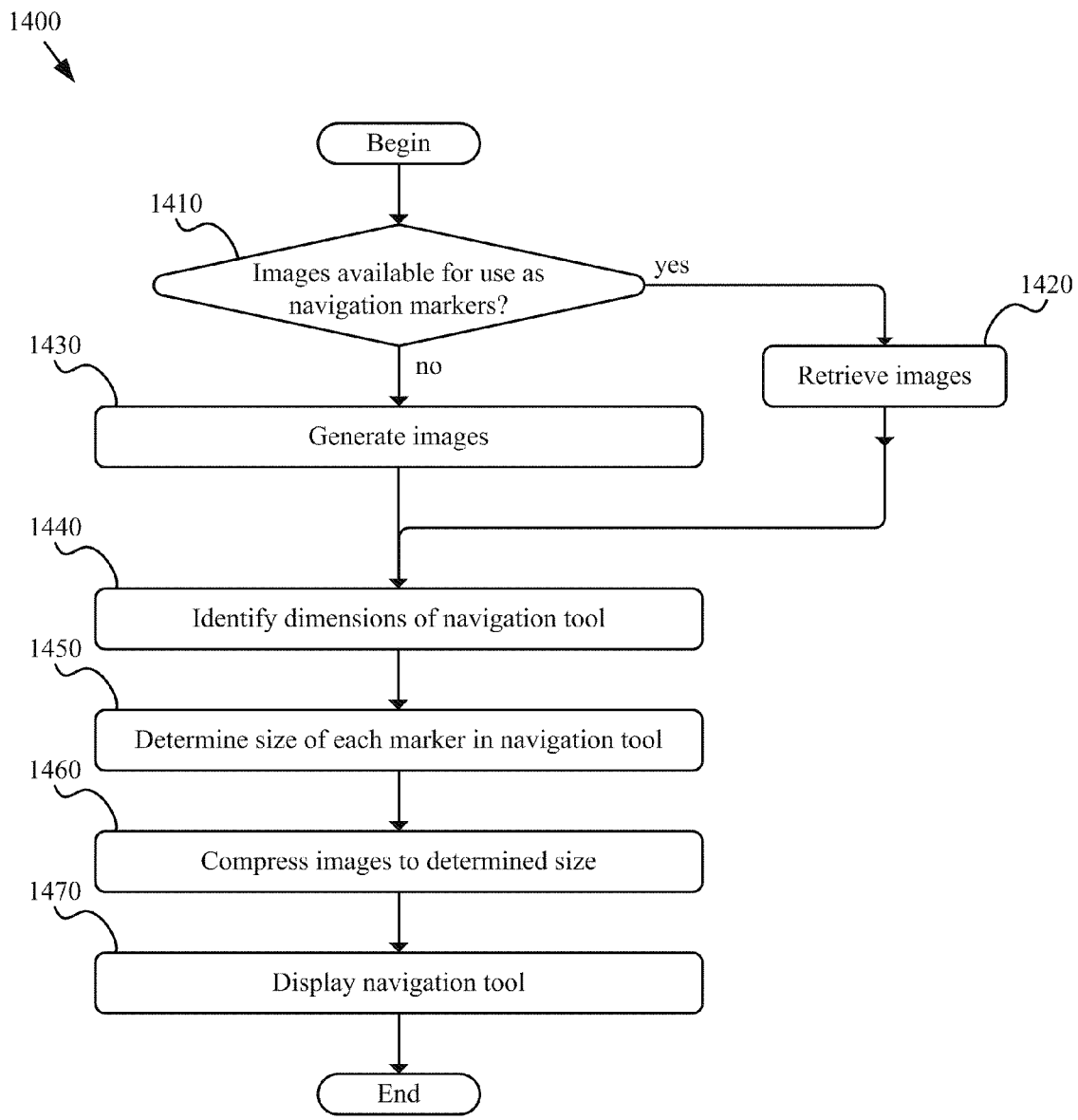
FIG. 14 conceptually illustrates a process used to select and size the images used as navigation markers by some embodiments.

As described above, in some embodiments the navigation tool provides navigation markers from which a user can infer a corresponding location in the composite representation. In some of these embodiments, the navigation markers are thumbnail images of the media clips included in the composite project. FIG. 14 conceptually illustrates an example of a process 1400 used to select and size the images used as navigation markers by some embodiments. Process 1400 will be described by reference to FIG. 8 which illustrates an example navigation tool 710 and associated scroll and zoom controls 810-820.

In some embodiments, process 1400 begins when a navigation tool such as tool 710 is activated. Alternatively, process 1400 may be performed during the activation (e.g., as part or all of operation 1050 of process 1000) or operation of the navigation tool in some embodiments. As shown, the process determines (at 1410) whether images are available for use as navigation markers (e.g., by determining whether thumbnails have been associated with the navigable locations of the project within the project file).

When the process determines (at 1410) that no images are available, the process continues to operation 1430 described below, otherwise, process 1400 retrieves (at 1420) a previously stored set of images for use as navigation markers in the navigation tool. In some embodiments, the retrieved images are representative frames from the various media clips in a composite project as in the example navigation tool 710 described above in reference to FIG. 7. The retrieved images could also be other types of media items, such as bitmaps used to form GUI items similar to the GUI items 1220 used in example navigation tool 1210 described above in reference to FIG. 12.

When the process determines (at 1410) that no images are available, the process generates (at 1430) images for use as navigation markers. Different techniques can be used to generate the thumbnail images in different embodiments. For instance, when generating a thumbnail image for a particular video clip or set of video clips, some embodiments initially identify a representative video frame for the clip or set of clips, and then generate a thumbnail image from the identified frame. Different embodiments identify the representative video frame for a clip or set of clips differently.

For example, some embodiments identify the frame based on one or more of a user selection, a location within the clip, an analysis of the clip, etc. For instance, some embodiments select the first frame of a clip, while other embodiments select the first frame unless the frame does not meet some criteria (e.g., a brightness threshold, a color saturation threshold, etc.). Some embodiments analyze a clip to determine a frame that is most representative of the clip as a whole (e.g., by using pattern recognition or some other appropriate algorithm to identify a representative frame).

In some embodiments, a particular navigable location may not be associated with any clips (e.g., when the location is a point along the timeline, and there are no clips at that point). In such cases, a frame may be selected from a nearby clip (e.g., a frame from the clip closest to the particular navigable location). Alternatively, an image may be selected or generated from a different source than a clip (e.g., a bitmap used by the navigation tool to indicate an open location, a blank image, etc.).

Next, the process identifies (at 1440) the dimensions of the navigation tool. Some embodiments require all of the images in the navigation tool to be displayed concurrently within a fixed area. Accordingly, the process identifies the dimension of the fixed area in which the navigation tool is to be displayed. The area is determined in some embodiments by the media editing application that uses the navigation tool. For instance, in a particular media editing application, the navigation tool might take up only a small portion of the display area for the application, whereas in a video playing application the navigation tool might take up the entire width of the display of the application. Some embodiments allow a user to control the size of the navigation tool. For instance, in some embodiments the navigation tool is provided in a sizable window or pane that a user can manipulate to size the tool as desired (e.g., by selecting and dragging a corner of the pane using a cursor).

Once the dimensions of the navigation tool are identified, the process determines (at 1450) the size of each marker in the navigation tool. In some embodiments, the navigation tool includes a horizontal arrangement of all images in the set of images. Some embodiments arrange the images in the order of the navigable locations to which they correspond, such that the image for the first navigable location in the composite representation is at the left end of the navigation tool and the image for the last navigable location in the composite representation is at the right end of the navigation tool. In such embodiments, the width for each image $W_1$ is the total width W available for the navigation tool divided by the total number of images N, such that $W_1=W/N$. The height of each image may be the same as the available height for the navigation tool.

Alternatively, some embodiments arrange the images vertically. Some embodiments arrange the images in the order of the navigable locations to which they correspond, such that the image for the first navigable location in the composite representation is at the top of the navigation tool and the image for the last navigable location in the composite representation is at the bottom of the navigation tool. In these embodiments, the height for each image is the total height available for the navigation tool divided by the total number of images and the width of each image is the same as the available width for the navigation tool.

Other embodiments arrange the images differently. For instance, the images could be arranged in two dimension (e.g., in a square). Or the images could be arranged primarily horizontally, but in two rows stacked on top of each other. Furthermore, some embodiments determine a different size for each image in the navigation tool (e.g., based on the length of the media clip corresponding to the image).

In some embodiments, the elements of the navigation tool (e.g., the navigation markers) are automatically resized when the tool is resized. In some embodiments, a user may select various controls such as scroll and zoom controls 810 and 820 described above in reference to FIG. 8 in order to adjust the number of navigation markers displayed and/or select a particular sub-set of navigation markers for display. By using such controls, a user may affect the size and/or appearance of navigation markers (and/or other elements of the navigation tool) without necessarily affecting the size of the navigation tool itself. Some embodiments automatically resize the navigation tool based on the user settings (e.g., the height of the tool may be increased such that an entire thumbnail may be displayed at a particular zoom setting).

The navigation tool of some embodiments also includes a feature that can be moved along the tool's navigation markers in order to highlight and/or to enlarge the navigation markers for selection. In some of these embodiments, the enlarged navigation markers may be sized relative to the other navigation markers (e.g., such that the enlarged markers are always 25% larger than the other markers) and/or the navigation tool (e.g., by sizing the largest highlighted marker such that the marker completely fills the height of the navigation tool).

After the size for each image is determined (at 1450), process 1400 compresses (at 1460) the images to the determined size or sizes. When scaling an image by large scale factors (e.g., 10× or more), a significant amount of visual data may be lost. To scale the images, some embodiments use standard scaling/compression mechanisms that are regularly used for image editing. Next, the process displays (at 1470) the navigation tool. FIG. 7 illustrates one example of such a displayed navigation tool 710.

One of ordinary skill in the art will recognize that the operations of process 1400 are conceptual and may not necessarily be performed in the order shown. For instance, operations 1440-1470 may be repeatedly performed in response to scroll and zoom adjustments.

Furthermore, different specific operations may be performed in different embodiments. Also, the process may not be performed as one continuous series of operations. In addition, the process could be implemented using several sub-processes, or as part of a larger macro-process.

D. Navigating with the Navigation Tool

Figure 15:
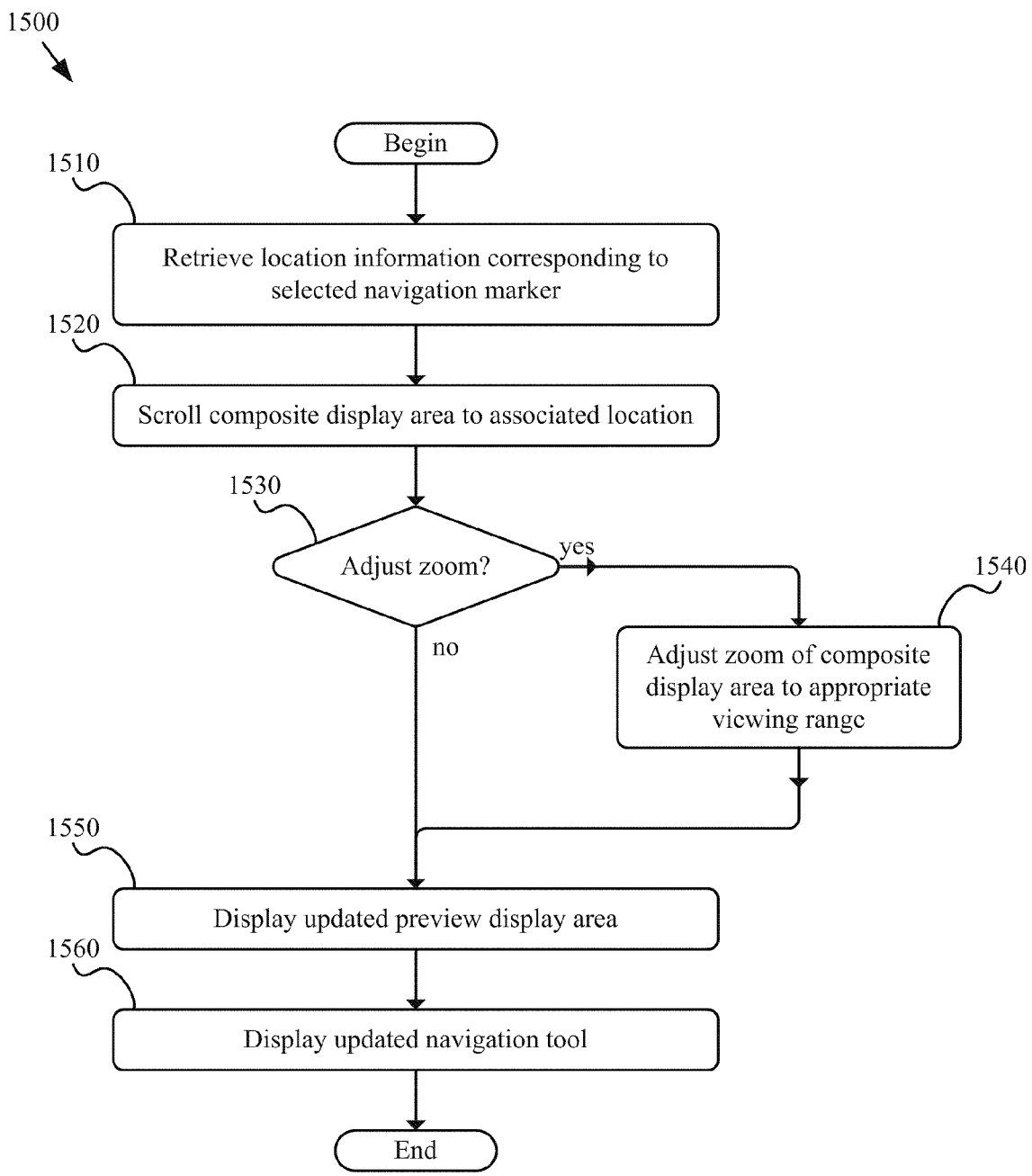
FIG. 15 illustrates an example of a conceptual process used by some embodiments to navigate to a particular location in a composite project.

As described above, in some embodiments the navigation tool allows a user to navigate to different locations within a composite representation. FIG. 15 conceptually illustrates an example of a process 1500 that some embodiments use to navigate to a particular location in a composite representation. Process 1500 will be described by reference to FIG. 16 which illustrates an example user interface interaction.

Figure 16:
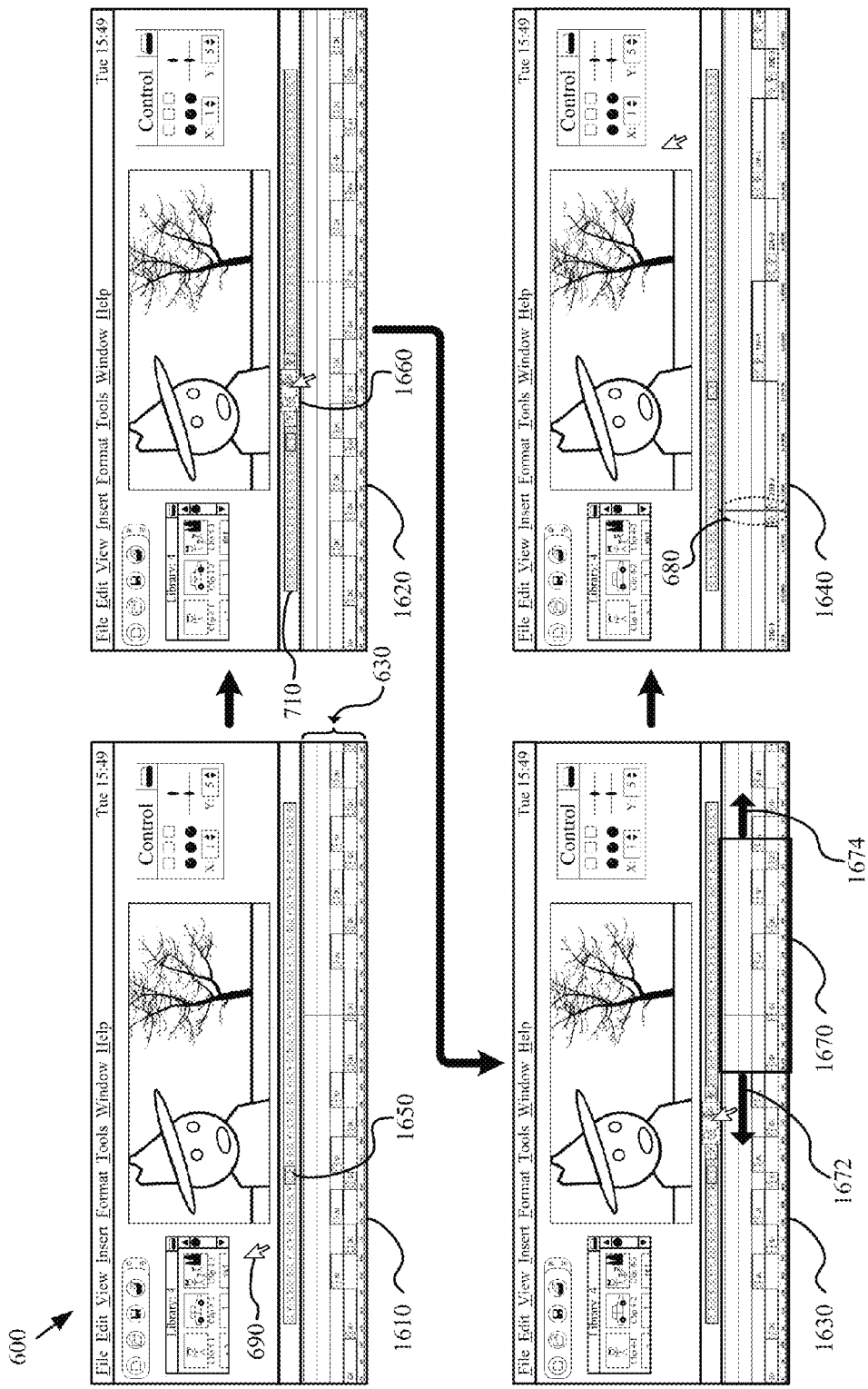
FIG. 16 illustrates another example of using the navigation tool of some embodiments to navigate to a particular location in a composite project.

FIG. 16 illustrates an example of using the navigation tool 710 of some embodiments to navigate to a particular location in a composite representation. FIG. 16 illustrates the same GUI 600 as described above in reference to FIGS. 6-8 and 11-13. In this example, a user navigates from one location in a composite representation to another location by using a cursor to select a navigation marker provided by the navigation tool of some embodiments. The example of FIG. 16 illustrates a zoom adjustment to the composite display area in addition to the scrolling described above in reference to FIG. 1. To illustrate the example of navigating from one location to another and adjusting the zoom of the composite display area using the navigation tool, FIG. 16 describes four different stages 1610-1640 of a user's interaction with the GUI 600.

FIG. 16 shows a first stage 1610 that is before the user has selected a navigation marker. In this stage, the composite display area 630 displays a location of the composite representation that is associated with previously-selected navigation marker 1650. As above, the selection of navigation marker 1650 has caused a change in the graphical representation of the selected navigation marker relative to the other navigation markers. Although the navigation marker 1650 is indicated as having been previously selected, in some cases the location of the composite representation shown in the composite display area may not necessarily correspond to the selected marker (e.g., when the user has manually navigated to a different location of the composite representation).

Returning to FIG. 15, process 1500 begins when a navigation marker is selected. For instance, the navigation marker may be selected as described above in reference to FIG. 1. In different embodiments, different actions, events, and/or other triggers may cause process 1500 to be performed. For instance, in some embodiments, the process is performed in response to a selection of a back or forward button as described above in reference to FIG. 2.

FIG. 16 further shows a second stage 1620 of user interaction that is after the user has positioned the cursor 690 over a particular navigation marker 1660 of the navigation tool 710. As shown, in this example, positioning the cursor over the particular navigation marker has caused a highlighting feature to display the particular navigation marker and several adjacent markers at a larger size than other navigation markers. Different embodiments may change the display of a navigation marker in different ways or not at all as the navigation marker becomes a candidate for selection by a user (e.g., when a user positions the cursor over the navigation marker). In this stage, the user selects the particular navigation marker 1660 in order to initiate the navigation. The user makes this selection by positioning the cursor 690 over the navigation marker 1660 and performing a click operation.

Returning to FIG. 15, process 1500 next retrieves (at 1510) location information corresponding to the selected navigation marker. As above, in some embodiments an alternative control (e.g., a back or forward button) initiates process 1500. In these cases, the process retrieves information corresponding to the option selected using the alternative control. The location information may include references to instances along a timeline of the composite representation, references to sections of the composite project, etc. Various examples of navigable locations were described above in reference to FIG. 9. In addition, various conceptual data structures that may be used to store the location information in some embodiments are described below in reference to FIG. 34.

After retrieving (at 1510) the location information, the process scrolls (at 1520) the composite display area to the navigable location associated with the selected navigation marker. Such scrolling may be performed in a similar manner to that described above in reference to the third stage 130 of FIG. 1.

The process then determines (at 1530) whether adjusting the zoom of the composite display area is necessary. In some embodiments, zoom adjustment may be performed based on various criteria (e.g., user preference, default selection, type of navigable location, etc.). When the process determines (at 1530) that adjusting the zoom is not necessary, the process continues to operation 1550, which is described below. Otherwise, the process adjusts (at 1540) the zoom of the composite display area to the appropriate viewing range. The appropriate viewing range may be based on the location information, as described above in reference to FIG. 9, or may be based on user preference, evaluation of the content at that location, or some other appropriate criteria. In addition to adjusting the scroll and/or zoom, some embodiments adjust the placement of the playhead when necessary. One such example of a scroll and zoom adjustment and placement of the playhead after selection of a navigation marker will be described below.

FIG. 16 shows a third stage 1630 of user interaction that is after the user has selected the particular navigation marker 1660. In this stage, the composite display area 630 is updated to present the navigable location 1670 associated with the particular navigation marker. The navigable location is highlighted by a bounding box. This bounding box is not displayed by the media editing application but rather is presented in FIG. 16 in order to identify the selected location in this figure. As shown, in this example the composite display area is scrolled from right to left as the display is updated. In addition, the zoom of the composite display area is adjusted such that the selected navigable location 1670 is enlarged to fill the entire composite display area. The third stage 1630 illustrates two arrows 1672 and 1674 to indicate that the scrolling and zooming is in midstream (i.e., it is before the composite display area has been fully updated to reflect the selected location). In this example, arrow 1672 is longer than arrow 1674, in order to indicate that the selected location is scrolled to the left as well as zoomed.

Some embodiments adjust the zoom such that the selected navigable location does not fill the entire composite display area (i.e., the zoom is adjusted such that the composite display area presents the selected navigable location and some portion of the composite representation adjacent to the selected navigable location area). In this manner, a user is able to view the selected navigable location in context within the composite representation.

Lastly, FIG. 16 shows a fourth stage 1640 of user interaction that is after the composite display area has been fully updated to present the navigable location 1670 associated with the particular navigation marker 1660. In addition, the navigation tool 710 has been updated to reflect the selection of the particular navigation marker 1660 (as indicated by the thicker border). As described above in reference to FIG. 9, the navigable location 1670 may be a clip, a point within the composite representation, a section of the timeline, a set of media clips, or some other appropriate navigable location of the composite representation.

In the example of FIG. 16, the playhead 680 has moved relative to the composite display area 630, however, as mentioned above, different embodiments may position the playhead at different locations or in different ways in response to the selection of a navigation marker. For instance, in some embodiments the playhead is automatically placed at a certain location in the composite display area (e.g., at the far left of the composite display area, at a particular offset from the far left of the composite display area, etc.). In other embodiments, the playhead is restored to a same location as the previous time that a user accessed the location corresponding to the selected navigation marker. In this manner, a user may navigate away from a particular location after positioning the playhead (e.g., by viewing a preview of the composite presentation) and then return to the particular location with the playhead at the same position. In still other embodiments, the playhead location is not affected by the selection of a navigation marker (i.e., the playhead remains at the same point within the composite representation as before the navigation marker was selected).

After adjusting (at 1540) the zoom of the composite display area, or determining (at 1530) that adjusting the zoom is not necessary, the process updates (at 1550) the display of the preview display area. Some embodiments automatically update the preview display area to reflect the content at the current location (e.g., the playhead location) of the composite representation. In different embodiments, the preview display area may be updated under different circumstances (e.g., when a new navigable location is selected, when the playhead position changes due to a navigation operation, etc.).

Next, the process displays (at 1560) an updated navigation tool to reflect the currently-selected location. The navigation tool may be updated as described above in reference to stage 1640 of FIG. 16. After updating (at 1560) the display, the process ends. In some embodiments, when process 1500 is performed as a sub-process of process 1000, after process 1500 ends, operation 1090 of process 1000 is performed as described above in reference to FIG. 10.

One of ordinary skill in the art will recognize that the operations of process 1500 are conceptual and may not necessarily be performed in the order shown. For instance, in some embodiments, the zoom of the composite display area may be adjusted before the composite display area is scrolled to the selected location. In addition, the process used to navigate to a location in the composite representation may not be invoked when a navigation control is selected. Instead, the process may begin when, for example, the navigation tool is invoked, as described above in reference to FIG. 7. Furthermore, different specific operations may be performed in different embodiments. Also, the process may not be performed as one continuous series of operations. In addition, the process could be implemented using several sub-processes, or as part of a larger macro-process. For example, in some embodiments, process 1500 is performed as a sub-process of process 1000.

Figure 17:
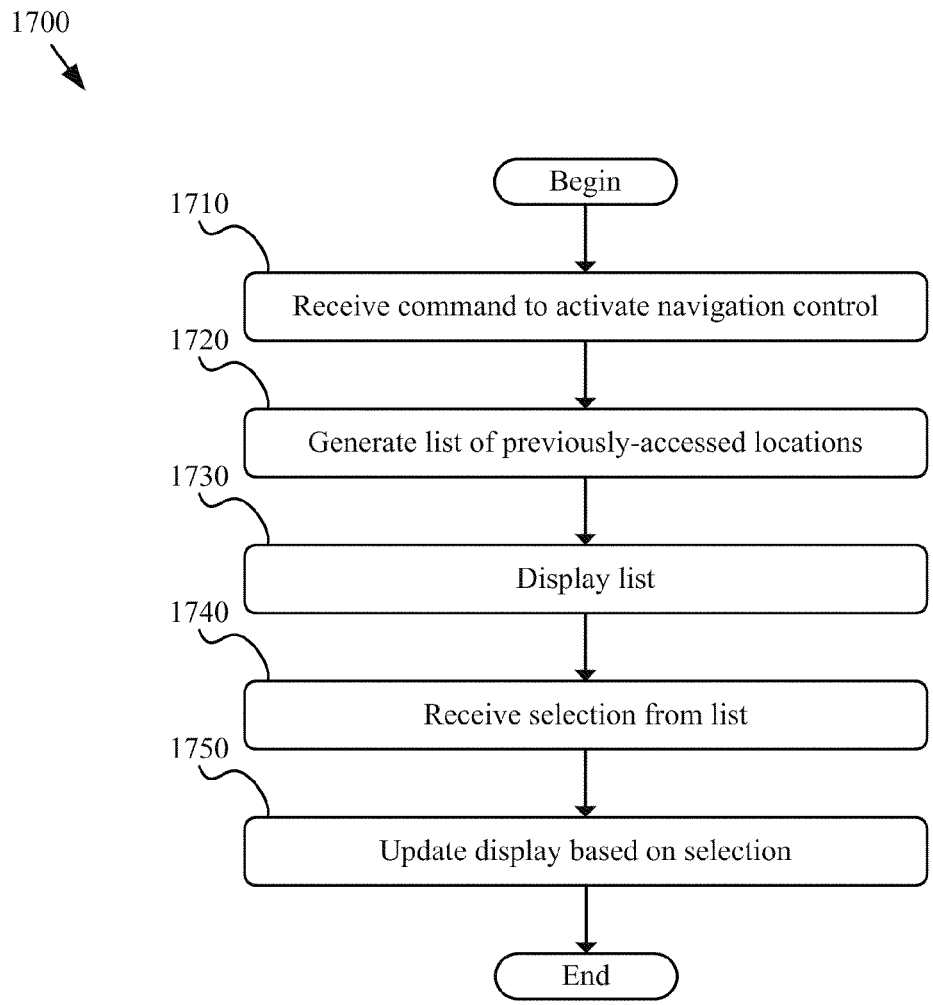
FIG. 17 illustrates an example of a conceptual process used by some embodiments to navigate to a previously-selected location in a composite project.

As described above in reference to FIG. 2, in some embodiments the navigation tool provides selectable controls that allow a user to navigate to different previously-selected locations within a composite representation. FIG. 17 conceptually illustrates an example of a process 1700 used by some embodiments to navigate to a previously-selected location in a composite representation. Process 1700 will be described by reference to FIG. 18 which illustrates an example user interface interaction.

Figure 18:
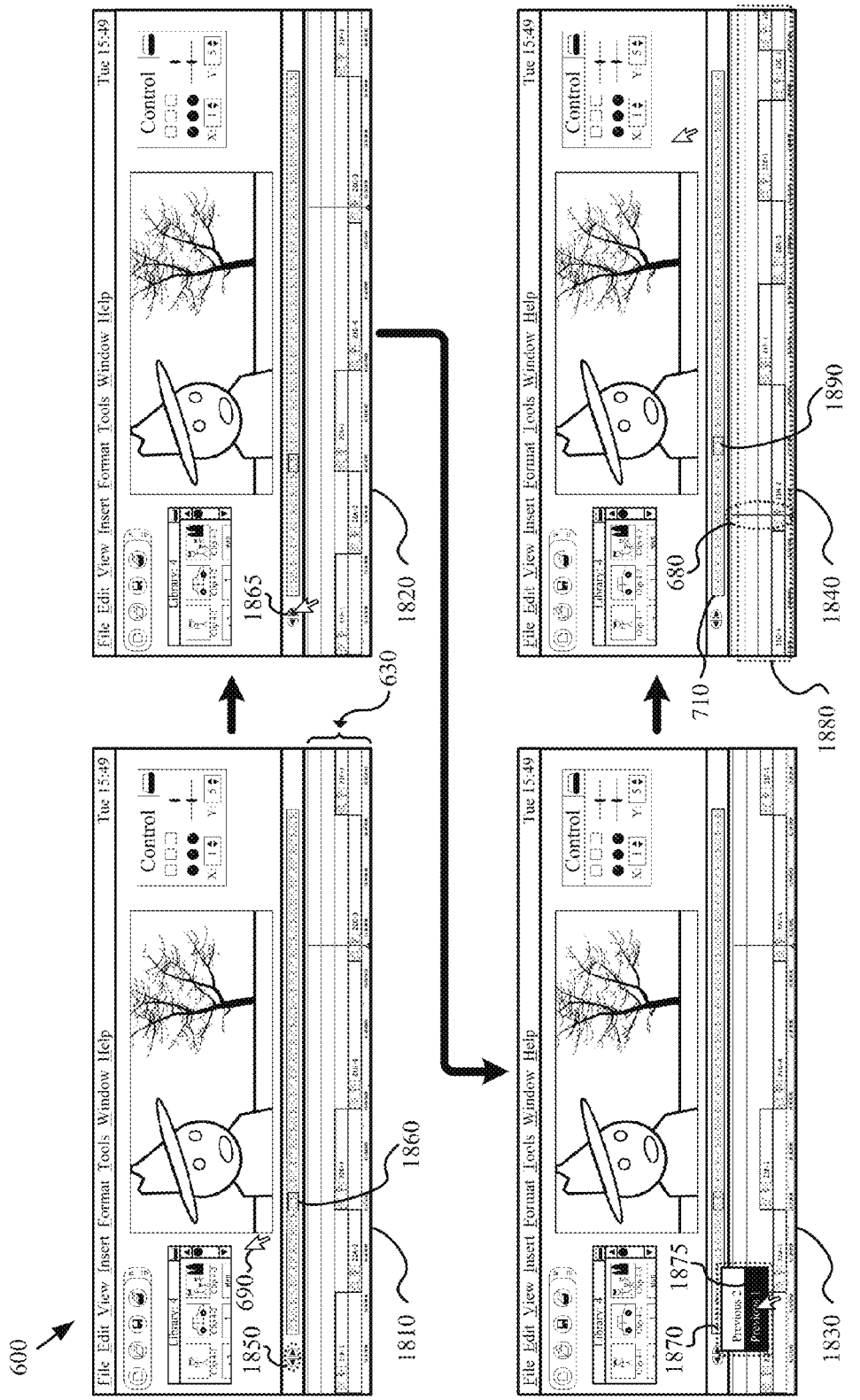
FIG. 18 illustrates another example of using the navigation tool of some embodiments to navigate to a previously-selected location in a composite project.

FIG. 18 illustrates an example of using the navigation tool 710 of some embodiments to navigate to a previously-selected location in a composite representation. FIG. 18 illustrates the same GUI 600 as described above in reference to FIGS. 6-8, 11-13, and 16. In this example, a user navigates from one location in a composite representation to another location by using a cursor to activate the navigation control provided by the navigation tool of some embodiments. In contrast to the example of FIG. 2, which used a "back" selection to trigger the control, the example of FIG. 18 uses a "forward" selection. To illustrate the example of navigating to a previously-selected location using the navigation tool, FIG. 18 describes four different stages 1810-1840 of a user's interaction with the GUI 600.

Returning to FIG. 17, in some embodiments, process 1700 begins when the navigation tool is activated. Other embodiments may initiate the process based on a menu selection, series of keystrokes, or some other appropriate criteria.

Next, the process receives (at 1710) a command to activate a navigation control. In some embodiments, such a navigation control may include a back button, a forward button, and/or other types of controls for navigating to previously-selected locations (e.g., a "home" button for causing the entire composite representation to be displayed in the composite display area). One example of such a navigation control and its activation is described below.

FIG. 18 shows a first stage 1810 that is before the user has activated a navigation control 1850. In this example, the navigation control 1850 includes (1) a backward arrow that allows a user to select previously selected navigation markers that were selected before a currently selected navigation location, and (2) a forward arrow that allows a user to select previously selected navigation markers that were selected after a currently selected navigation location. In some embodiments, a list of back and forward options is compiled based on previously-selected locations relative to the currently-selected locations.

In this stage, the composite display area 630 displays a location of the composite representation that is associated with previously-selected navigation marker 1860. As above, the selection of navigation marker has caused a change in the graphical representation of the selected navigation marker relative to the other navigation markers.

FIG. 18 further shows a second stage 1820 of user interaction that is after the user has moved the cursor 690 to a location over the navigation control 1850. In this stage, the user activates the navigation control forward button 1865 in order to initiate the navigation. The user may make this selection by, for example, performing a click operation when the cursor is over the navigation control. As shown, in this example, activating the navigation control has caused the control to be displayed with a darker background. Different embodiments change the display of the navigation control in different ways or not at all when a user activates the control (e.g., by showing the navigation control with a thicker border, changing the color of the navigation control, etc.).

Returning to FIG. 17, after receiving (at 1710) the command to activate the navigation control, the process generates (at 1720) a list of previously-accessed locations. The list may be generated by accessing data stored by the media editing application to retrieve a user's navigation history. Different embodiments may use different navigation histories. For instance, in some embodiments, the navigation history is based on the current media editing session (i.e., the history since the user has opened a composite project using the media editing application). In other embodiments, the navigation history is also based on one or more previous editing sessions. In some embodiments, the navigation history is retrieved by examining data structures used by the media editing application. Such data structures will be described in more detail in reference to FIG. 34 below.

In some embodiments, the list of previously-accessed locations is generated based on a relative hierarchy of previously-accessed locations. In addition, the list may depend on the navigation control activated at 1710 (e.g., whether the control was a back or forward button). As an example, a user may navigate to locations "A", "B", "C", and "D", in that order. If the user then activated a back button, the list of locations would include C, B, and A, in that order. In contrast, if the user had activated a forward button from location D, the list would be empty as D was the final location to which the user had navigated.

Continuing the above example, the user may elect to navigate back from location D to B. If the user then activated a back button, the list of options would include D and A, in that order. Alternatively, if the user had activated a forward button, the list of options would include C and D. Different embodiments may define such hierarchies in different ways. For instance, in the above example, the user did not navigate from B to D directly, however, D was presented as a forward option from B because of the path from B to C to D.

In some embodiments, only direct navigation paths may be presented as options. Thus, in the above example, a user may only be presented with location C as a forward option from location B. Location D would then be presented as a forward option from location C. The previously-accessed locations that are presented may depend on various criteria (e.g., a user selection, default selection, etc.).

After generating (at 1720) the list of previously-accessed locations, the process displays (at 1730) the list. Next, the process receives (at 1740) a selection from the list. The list may be displayed and the selection may be received in a similar way to that described below.

FIG. 18 shows a third stage 1830 of user interaction that is after the user has activated the forward button 1865 causing a pop-up menu 1870 to be displayed. In this stage, a user selects an option from the menu 1870. The pop-up menu includes several navigation options associated with several previously-selected locations. Different embodiments may present different numbers of options. In some embodiments, a particular number of options is presented to a user, while in other embodiments all previously-selected locations may be presented as options. In some embodiments, the previously-selected location that was selected when displaying the current location is displayed at the top of the pop-up menu. Alternatively, in some embodiments no pop-up menu is displayed (e.g., when there is only one navigation option, based on a user election, etc.). In cases where no pop-up menu is displayed, the last previously-selected location may be selected based only on the activation of the forward button 1865.

In this example, as indicated by the darker background, the user selects the "previous 1" option 1875 by performing a cursor click operation when the cursor is positioned over the desired option. In cases where no pop-up menu is displayed, the last previously-selected location may be selected based on the activation of the forward button 1865.

Returning to FIG. 17, process 1700 then updates (at 1750) the display of the GUI based on the selection. After updating the display, the process ends. One example display update is described below.

Lastly, FIG. 18 shows a fourth stage 1840 of user interaction that is after the composite display area has been updated to present the navigable location 1880 associated with the selected option 1875. The update of the composite display area may be performed in a similar manner to that described above in reference to stage 1630 of FIG. 16. As shown in FIG. 18, in this example the navigation tool 710 has been updated to indicate the navigation marker 1890 associated with the navigable location 1880 (as indicated by the thicker border). As described above in reference to FIG. 9, the navigable location 1880 may be a clip, a point within the composite representation, a section of the timeline, a set of media clips, or some other appropriate navigable location of the composite representation. In the example of FIG. 18, the playhead 680 has moved relative to the composite display area 630, however, as described above in reference to FIG. 16, different embodiments may position the playhead at different locations or in different ways in response to the selection of a navigation marker.

One of ordinary skill in the art will recognize that the operations of process 1700 are conceptual and may not necessarily be performed in the order shown. For instance, in some embodiments, the list of previously-accessed locations may be compiled as the locations are selected, before a command is received to activate the navigation control. Furthermore, different specific operations may be performed in different embodiments. For instance, operations 1730 and 1740 may not be performed when the list of previously-accessed locations includes only one location. Also, the process may not be performed as one continuous series of operations. In addition, the process could be implemented using several sub-processes, or as part of a larger macro-process. For example, in some embodiments, process 1700 may be performed as a sub-process of a process similar to process 1500. As another example, in some embodiments, a process similar to process 1500 may be executed by process 1700 to update (at 1750) the display based on the selection.

Although several examples above and below describe particular operations, features, etc., one of ordinary skill in the art will recognize that different embodiments may perform different operations, present different features, or otherwise differ from the examples given. For instance, although many operations are described as being performed using a cursor, one of ordinary skill in the art will recognize that these operations could also be performed using a set of keystrokes, making one or more pop-up or pull-down menu selections, or various other ways (e.g., a combination of cursor movement and keystrokes, activation of a hotkey, etc.).

In addition, although the examples above and below may show various specific changes in display appearance of different GUI elements, one of ordinary skill in the art will recognize that different embodiments may change the display in different ways. For instance, while many examples shows a selected item as having a thicker border than other, non-selected items, one of ordinary skill in the art will recognize that selected items could be indicated in various other ways (e.g., changes in background, changes in color saturation, changes in contrast, etc.). Furthermore, although various examples above and below show various combinations of media clips, different embodiments may include various different media items than those shown (e.g., digital pictures, special effects, overlay text, etc.).

II. Quick-Access Media Clip Insertion

Figure 19:
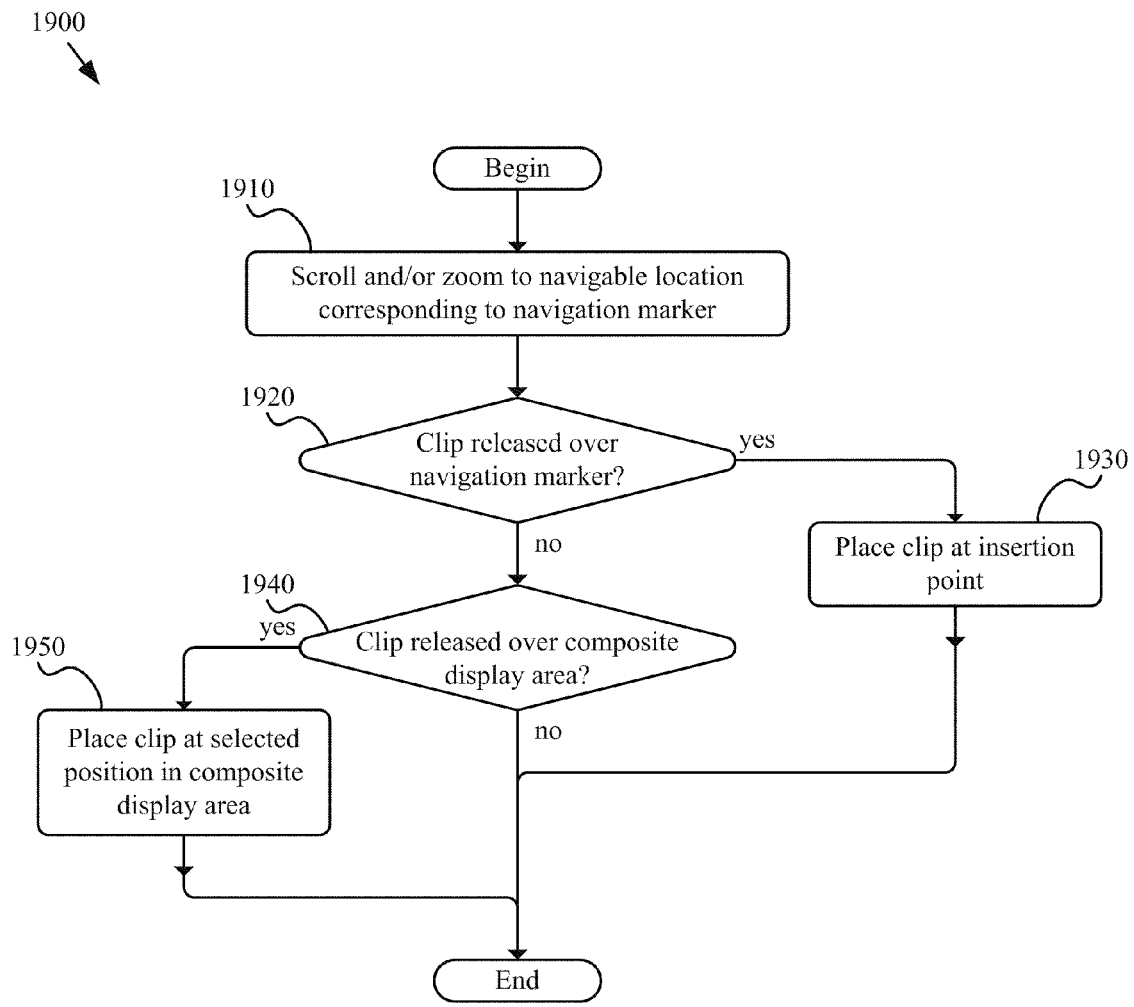
FIG. 19 illustrates an example of a conceptual process that some embodiments use to place media in a composite presentation using the navigation tool.

As described above in reference to FIG. 3, in some embodiments the navigation tool allows a user to navigate to a particular location in a project in order to insert a media clip near that location. FIG. 19 conceptually illustrates an example of a process 1900 used by some embodiments use to add media clips to a composite presentation in conjunction with the navigation tool. Process 1900 will be described by reference to FIGS. 20-21 which illustrate an example user interface interaction.

Figure 20:
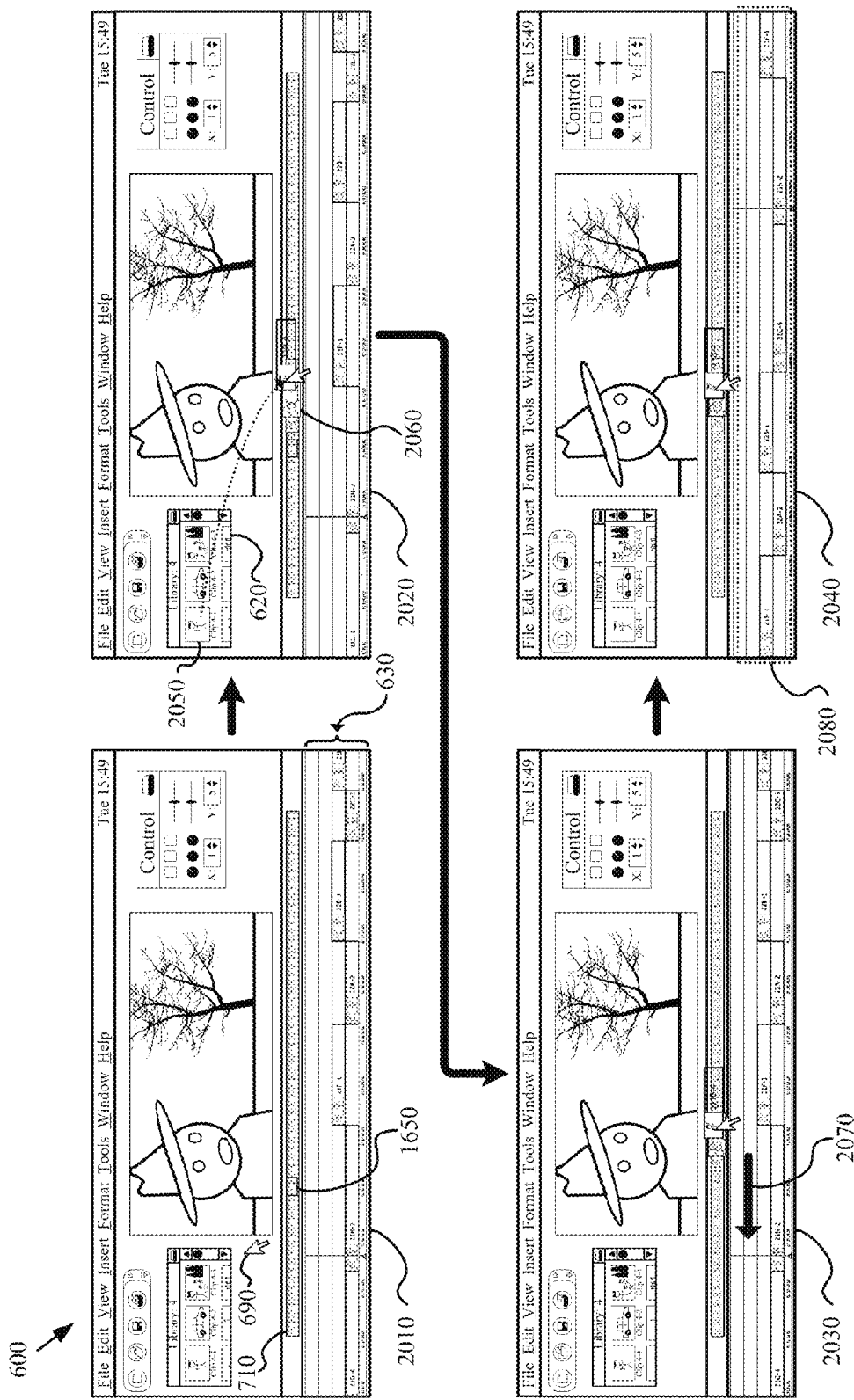
FIG. 20 illustrates an example of using the navigation tool of some embodiments to navigate to a particular location in a composite media project in order to add content to the composite presentation at or near the particular location.

FIG. 20 illustrates an example of using the navigation tool 710 of some embodiments to navigate to a particular location in a composite project in order to add content to the presentation at or near the particular location. In this example, a user navigates from one location in a composite representation to another location by using a cursor to select a media clip for addition to the composite representation and dragging the media clip to a location over a navigation marker provided by the navigation tool of some embodiments. FIG. 20 illustrates the same GUI 600 as described above in reference to FIGS. 6-8, 11-13, 16, and 18. To illustrate the example of navigating to a particular location using the navigation tool in this manner, FIG. 20 describes four different stages 2010-2040 of a user's interaction with the GUI 600.

Returning to FIG. 19, process 1900 begins when a user selects a media clip from the media library and drags the clip to a location over a particular navigation marker of the navigation tool. The user may perform these operations in a similar manner to that described below.

FIG. 20 shows a first stage 2010 that is before the user has selected the content to add. In this stage, the composite display area 630 displays a location of the composite representation that is associated with previously-selected navigation marker 1650.

FIG. 20 further shows a second stage 2020 of user interaction that is after the user has selected a media clip 2050 from the media library 620 by moving the cursor 690 to a location over the clip and performing a click operation. In addition, the user has moved the clip to a location over a particular navigation marker 2060 of the navigation tool 710 using the cursor 690. As shown, this action has caused the particular navigation marker 2060 to be enlarged and highlighted in order to indicate that the marker has been selected. In this stage 2020, the user holds the clip 2050 at a location over the particular navigation marker 2060 in order to initiate the navigation. Different embodiments initiate the navigation in different ways (e.g., by selecting a media clip and performing one or more keystroke commands to navigate to the desired location, by selecting a clip and dragging the clip over a back or forward control, etc.).

Process 1900 then scrolls and/or zooms (at 1910) to the navigable location corresponding to the particular navigation marker. The scroll and zoom may be performed as described below.

FIG. 20 also shows a third stage 2030 of user interaction that is after the user has initiated the navigation to the location associated with the particular navigation marker 2060. In this stage, the composite display area 630 is updated to present the navigable location associated with the particular navigation marker. The third stage 2030 illustrates an arrow 2070 to indicate that the scrolling is in midstream.

Lastly, FIG. 20 shows a fourth stage 2040 of user interaction that is after the composite display area has been updated to present the navigable location 2080 associated with the particular navigation marker 2060. In addition, the navigation tool 710 has been updated to reflect the selection of the particular navigation marker 2060 (as indicated by the thicker border). The example of FIG. 20 is continued in FIG. 21 below.

Process 1900 then determines (at 1920) whether the clip has been released over the particular navigation marker. When the process determines that the clip has been released, the process places (at 1930) the clip at a particular insertion point. Otherwise, the process continues to operation 1940, described below. In some embodiments, the insertion point may be based on the location of the playhead or at the end of the section of the composite representation displayed in the composite display area. Different embodiments may use different insertion points. For instance, some embodiments may set the insertion point at the beginning of the section of the composite representation displayed in the composite display area. As another example, some embodiments may set the insertion point based on a marker or other indication placed by the user. After placing (at 1930) the clip at the insertion point, the process ends. Such placement by releasing the clip over a navigation marker is described below.

Figure 21:
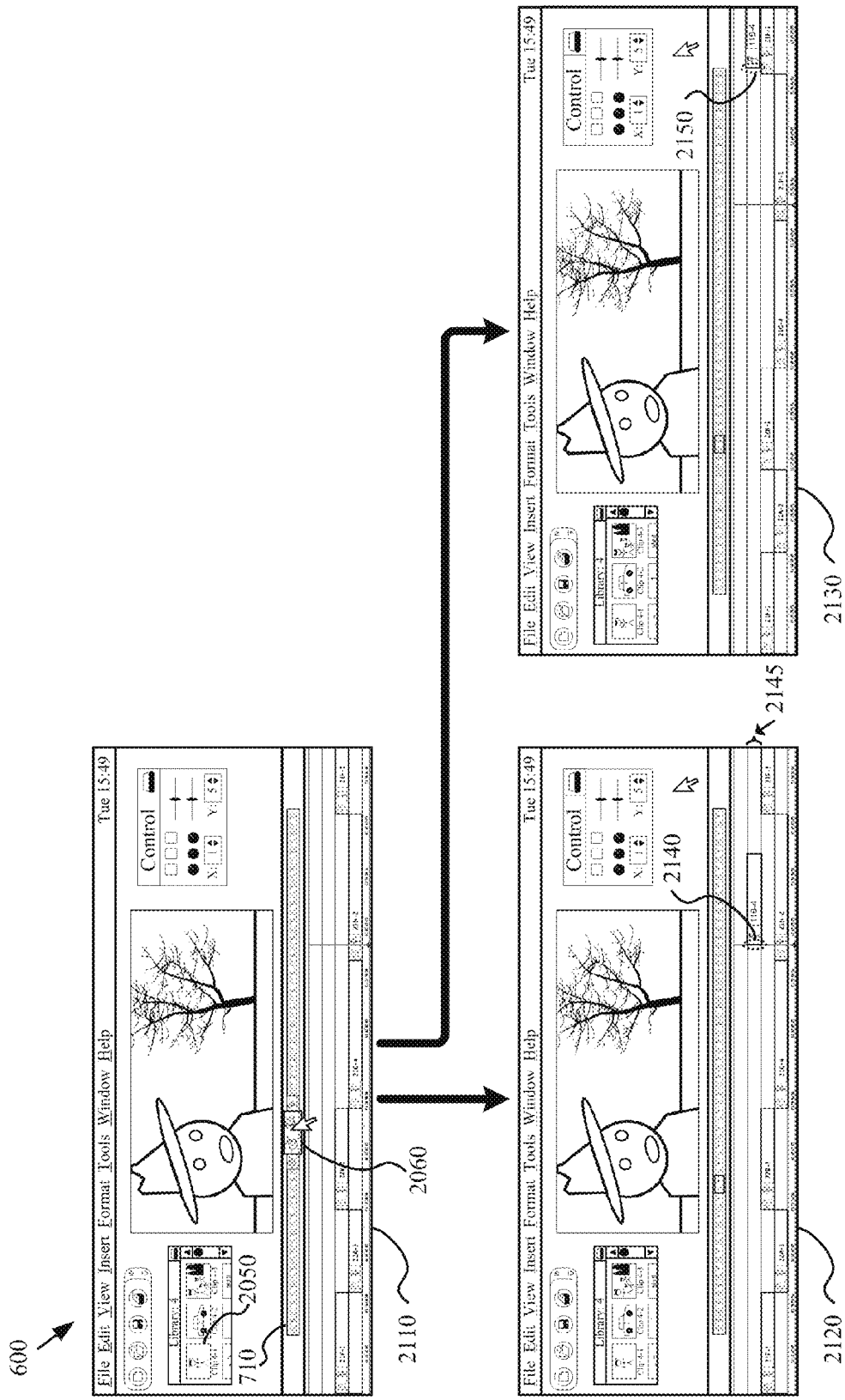
FIG. 21 illustrates an example of adding content to a composite presentation after using the navigation tool of some embodiments to navigate to a particular location in a composite project.

FIG. 21 illustrates an example of adding content to a composite presentation after using the navigation tool 710 of some embodiments to navigate to a particular location in the composite project. In this example, after a user has navigated from one location in a composite representation to another location as in the example of FIG. 20, the user releases the content over the particular navigation marker 2060. FIG. 21 illustrates the same GUI 600 as described above in reference to FIGS. 6-8, 11-13, 16, 18, and 20. The example of FIG. 21 continues the example of FIG. 20 and describes an alternative way to add media content than that described above in reference to FIG. 3. To illustrate the example of adding content to a composite presentation after using the navigation tool to navigate to a desired location, FIG. 21 describes three different stages 2110-2130 of a user's interaction with the GUI 600.

FIG. 21 shows a first stage 2110 that follows stage 2040 described above in reference to FIG. 20. In this stage 2110, the user releases the selected media clip 2050 at a location over the particular navigation marker 2060 of the navigation tool 710. In this example, the release is indicated by removing the clip representation of media clip 2050 from the display over the navigation marker 2060.

FIG. 21 also shows a second stage 2120 of user interaction that is after the user has released the selected media clip 2050 at a location over the particular navigation marker 2060. In this stage, the navigation tool 710 is updated to reflect that the cursor has moved to a location away from the navigation tool. In addition, the clip 2050 has been placed at the location 2140 of the playhead. Different embodiments place the clip at different locations. For instance, instead of placing the clip at the playhead location, some embodiments place the clip at another reference point (e.g., an insertion point previously set by the user, a location at the beginning of the section displayed in the composite display area, etc.).

In this example, the clip has been placed in a particular track 2145. Different embodiments may specify such a track in different ways. For instance, in some embodiments a user may select a particular track before selecting the clip to add to the project. As another example, in some embodiments a track is automatically selected (i.e., without intervention from the user) in various ways (e.g., by selecting a track that is not occupied at the playhead location, by adding a new track that includes no other clips, etc.). In some cases, the insertion of a clip affects other clips that were previously included in the composite representation. For instance, in cases where the inserted clip overlaps an existing clip in a track, the existing clip may be moved or trimmed such that there is no overlap.

Lastly, FIG. 21 shows an alternative second stage 2130 of user interaction that is after the user has released the clip 2050 at a location over the particular navigation marker 2060 in the first stage 2110. In the alternative second stage 2130, the navigation tool 710 is updated to reflect that the cursor has moved to a location away from the navigation tool. In addition, the clip 2050 has been placed at a location 2150 at the end of the section of the composite representation displayed in the composite display area. Some embodiments place the clip at such a location when no other location has been specified (e.g., when the playhead is not visible in the composite display area, when no insertion point has been previously selected by the user, etc.).

Different embodiments may determine the location at the end of the section in different ways. For instance, some embodiments add the clip at a location that is after the end of any other clip in the section. As another example, some embodiments add the clip at a location such that the entire clip is included in the section, such as when the navigable location includes a begin point and an end point. As yet another example, some embodiments add the clip at a location such that the entire clip is visible in the composite display area.

In different embodiments, the determination of whether to add the clip at the playhead location or a location at the end of the section (or elsewhere) is based on different criteria. For instance, in some embodiments a user may be prompted to select an option for placement (e.g., through a pop-up menu) after releasing the clip at a location over a navigation marker. As another example, in some embodiments a user may perform a series of keystrokes to specify where the clip will be inserted. As still another example, in some embodiments a default selection may be made based on the position of the playhead, the length of the clip, the area displayed in the composite display area, available track space, and/or other factors.

Returning to FIG. 19, when the process determines (at 1920) that the clip has not been released over the navigation marker, the process then determines (at 1940) whether the clip was released over the composite display area. When the process determines that the clip was released over the composite display area, the process places (at 1950) the clip at the selected position in the composite display area. Otherwise, or after placing the clip at the selected position in the composite display area, the process ends. In some embodiments, the clip may be placed at the selected position in the composite display area as described above in reference to FIG. 3. When the clip is released at a location of the GUI that is not over the navigation marker or the composite display area (e.g., over a media library pane), no action is taken by process 1900.

One of ordinary skill in the art will recognize that the operations of process 1900 are conceptual and may not necessarily be performed in the order shown. For instance, in some embodiments, the process may determine whether a clip was released over the composite display area before determining whether the clip was released over a navigation marker. As another example, in some cases a user may move the selected clip over different navigation markers without releasing the clip, thus causing operation 1910 to be repeated several times before proceeding. Furthermore, different specific operations may be performed in different embodiments. For instance, some embodiments update the image shown in the preview display area to reflect the content of the clip added to the composite display area. Also, the process may not be performed as one continuous series of operations. In addition, the process could be implemented using several sub-processes, or as part of a larger macro-process.

Although using the navigation tool to add media at particular locations of the composite project has been described with reference to certain details, one of ordinary skill in the art will recognize that different embodiments may achieve the same result in different ways. For instance, in some embodiments a user may select a particular navigation marker and then perform a cursor click operation over a clip in the media library to cause the clip to be inserted at the playhead location, or at a location at the end of the section of the composite representation displayed in the composite display area.

III. Version Management Feature

Some embodiments provide a version management feature that allows a user to manage versions of different sections of a project. In some embodiments, version management is provided in conjunction with the navigation tool. Other embodiments may employ the version management feature without employing the navigation tool, or without employing the version management feature in conjunction with the navigation tool. Sub-section III.A describes the display of available versions using the version management feature in conjunction with the navigation tool in some embodiments. Next, sub-section III.B describes the use of the version management feature to access the available versions. Sub-section III.C then describes the creation of new versions, the deletion of existing versions, and the management of temporary versions. Lastly, sub-section III.D describes using the version management feature to control collaboration among users.

A. Display of Available Versions

Figure 22:
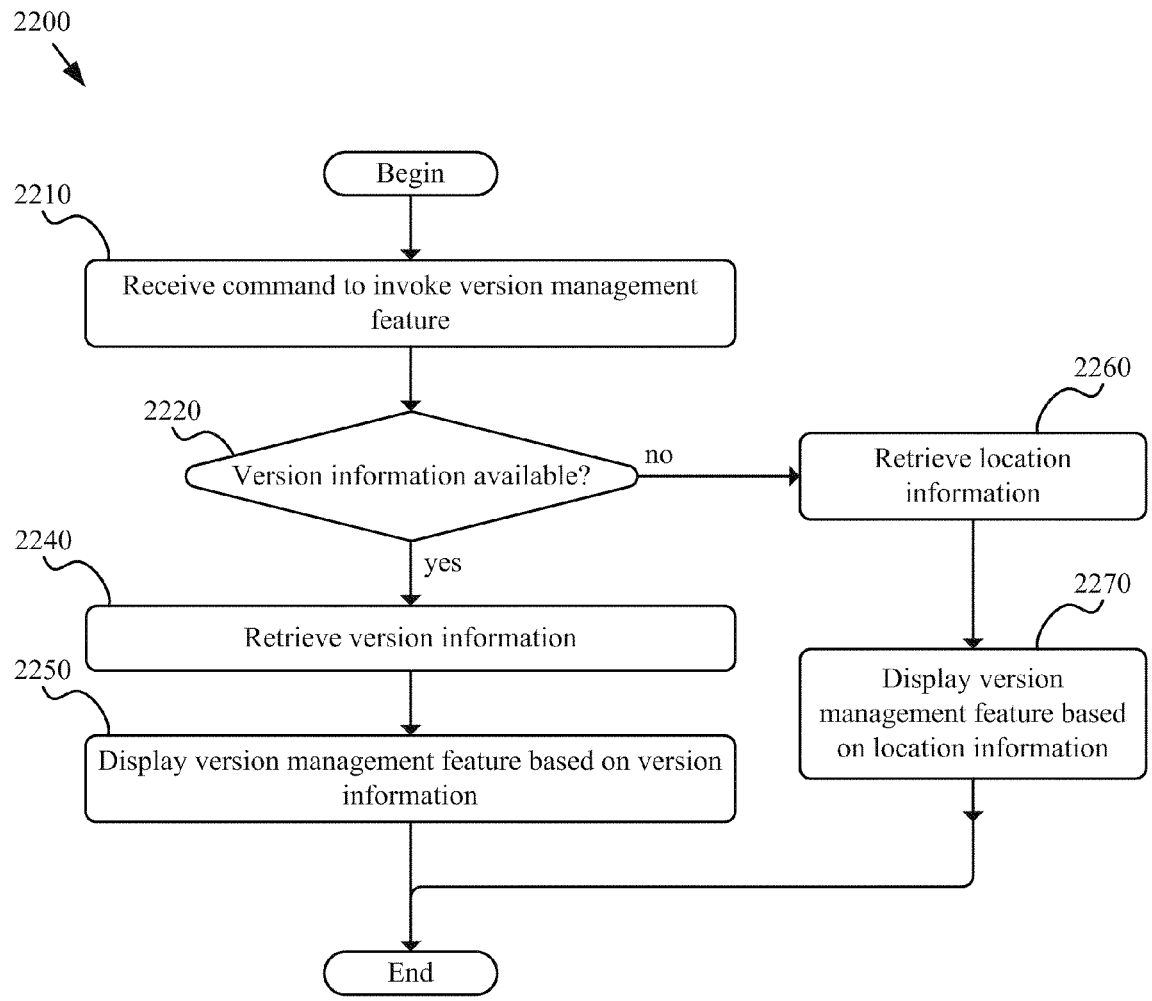
FIG. 22 illustrates an example of a conceptual process that some embodiments use to invoke the version management feature.

As described above in reference to FIG. 4, in some embodiments the version management feature allows a user to view available versions of project locations. FIG. 22 conceptually illustrates an example of a process 2200 some embodiments use to invoke the version management feature. Process 2200 will be described by reference to FIGS. 23-25 which illustrate several examples of version management features.

The process begins when a media editing application that includes the navigation tool is launched. Next, the process receives (at 2210) a command to invoke the version management feature. This command could be received automatically (e.g., the media editing application may invoke the version management feature at start-up, when a project is loaded, etc.). Alternatively, a user may invoke the navigation tool using, for example, a GUI button, a menu selection, etc.

Process 2200 then determines (at 2220) whether version information is available for the project. In some cases, the project will include information regarding versions (e.g., a list of thumbnail images, names of versions, etc.) and the navigable location associated with each version, if any. Conceptual data structures used by some embodiments will be described in more detail in reference to FIG. 34 below. When process 2200 determines that version information is available, the process retrieves (at 2240) the version information for the project. Otherwise, the process proceeds to operation 2260, described below. After retrieving (at 2240) the version information, the process displays (at 2250) the version management feature based on the version information. The displayed version management feature may be similar to those described below in reference to FIGS. 23-25. After displaying the version management feature, the process ends.

When process 2200 determines (at 2220) that version information is not available for the project, the process retrieves (at 2260) location information for the project, if available. In some embodiments, this location information would have been previously retrieved (e.g., in order to invoke the navigation tool). When the location information is not available, some embodiments generate the information as described above in reference to operation 1040 of process 1000.

After retrieving or generating the location information, the process displays (at 2270) a version management feature based on the location information (i.e., an initial version is generated for each location). The displayed version management feature may be similar to the examples described below in reference to FIGS. 23-25. In cases where the version management feature is generated from a set of images, some embodiments use a process similar to 1400 described in reference to FIG. 14 above to generate the version management feature. After displaying the version management feature, the process ends.

Figure 23:
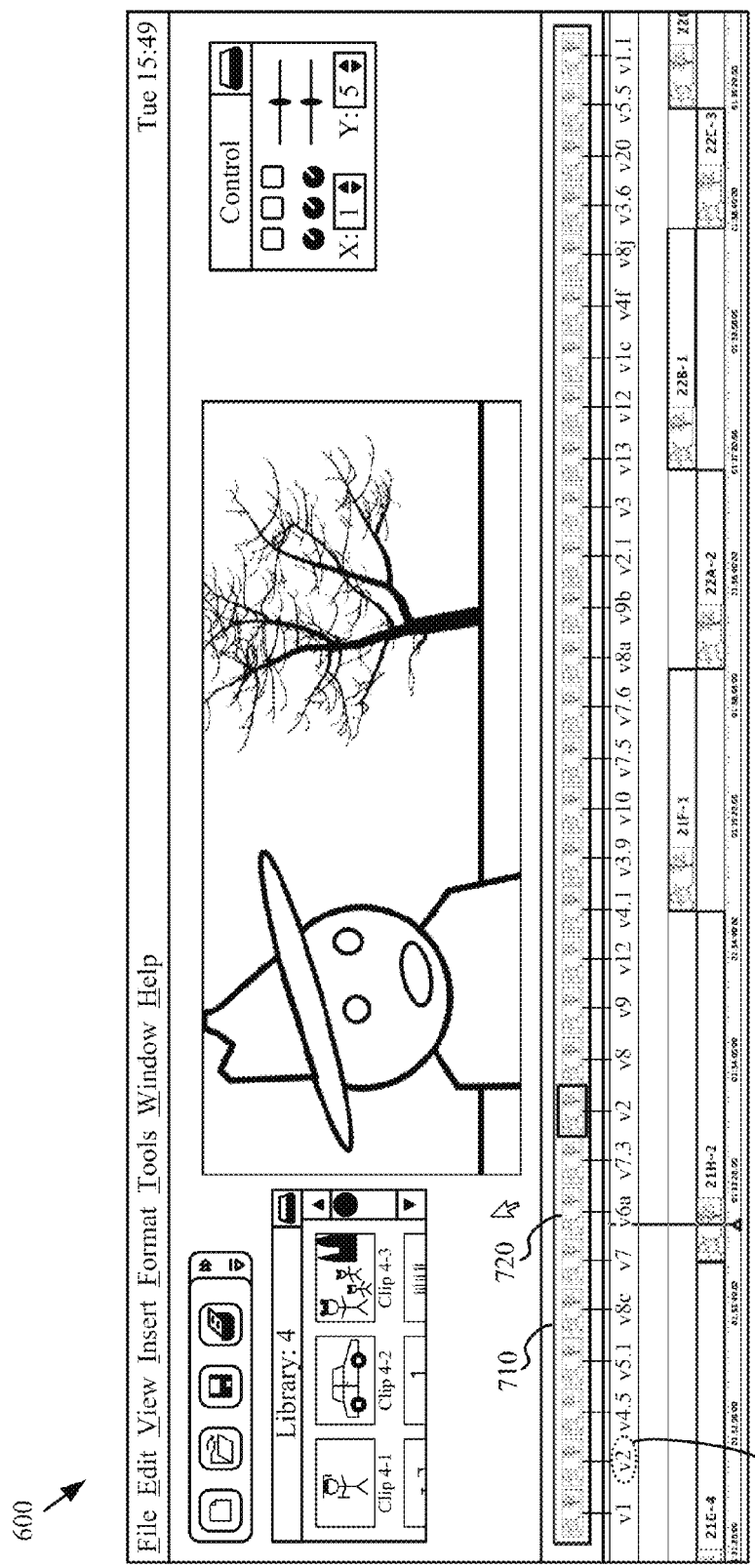
FIG. 23 illustrates an example GUI of a media editing application of some embodiments.

FIG. 23 illustrates an example GUI 600 of a media editing application of some embodiments. Specifically, this figure shows a GUI that includes a version management feature provided in conjunction with navigation tool 710. The GUI 600 is the same GUI described above in reference to FIGS. 6-8, 11-13, 16, 18, and 20-21. As shown, in addition to the elements described above in reference to FIG. 7, the GUI 600 of FIG. 23 includes the version management feature for managing versions of different locations of the composite project.

As described above in reference to FIG. 9, such a location may be a clip, a point within the composite representation, a section of the timeline, a set of media clips, or some other appropriate location of the composite representation. Thus, each version may correspond to a particular clip, point within the composite representation, section of the timeline, set of media clips, or other type of navigable location. In addition, multiple different versions may be associated with a single navigable location. For instance, a version of a navigable location may include the same underlying content as another version of that location but with different parameters or properties (e.g., clip start time, clip end time, etc.). Furthermore, the use of the version management feature need not necessarily be associated with any navigable location. For instance, versions could refer to audio and/or video settings that are applied across several navigable locations and/or portions of navigable locations. As another example, versions could refer to clips or sets of clips that are not associated with any navigable locations (e.g., when a media editing application does not include a navigation tool).

In the example of FIG. 23, the version management feature includes various version tags 2310 associated with each of the navigation markers 720 in order to provide version information to a user regarding the navigable locations associated with the markers. In some embodiments, the labels are displayed when a user activates the labels (e.g., by selecting a menu option, performing one or more keystroke commands, performing a cursor control operation, etc.). Different embodiments display the labels in different ways (e.g., as text over the navigation markers, as a list, etc.) or not display the labels at all. In some embodiments, although the labels may not be displayed as shown, each navigation marker nonetheless corresponds to a particular version.

Figure 24:
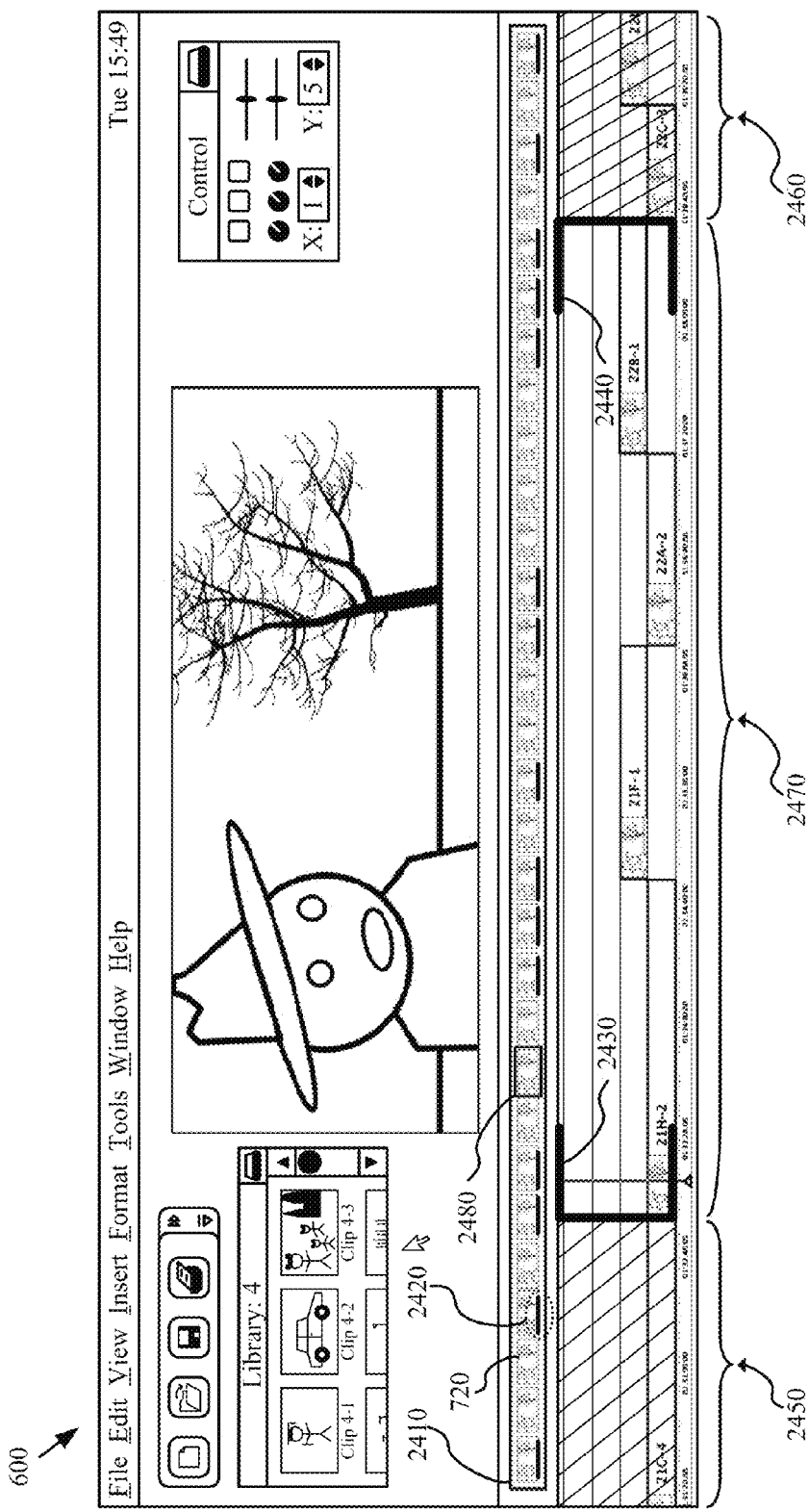
FIG. 24 illustrates another example GUI of a media editing application of some embodiments.

FIG. 24 illustrates another example GUI 600 of a media editing application of some embodiments. Specifically, this figure shows a GUI that includes a navigation tool 2410 with another version management feature of some embodiments. The GUI 600 is the same GUI described above in reference to FIGS. 6-8, 11-13, 16, 18, 20-21, and 23. As shown, the GUI in this example includes a navigation tool 2410 with version management. In addition to the features described above, the GUI includes version indicators 2420 associated with some of the navigation markers 720, location boundary indicators 2430-2440, and buffer areas 2450-2460.

As in the example of FIG. 4, the version indicators 2420 of some embodiments provide a visual indication that the location of the composite project corresponding to the associated navigation marker includes multiple available versions. In addition, some embodiments may use the version indicators 2420 to show that the location of the composite project corresponding to the associated navigation marker has been modified since the last version was saved. For instance, in some cases, the version indicators that correspond to locations modified since the last version save may be displayed using a first color while the version indicators that correspond to locations that include multiple available versions may be displayed using a second color. Different embodiments differentiate the version indicators in different ways (e.g., by using different shapes, by using different shapes for the version indicators, etc.).

The location boundary indicators 2430-2440 delineate a sub-area 2470 of the composite display area that corresponds to the location associated with the selected navigation marker 2480. The buffer areas 2450-2460 display media outside the selected navigable location in order to allow a user to view the selected location in context. Different embodiments display the boundary indicators 2430-2440 or buffer areas 2450-2460 in different ways or not at all. For instance, some embodiments display the navigable location using the entire composite display area such that no buffer areas or boundary indicators are displayed.

In some embodiments, the sub-area is automatically scrolled and/or zoomed to only include content that is part of the selected location. The sub-area may also display content that is not included in the selected location in some embodiments (e.g., when a user manually scrolls the composite display area). The buffer areas 2450-2460 typically display content that is not included in the selected location (and associated version, if any). However, in some embodiments, the buffer areas may show content that is included in the selected location. In addition, although the buffer areas are shown as partially obscured, in some embodiments a user may nonetheless manipulate clips in those areas.

Different embodiments activate the version indicators 2420 in different ways. For instance, some embodiments display the version indicators when a user makes a selection from a menu, activates a button, or performs some explicit action. As another example, in some embodiments, the version indicators are displayed whenever version information is available for a project. In this example, the version indicators are shown as bold lines under the associated navigation markers, but different embodiments may use different version indicators (e.g., indicators that are associated with locations along the composite display area instead of the navigation markers) or not display version indicators.

As with the version indicators, the boundary indicators 2430-2440 and buffer areas 2450-2460 may be activated in various ways in various different embodiments. In this example, the boundary indicators are shown as bold brackets placed over the composite display area, but different embodiments may represent the boundary indicators in different ways (e.g., markers placed along the timeline, a separate composite display area, etc.) or not display boundary indicators. The buffer areas are represented as partially obscured through a diagonal pattern. Different embodiments may display the buffer areas in different ways (e.g., as differently colored areas of the composite display area, as partially obscured, etc.) or not display buffer areas.

Figure 25:
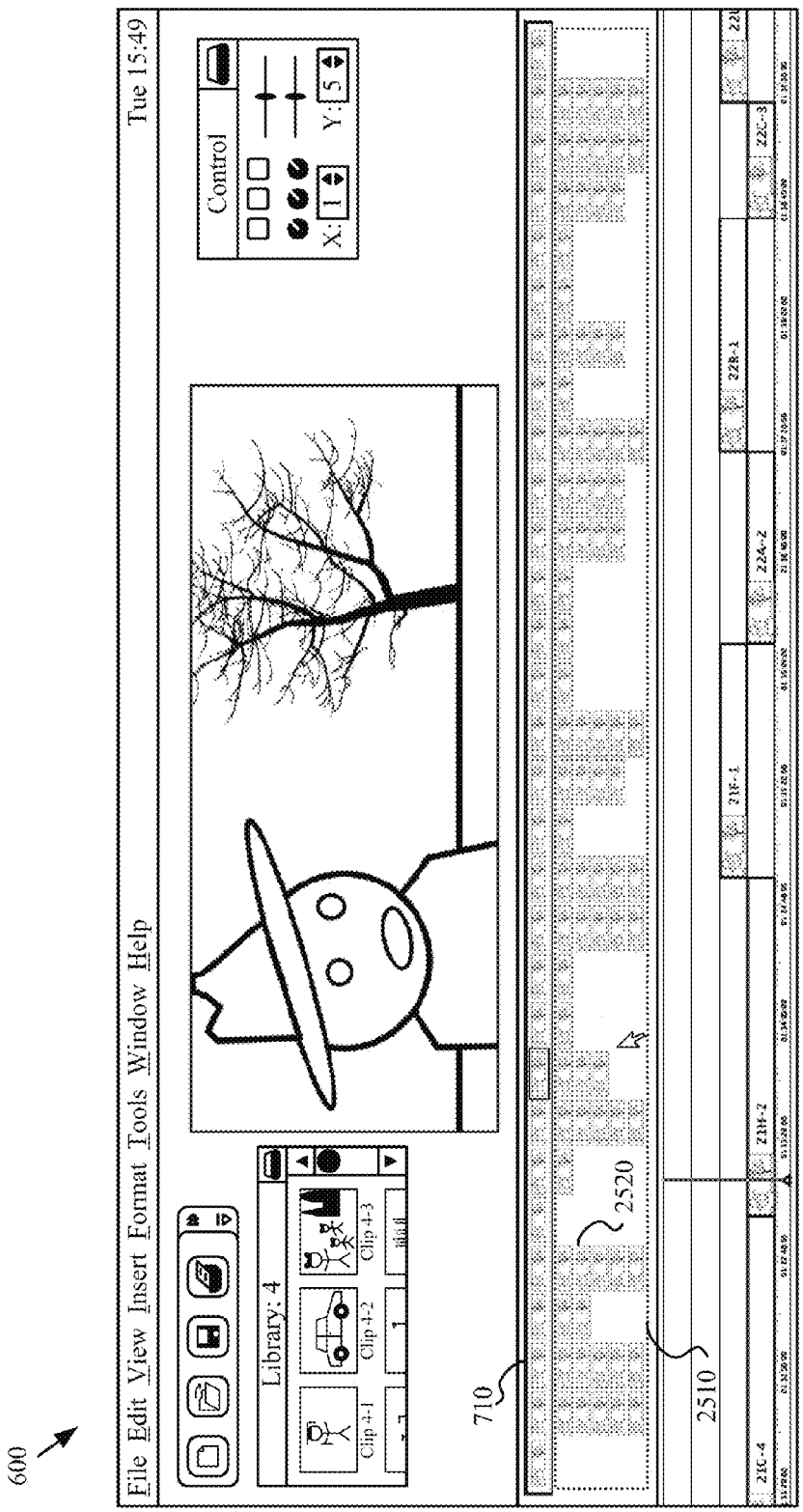
FIG. 25 illustrates another example GUI of a media editing application of some embodiments.

FIG. 25 illustrates another example GUI 600 of a media editing application of some embodiments. Specifically, this figure shows a GUI that includes a navigation tool 710 with a version display area 2510 provided by the version management feature of some embodiments. The GUI 600 is the same GUI described above in reference to FIGS. 6-8, 11-13, 16, 18, 20-21, and 23-24. In addition to the features described above, the GUI includes a version display area 2510 for providing a visual summary of the various available versions for all locations corresponding to the navigation markers in the navigation tool. In this example, the version display area includes various thumbnail images 2520 that serve as selectable version markers associated with different navigable locations of the composite representation.

Different embodiments may use different markers (e.g., textual, graphical, etc.). In some embodiments, a user may customize the presentation of the version display area 2510 by selecting the desired type of marker from a set of available options. In addition, the version display area of some embodiments may display labels associated with each of the version markers for providing information to a user regarding the versions associated with the markers.

Different embodiments may activate the version display area 2510 in different ways. For instance, some embodiments display the version display area when a user makes a selection from a menu, activates a button, or performs some other explicit action. In some embodiments, the version display area may be displayed whenever version information is available for a project.

One of ordinary skill in the art will recognize that actual implementations of various media editing applications may differ from the conceptual representations shown in FIGS. 23-25. For instance, a particular implementation may include version management without including a navigation tool. In such cases, the version indicators may be associated with different GUI elements (e.g., a list, markers along the timeline, indications in the composite display area, etc.). In addition, although various examples above and below may show specific controls, selection options, etc., one of ordinary skill in the art will recognize that other specific controls, selection options, and/or other components may be implemented in various different ways. For instance, some embodiments may not display buffer areas or boundary indicators, or may only display such elements based on a user selection. As another example, some embodiments may include back/forward navigation controls for selecting among versions.

In addition, one of ordinary skill in the art will recognize that the operations of process 2200 are conceptual and may not necessarily be performed in the order shown. For instance, in some embodiments, the process may retrieve location and/or version information (if available) before receiving a command to invoke the version management feature tool. Furthermore, different specific operations may be performed in different embodiments. Also, the process may not be performed as one continuous series of operations. In addition, the process could be implemented using several sub-processes, or as part of a larger macro-process.

B. Accessing Saved Versions

Figure 26:
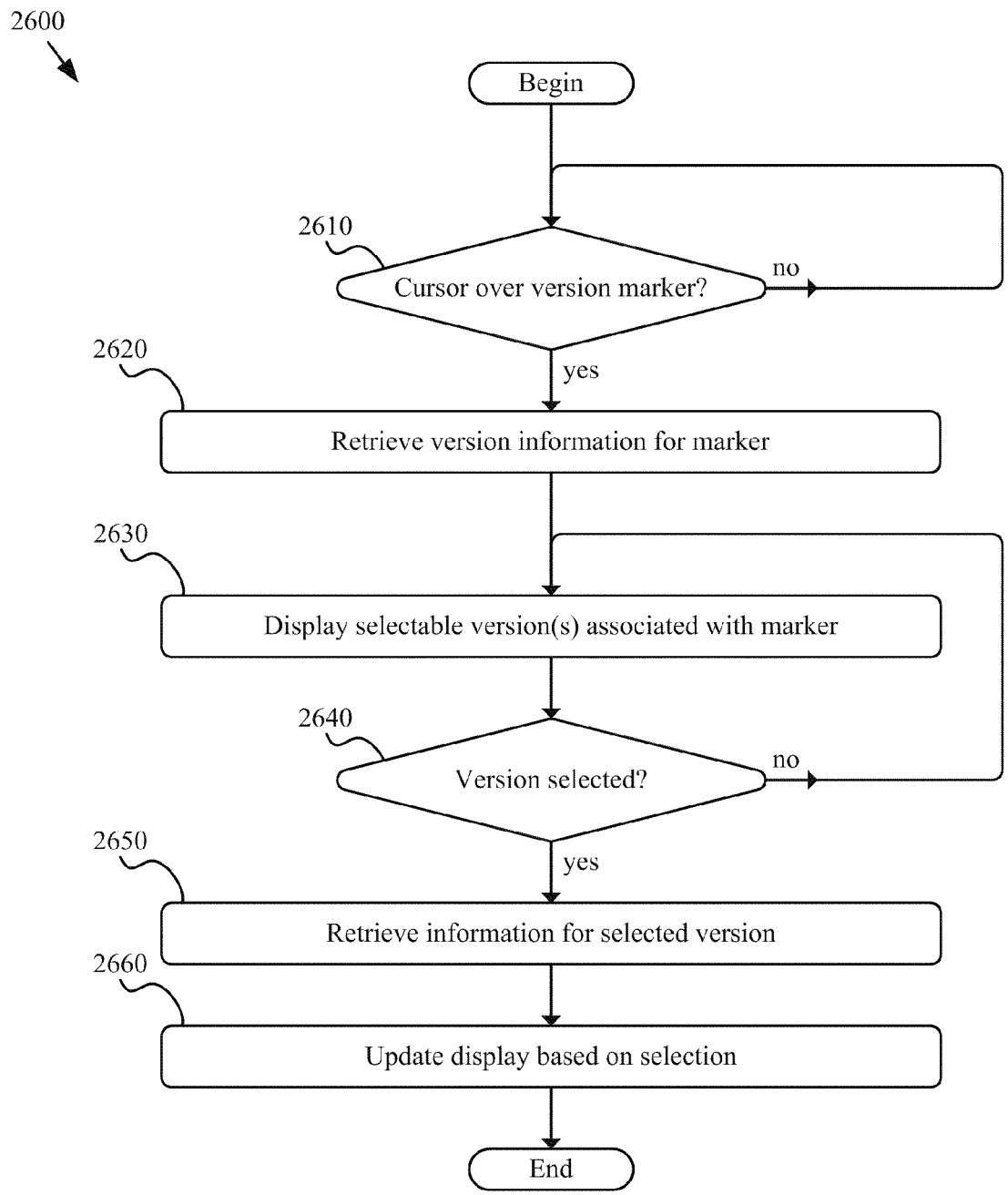
FIG. 26 illustrates an example of a conceptual process that some embodiments use to receive version selections using the version management feature.

As described above in reference to FIG. 4, in some embodiments the navigation tool allows a user to select from the available versions of project locations. FIG. 26 conceptually illustrates an example of a process 2600 used by some embodiments use to receive version selections using the version management feature. Process 2600 will be described by reference to FIG. 27 which illustrates an example of user interaction.

Figure 27:
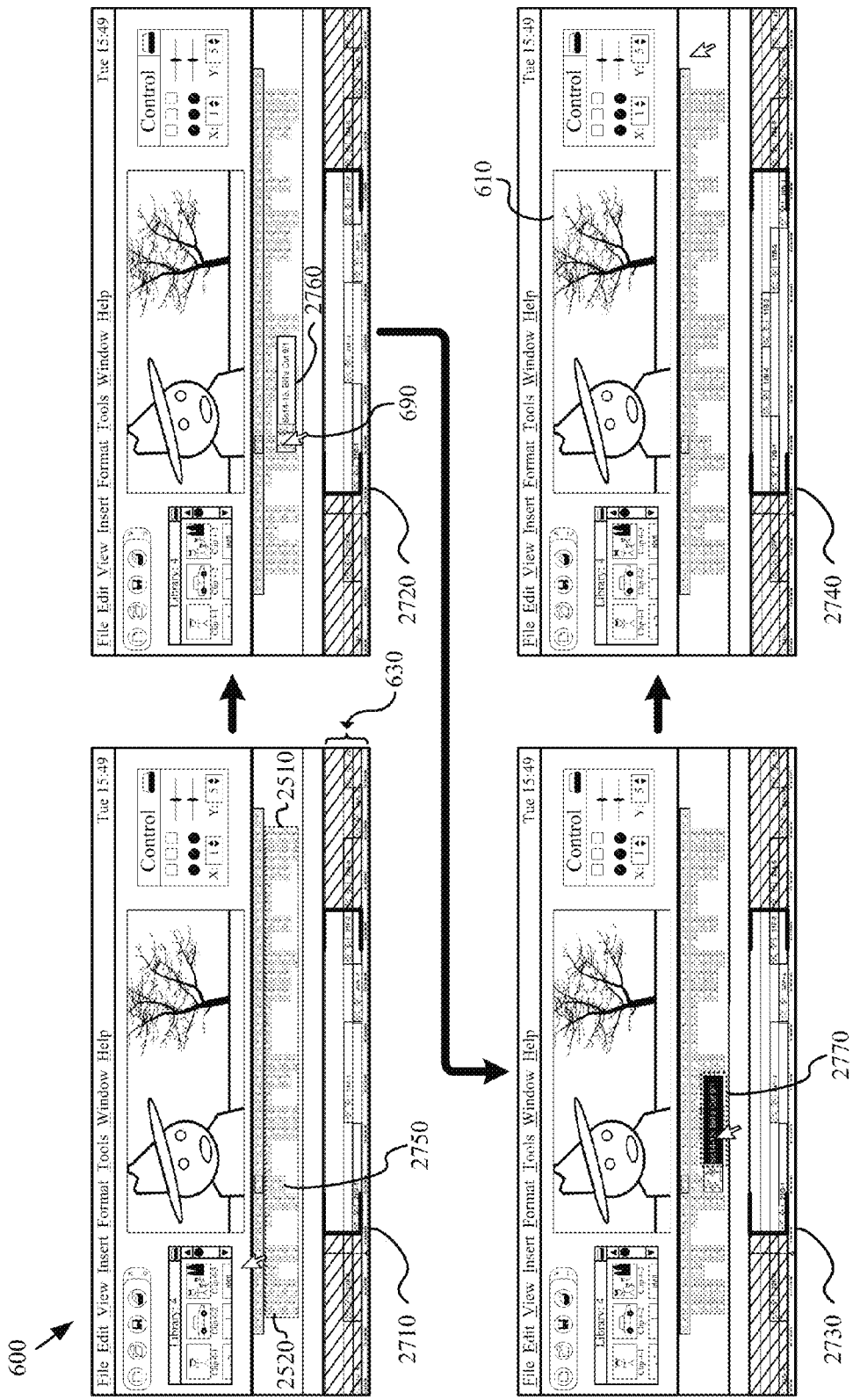
FIG. 27 illustrates an example of using the version display area of some embodiments to select a different version of a location in a composite project.

FIG. 27 illustrates an example of using the version display area 2510 of some embodiments to select a different version of a location in a composite project. In this example, a user selects a version using the selectable version markers 2520 provided in the version display area. FIG. 27 illustrates the same GUI 600 as described above in reference to FIGS. 6-8, 11-13, 16, 18, 20-21, and 23-25. To illustrate the example of selecting a different version of a location using the version display area in this manner, FIG. 27 describes four different stages 2710-2740 of a user's interaction with the GUI 600.

Process 2600 begins when the version management feature of some embodiments is invoked. Next, the process determines (at 2610) whether a cursor is over a version marker (e.g., version indicator 2420 of FIG. 24 or version marker 2520). In some embodiments, a navigation marker may serve as a version marker (e.g., when selected after activating the version management feature, when selected in conjunction with a combination of keystrokes, etc.). When the process determines that the cursor is not over a version marker, the process returns to operation 2610. In some embodiments, this operation may be repeated (e.g., at regular intervals, continuously, etc.) until the version management feature is deactivated, a timeout period is reached, or some other criteria. Alternatively, in some embodiments process 2600 may begin when the cursor is moved over a version marker.

When the process determines (at 2610) that the cursor is over a version marker, the process retrieves (at 2620) version information associated with the marker. In some embodiments, the version information may include multiple versions (e.g., the example of FIG. 4 where a set of pop-up menu options are retrieved for each selected marker). In some embodiments, the version information may include a single version associated with the marker (e.g., the example of FIG. 25 where a single version is associated with each version marker 2520).

Next, the process displays (at 2630) selectable versions associated with the marker. The selectable versions may be presented in different ways in different embodiments. Some embodiments provide a pop-up menu with a set of selectable options (e.g., the example of FIG. 4). In some embodiments, a single option is presented for each marker (e.g., the example of FIG. 25). Alternatively and/or conjunctively, some embodiments may display a set of graphical indicators or some other appropriate way of presenting the available selection option(s) to a user. One example of such a display is described below.

FIG. 27 shows a first stage 2710 that is before the user has positioned the cursor over any version marker. FIG. 27 further shows a second stage 2720 of user interaction that is after the user has positioned the cursor 690 over a particular version marker 2750, thus activating a version selection option 2760. The selection option of this example includes text and graphical information. Different embodiments may display the selection option in different ways (e.g., as a purely textual display, with different informational attributes, etc.). In some embodiments, the selection option may be activated whenever the cursor is positioned over a version marker after activating the version display area. Alternatively, such a selection option may be activated by performing various operations (e.g., a right-click operation, a series of keystrokes, a combination of keystrokes and cursor control operations, etc.).

Process 2600 then determines (at 2640) whether a version has been selected. In some embodiments, the selection may involve performing a cursor click operation over a version selection option (e.g., a pop-up menu selection option as described above in reference to FIG. 4). Some embodiments may receive a selection through a series of keystrokes, a GUI item, a hotkey selection, or some other appropriate way. When the process determines (at 2640) that no version has been selected, the process continuously repeats operations 2630-2640 until the process determines (at 2640) that a selection has been made. In some cases (e.g., when the cursor has moved from a location over the version marker), the process repeats operations 2610-2640 until the process determines (at 2640) that a selection is made. One example selection is described below.

FIG. 27 also shows a third stage 2730 of user interaction that is after the user has positioned the cursor over a selectable area 2770 of the particular selection option 2760. As shown, the display of the text area of the particular option has been inverted to indicate that the cursor is positioned over the selectable area of the option. In this stage, the user performs a cursor click operation to select the version of the location associated with the particular option. Different embodiments allow a user to make this selection in various ways (e.g., a combination of keystrokes, a hotkey selection, etc.).

Returning to FIG. 26, when process 2600 determines that a selection of a particular version has been made, the process retrieves (at 2650) the information associated with the particular version. The information may include references to locations of the project, clips, settings, etc. Conceptual data structures used to store version information will be described in more detail in reference to FIG. 34 below.

The process then updates (at 2660) the display based on the selection. The update of the display may include updating the composite display area, the preview display area, and/or other areas of the GUI as appropriate. In addition, some embodiments update the display of the navigation tool to reflect the navigation marker associated with the currently-selected version. One example of such a display update is described below.

FIG. 27 shows a fourth stage 2740 of user interaction that is after the composite display area has been updated to present the version of the location associated with the particular selection option 2760. In this example, several clips have been replaced, trimmed, moved, etc. In addition to updating the composite display area 630, some embodiments also update the preview display area 610 (e.g., to reflect the content at the current playhead position, to reflect the content of a selected clip, etc.) and/or other sections of the GUI 600.

One of ordinary skill in the art will recognize that the operations of process 2600 are conceptual and may not necessarily be performed in the order shown. Furthermore, different specific operations may be performed in different embodiments. For instance, when using a version management feature such as that described in reference to FIG. 4, some embodiments may not proceed to operation 2620 until the pop-up menu is invoked (e.g., through a right click cursor operation). Also, the process may not be performed as one continuous series of operations. In addition, the process could be implemented using several sub-processes, or as part of a larger macro-process.

In some embodiments, the version markers 2750 in the version display area 2510 are presented in a sorted stack. Thus, the most-recently accessed version may be placed at the top of the stack, with the next most-recently accessed version placed below that, and so on. In some such embodiments, the first-in/last-out stack may be updated whenever a user selects a version. In this way, a user may easily select among versions of recent interest to the user. Different embodiments may present the version selection options in various different ways (e.g., in the order of creation, sorted alphabetically, etc.). In some embodiments, a user may select from among different presentations of the version selection options (e.g., by selecting a menu option, through one or more keystroke commands, etc.). Similarly, the options of a pop-up menu such as that described above in reference to FIG. 4 could be arranged in various ways.

C. Management of Available Versions

Figure 28:
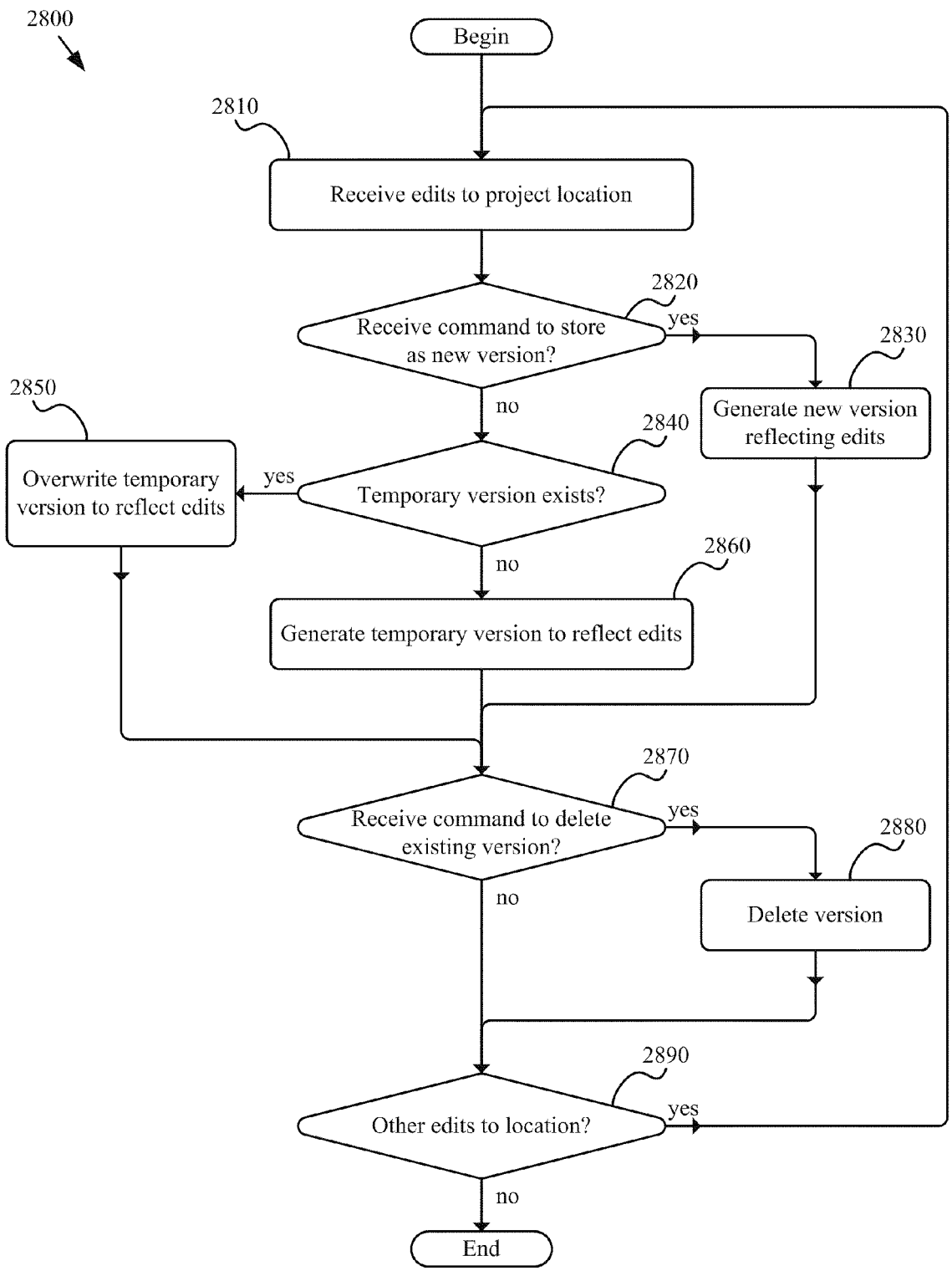
FIG. 28 illustrates an example of a conceptual process that some embodiments use to generate new versions, delete existing versions, or update temporary versions of a location of the composite project.

As described above, in some embodiments the version management feature allows a user to manage the available versions for locations of a project. FIG. 28 conceptually illustrates an example of a process 2800 some embodiments use to generate new versions, delete existing versions, or update temporary versions of locations of the composite project. Process 2800 will be described by reference to FIGS. 4, 24, and 29.

Process 2800 begins when a user activates the version management feature of some embodiments. The user may activate the feature in a similar manner to that described above in reference to FIGS. 23-25. After the version management feature is activated, the process receives (at 2810) edits to a project location. Such edits may include removing clips from the location, adding clips to the location, modifying the attributes of clips included in the location (e.g., by trimming clips, moving clips along the timeline, etc.), and/or other edit operations. These edits may be received in different ways in different embodiments (e.g., through cursor operations, series of keystrokes, etc.).

Next, the process determines (at 2820) whether a command has been received to store the modified location as a new version. Some embodiments receive this command through a pop-up menu selection, as described above in reference to FIG. 4. Different embodiments receive the command in different ways (e.g., a hotkey selection, a series of keystrokes, etc.). When the process determines that a command to store the version was received, the process generates (at 2830) a new version reflecting the edits to the project location. Otherwise, the process determines (at 2840) whether a temporary version of the location exists.

In some embodiments, whenever edits are made to a location, a temporary (or "dirty") version is saved. The edits to such a temporary version may not be saved under certain conditions (e.g., when the user selects a different version before saving the temporary version, when the user closes the project without saving edits, etc.). When the process determines (at 2840) that a temporary version exists, the process overwrites (at 2850) the temporary version to reflect the received edits. Otherwise, the process generates (at 2860) a temporary version to reflect the edits. In some embodiments, when no temporary version existed previously, no temporary version is created because there is no other version (in other words, the location includes only one version—the current dirty version).

Different embodiments may manage temporary versions in different ways. For instance, some embodiments automatically save a temporary version when any location is modified. Other embodiments do not save temporary versions at all (i.e., a new version is created only when a user explicitly requests a new version to be created). Some embodiments may indicate which locations have temporary versions using markers such as marker 2420 shown in FIG. 24. In some embodiments, these markers may be differentiated to indicate which locations have temporary versions versus locations that have only previously-stored and/or current versions. Different embodiments may differentiate the markers in different ways (e.g., by using different colors, different shapes, etc.).

Returning to FIG. 28, process 2800 then determines (at 2870) whether a command has been received to delete an existing version. Such a command may be received in various ways (e.g., through a menu selection, one or more keystroke commands, etc.). When the process determines that a delete command has been received, the process deletes (at 2880) the existing version. One example of such a deletion operation is described below in reference to FIG. 29.

Otherwise, or after deleting the existing version, process 2800 determines (at 2890) whether there are other edits to the location. Different embodiments may make this determination in different ways. For instance, in some embodiments the process may determine (at 2890) that there are other edits to the location unless the user navigates to a different project location. When process 2800 determines (at 2890) that there are other edits to the location, the process repeats operations 2810-2890 until the process determines (at 2890) that there are no other edits to the location and ends.

In some embodiments, when a command is received to close a project (or to close a media editing application with an open project), the user is prompted to save any unsaved edits. These unsaved edits may include modifications to or creation of temporary versions, creation of new versions, deletion of existing versions, etc. In some embodiments a user may be able to select individual edits to save (e.g., by checking a selection box next to an item in a displayed list of unsaved edits). In some of these embodiments, the project file may be updated when the user elects to save any of the unsaved edits. Different embodiments may save edits to projects in different ways. For instance, some embodiments prompt a user to save edits at regular intervals, whenever a change is made, etc. Other embodiments save all edits but allow a user to undo edits at a later time. Some embodiments retain temporary versions, including any unsaved edits to any versions, such that the temporary versions can be recalled (and saved, if desired) at a later time. In this way, a user's work may be saved unless the user explicitly deletes a temporary version, thus potentially allowing a user to modify an existing version over several editing sessions without saving a new version until the user is satisfied with the edits. In other words, a user can quit an application without saving the temporary versions, and have the temporary versions appear the next time he starts the application.

Figure 29:
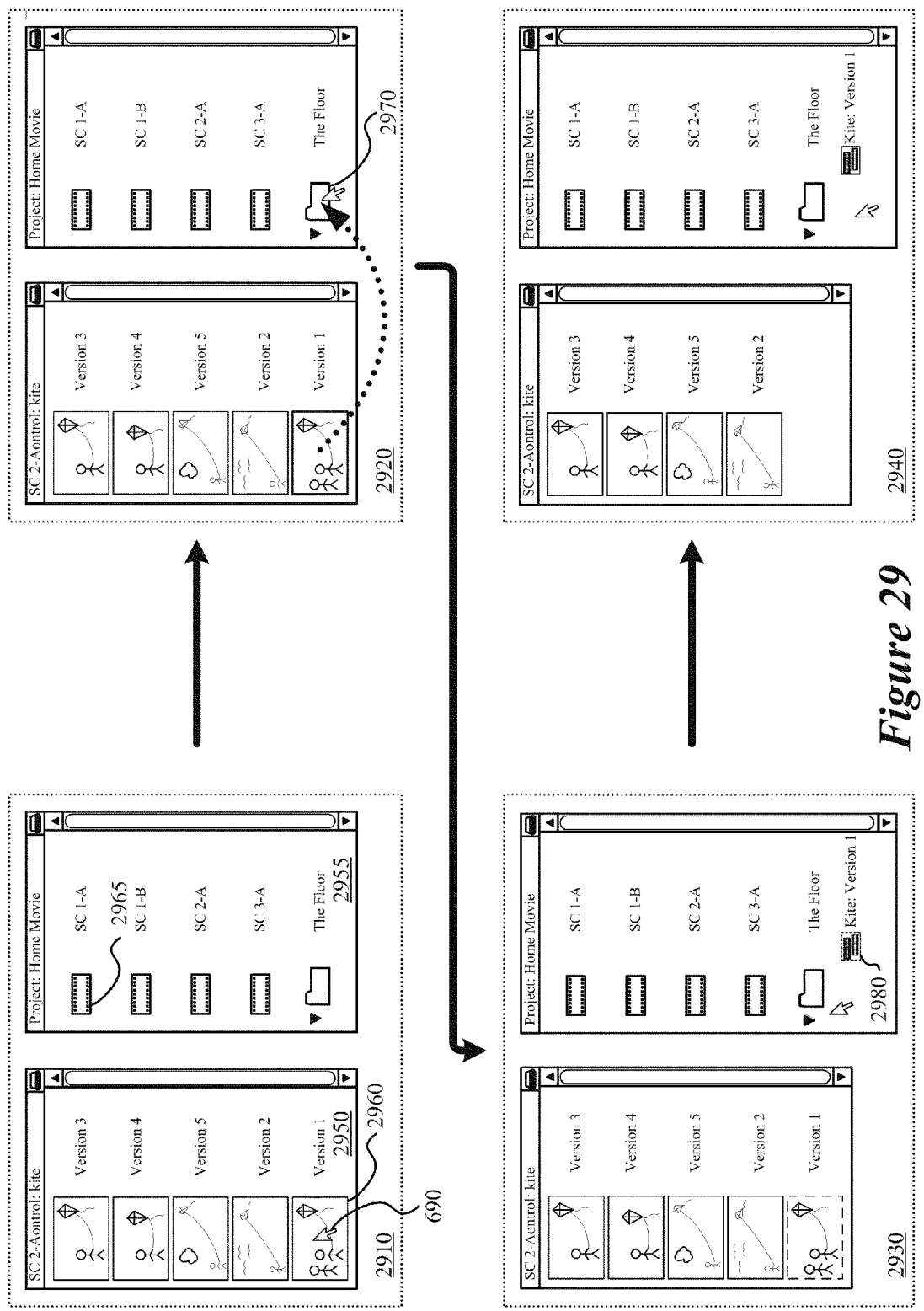
FIG. 29 illustrates an example of managing which versions are available for a particular location of a composite project.

FIG. 29 illustrates an example of managing which versions are available for a particular location of a composite project. In this example, a user deletes a version of a location in a composite project using version management GUI items 2950-2955. Such GUI items may also be included in a GUI such as GUI 600 described above in reference to FIGS. 6-8, 11-13, 16, 18, 20-21, 23-25, and 27. Alternatively, the GUI items may be provided externally to the media editing application's GUI (e.g., as separate browser windows). In some embodiments, a GUI item such as pop-up menu 470 described above in reference to FIG. 4 may serve as GUI item

2950. A GUI item such as media library 620 described above in reference to FIG. 6 may serve as GUI item 2955 in some embodiments. Different embodiments may activate and/or display the GUI items in different ways. To illustrate the example of deleting a version of a location, FIG. 29 describes four different stages 2910-2940 of a user's interaction with the GUI items 2950-2955.

FIG. 29 shows a first stage 2910 that is after the GUI items 2950-2955 have been invoked. In some embodiments, a different GUI item 2950 may be presented for each location. In other embodiments, a single GUI item 2950 may allow a user to select among various locations (e.g., by performing a menu selection, by performing one or more keystroke commands, etc.). Different embodiments may display the versions for each location in various other ways (e.g., by including a separate folder for each location in the GUI item 2950, by appending a location name to the beginning of each version name, etc.). Similarly, in some embodiments a different GUI item 2955 may be presented for each location, the GUI item 2955 may allow a user to select among locations, etc.

In this stage 2910, GUI item 2950 displays a separate version representation 2960 for each available version for a particular project location. In addition, GUI item 2955 displays a separate representation for each location in the project. Different embodiments may include different representations 2960-2965 (e.g., textual, graphical, etc.). Some embodiments may provide different views of the representations 2960-2965 (e.g., a thumbnail view, a list view, an icon view, etc.). Different embodiments allow a user to select among the different views in various ways (e.g., through a series of keystrokes, by activating a GUI control, etc.). In addition, the representations 2960-2965 may be displayed with various attributes (e.g., version name, save date, etc.). In this stage 2910, the user has moved the cursor 690 to a location over a particular version representation 2960.

FIG. 29 further shows a second stage 2920 of user interaction that is after the user has selected representation 2960 (e.g., by performing a left-click operation while the cursor is positioned over the representation). The selection has been indicated by a bold outline in this example; however different embodiments may indicate the selection in different ways. In this stage, the user has dragged the selected representation to a location over folder 2970 in GUI item 2955 and released the selected representation over the folder (referred to as the "floor" in this example).

FIG. 29 also shows a third stage 2930 of user interaction that is after the user has released the selected representation over the folder. As shown, the representation 2960 in GUI item 2950 is shown with a dashed border to indicate that the representation is being removed from GUI item 2950. In addition, a representation 2980 of the version corresponding to representation 2960 is shown in GUI item 2955. The representation 2980 is shown with a dashed border to indicate that the representation is being displayed in GUI item 2955. Some embodiments may animate this process (i.e., the representation 2960 is shown as becoming more transparent as the representation 2980 becomes less transparent).

Lastly, FIG. 29 shows a fourth stage 2940 of user interaction that is after the GUI items have been updated to reflect that the version corresponding to representation 2960 and representation 2980 has been removed from the available versions in GUI item 2950 and instead has been placed in folder 2970. In some embodiments, once a version has been deleted to the floor, the version is no longer shown as an option when selecting among available versions. Thus, folder 2970 may act as a repository for versions that are associated with a particular project, but which are not made available for selection. In this way, a user may limit the number of selectable versions for a particular location of a project without permanently deleting any versions.

In some embodiments, a deleted version may be restored by selecting the corresponding representation from folder 2970 in GUI item 2955 and dragging the representation to a location in GUI item 2950 before releasing the representation. Some embodiments allow a user to restore a deleted version by retaining an association between the deleted version and the location of the project that corresponds to the version. For instance, in some embodiments, folder 2970 includes a set of sub-folders, where each sub-folder corresponds to a project location. As another example, in some embodiments the deleted versions include a flag that associates the versions with particular locations of the project. As yet another example, in some embodiments, the deleted versions are named such that they can be matched to project locations (e.g., the location name may be appended to beginning of the version name).

Although the operations used to delete a version have been described with reference to certain features and details, one of ordinary skill in the art will recognize that different embodiments may delete versions in different ways. For instance, a user could activate a pop-up menu over a representation of a version and select an option such as "delete to floor." Alternatively, a user may select a version marker from the version display area and then press a "delete" key.

One of ordinary skill in the art will recognize that the operations of process 2800 are conceptual and may not necessarily be performed in the order shown. For instance, in some embodiments, the process may determine whether a temporary version of the location exists before determining whether a command to store a new version has been received. Furthermore, different specific operations may be performed in different embodiments. Also, the process may not be performed as one continuous series of operations. In addition, the process could be implemented using several sub-processes, or as part of a larger macro-process.

D. Collaboration Using the Version Management Feature

Figure 30:
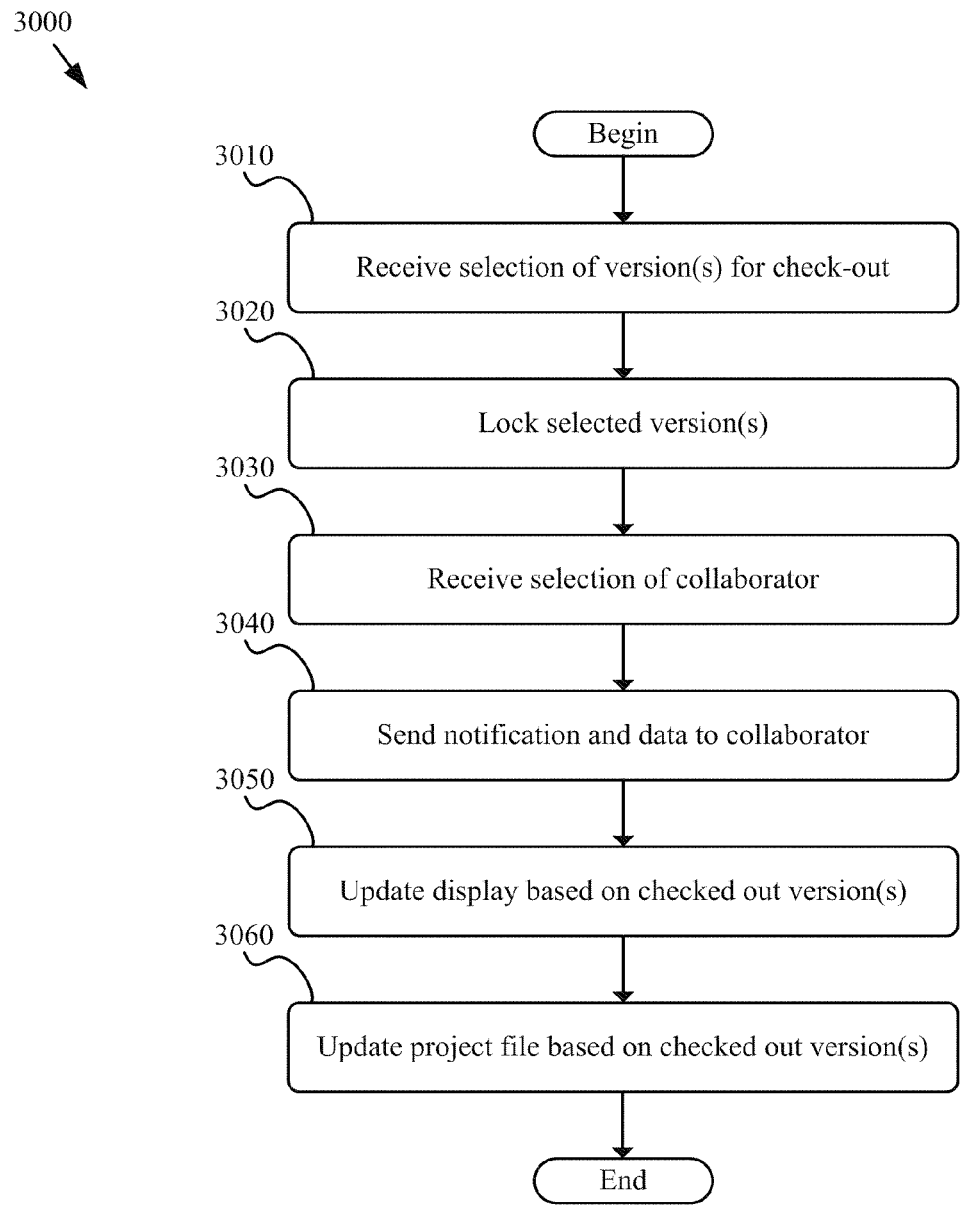
FIG. 30 illustrates an example of a conceptual process that some embodiments use to check out a version for review by a collaborator using the version management feature of some embodiments.

As described above in reference to FIG. 5, in some embodiments a collaboration feature may be implemented with the version management feature. FIG. 30 conceptually illustrates an example of a process 3000 used by some embodiments to check out a version for review by a collaborator using the version management feature of some embodiments. Process 3000 will be described with reference to FIG. 31.

Process 3000 begins when the version management feature of some embodiments is invoked. Next, the process receives (at 3010) a selection of one or more versions to be checked out. In some embodiments, the versions may be selected using the navigation markers of the navigation tool, the version markers of the version display area, a menu selection, or some other appropriate way.

Process 3000 then locks (at 3020) the selected versions for editing. In some embodiments, this locking involves setting a flag and/or some other indication such that the selected version(s) may not be modified by any users (other than the selected collaborator). In some embodiments, one or more users may be able to unlock the version(s). In some of these embodiments, only users with certain authority or privileges may be able to unlock and modify the previously checked out version(s). Next, the process receives (at 3030) a selection of one or more collaborators to review or modify the selected versions. This selection may be received in various ways. One example of receiving a selection of versions for check-out and a selection of a collaborator is described below.

Figure 31:
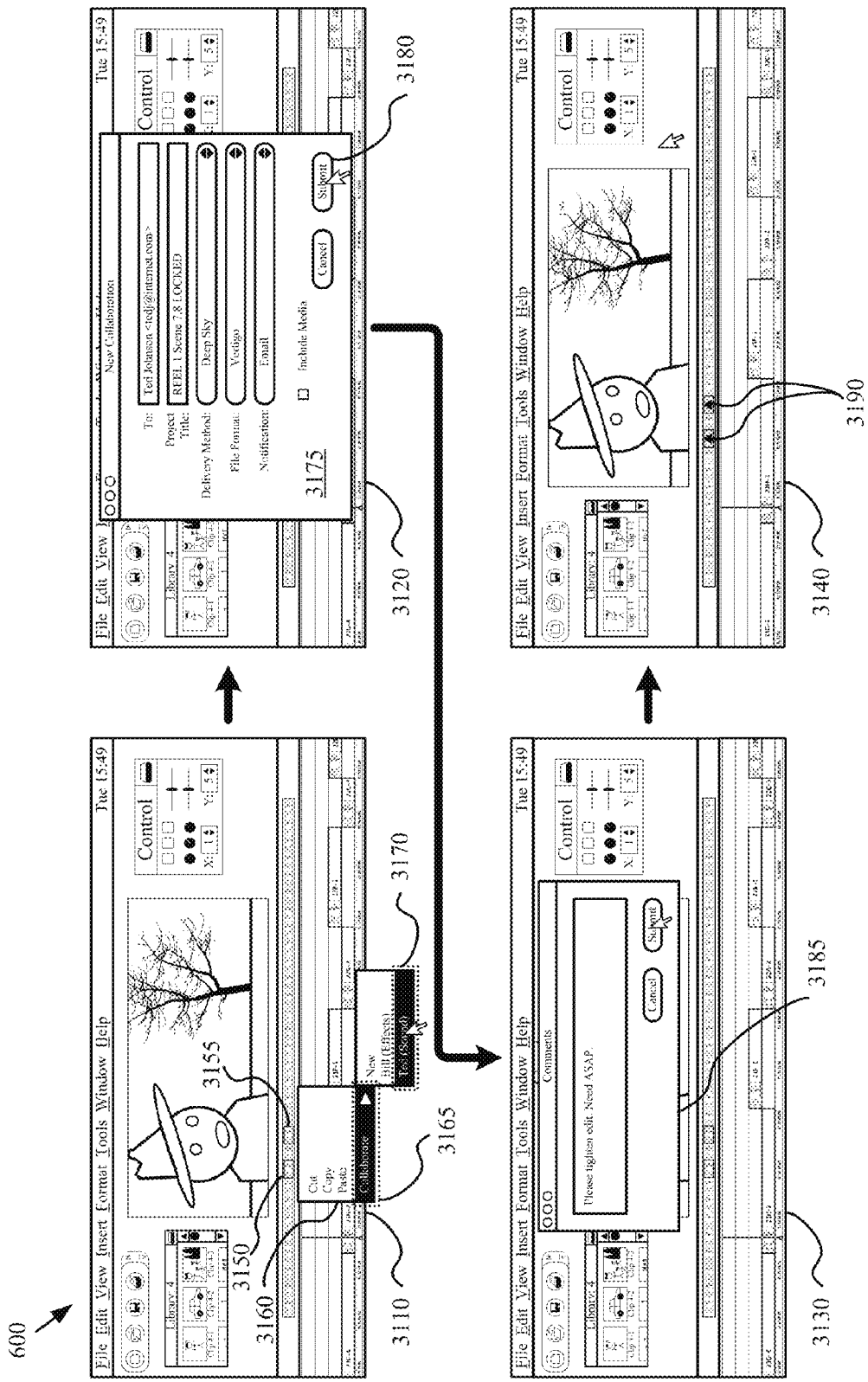
FIG. 31 illustrates an example of using the version management feature of some embodiments to collaborate among users.

FIG. 31 illustrates an example of using the version management feature of some embodiments to collaborate among users. In this example, a user selects multiple versions and checks out the selected versions to a collaborator using the version management feature in conjunction with the navigation tool. FIG. 31 illustrates the same GUI 600 as described above in reference to FIGS. 6-8, 11-13, 16, 18, 20-21, 23-25, and 27. To illustrate the example of collaborating among users using the version management feature in this manner, FIG. 31 describes four different stages 3110-3140 of a user's interaction with the GUI 600.

FIG. 31 shows a first stage 3110 that is after the user has selected multiple versions 3150-3155 (e.g., by performing a series of ctrl-click cursor operations) to be checked out for review by the collaborator. In this stage, the user activates a pop-up menu 3160 (e.g., through a right click operation), and selects a collaboration option 3165. The user further selects a specific collaborator 3170. In some embodiments, a user may be able to select from various pre-existing collaborators and/or add a new collaborator.

Various collaborators may have various different privileges and/or access permissions to a project. For instance, in some embodiments a project has a "super-user" that has privilege to access any location of a project, and who may control the access provided to other users (e.g., by setting a privilege status for other users, by allowing access to a particular account, etc.). Such access control may be granted at a project level, at a location level, at a clip level, or some other appropriate level of access. In addition, a super-user may control the options available to each user (e.g., whether a user may modify any locations of a project).

In addition to receiving the selection of a collaborator, some embodiments receive various other information such as information regarding the collaborator (e.g., e-mail, name, etc.), project (e.g., title, status, etc.), file format, notification type, etc. The information may be received in various appropriate ways, one example of which is described below.

FIG. 31 further shows a second stage 3120 of user interaction that is after the user has selected a collaborator using a pop-up menu. In this stage, the version management feature presents a dialog box 3175 that includes various fields, buttons, controls, etc. In some embodiments, the dialog box may be pre-populated using data that has been previously-entered for a pre-existing collaborator. In addition, the user fills in any missing information and selects a submit option 3180 (or some similar option or command).

FIG. 31 also shows a third stage 3130 of user interaction that is after the user has submitted the information in the dialog box 3175. As shown, another dialog box 3185 has been presented. In this stage, the user may enter a comment to accompany the selected versions sent to the collaborator. Different embodiments may present various different options, controls, text entry fields, etc. in one or more dialog boxes such as boxes 3175 and 3185.

Returning to FIG. 30, after receiving a collaborator selection, process 3000 sends (at 3040) a notification and associated data to the collaborator. In some embodiments, only a notification is sent, as the collaborator may have access to the same project data as the user (e.g., through a shared storage accessed over a network). Alternatively, some embodiments send various other data to the collaborator (e.g., clip data, location information, project data, etc.).

The process then updates (at 3050) the display based on the checked-out versions. Different embodiments may update the display in various different ways. The update may include placing various graphical markers and/or other indications associated with the checked-out versions such that a user receives a visual indication of the status of each version. One example of such a display update is described below.

FIG. 31 shows a fourth stage 3140 of user interaction that is after the user has submitted the selected versions to the collaborator for review. In this example, check-out indicators 3190 have been placed over the navigation markers corresponding to the checked-out versions. In this manner, a visual indication is provided as to which versions are checked out (and which may be locked for editing).

After updating (at 3050) the display, process 3000 updates (at 3060) the project file based on the checked-out versions. Different embodiments may store the check-out information in various ways. Several conceptual examples of the data structures used by some embodiments are described below in reference to FIG. 34.

One of ordinary skill in the art will recognize that the operations of process 3000 are conceptual and may not necessarily be performed in the order shown. For example, some embodiments may not lock the versions until after sending the notification and data to the collaborator. Furthermore, different specific operations may be performed in different embodiments. Also, the process may not be performed as one continuous series of operations. In addition, the process could be implemented using several sub-processes, or as part of a larger macro-process.

Figure 32:
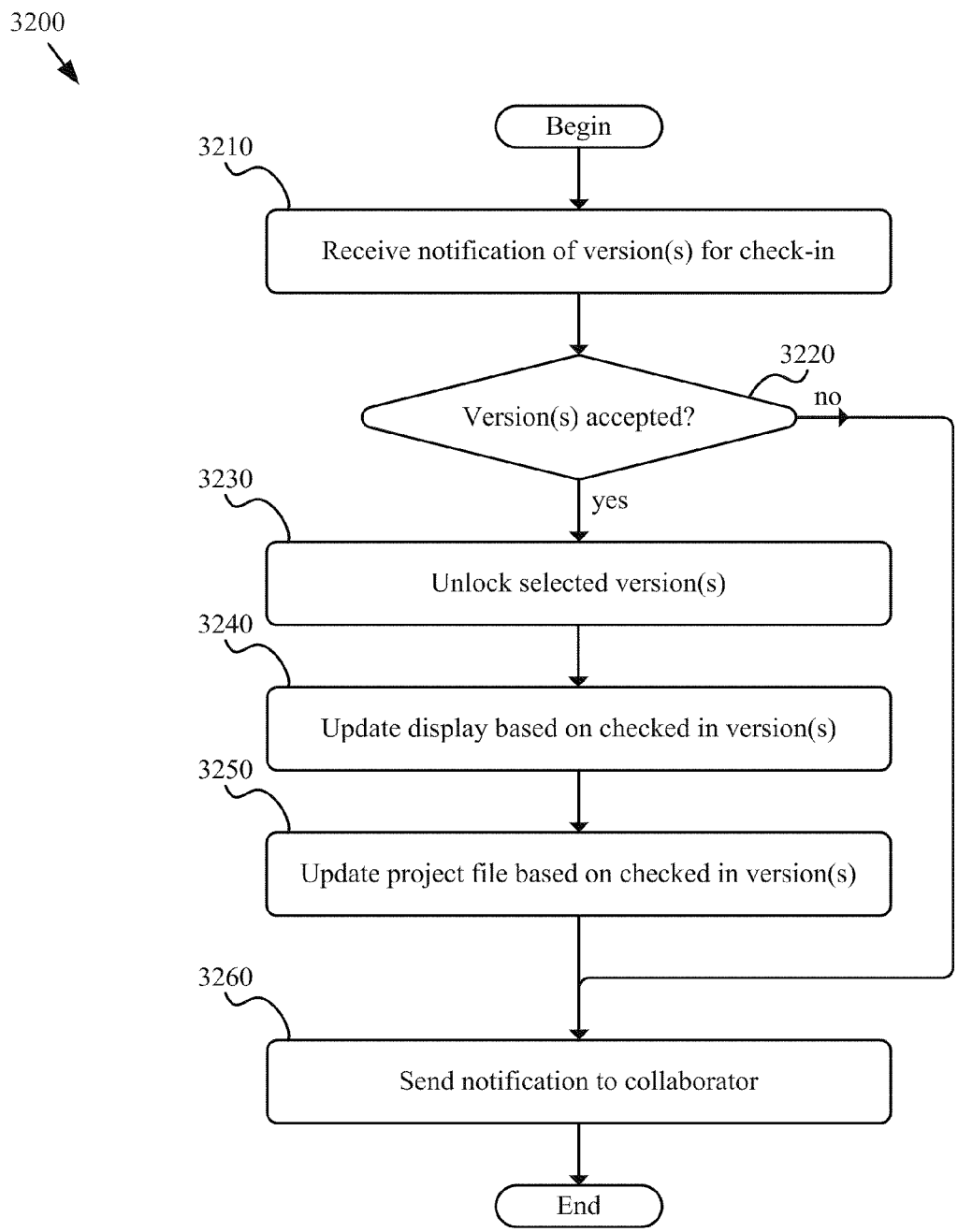
FIG. 32 illustrates an example of a conceptual process that some embodiments use to check in versions using the version management feature.

After checking out a version, the checked-out version may be returned from the collaborator. The returned version may include various modifications made by the collaborator, or be the same as the checked-out version (e.g., when the collaborator is reviewing the version). FIG. 32 illustrates an example of a conceptual process 3200 that some embodiments use to check in versions using the version management feature. Process 3200 will be described with reference to FIG. 33.

Process 3200 begins when the version management feature of some embodiments is invoked. Next, the process receives (at 3210) a notification that one or more versions are available for check in. Different embodiments may receive the notification in different ways. For instance, in some embodiments an e-mail notification may be received, or some other notification that is provided externally to the media editing application. Alternatively, some embodiments may receive a notification when a project is loaded (e.g., by monitoring the status of previously checked-out versions stored in a central location). Some embodiments provide a notification to the user through the GUI of the media editing application as described below.

Figure 33:
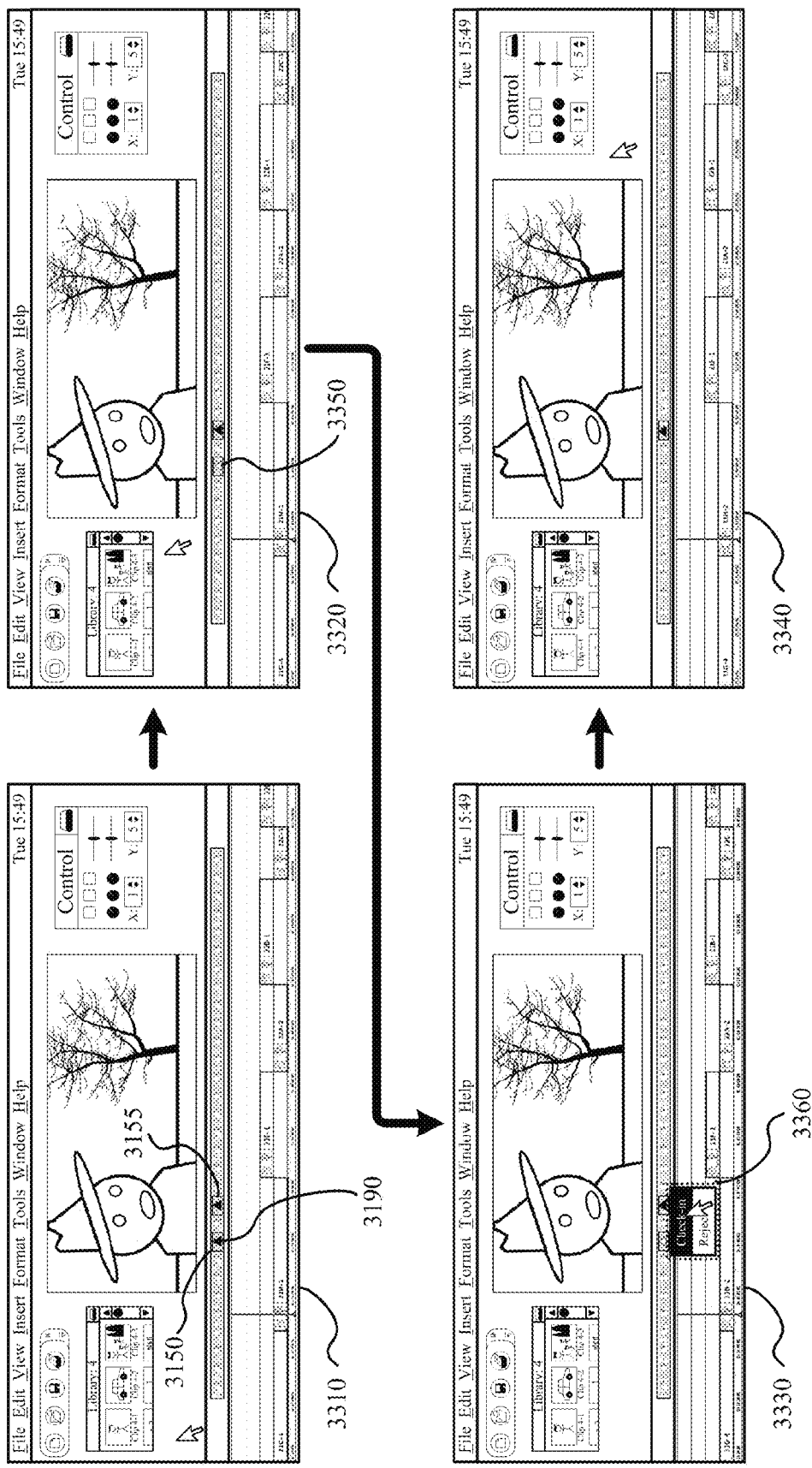
FIG. 33 illustrates another example of using the version management feature of some embodiments to collaborate among users.

FIG. 33 illustrates another example of using the version management feature of some embodiments to collaborate among users. In this example, the user receives an indication that a checked-out version has been returned from the collaborator. FIG. 33 illustrates the same GUI 600 as described above in reference to FIGS. 6-8, 11-13, 16, 18, 20-21, 23-25, 27, and 31. To illustrate the example of checking in a returned version using the version management feature in this manner, FIG. 33 describes four different stages 3310-3340 of a user's interaction with the GUI 600.

FIG. 33 shows a first stage 3310 that is after the user checked out multiple versions 3150-3155 for review by the collaborator. This stage reflects the state of the GUI in the fourth stage 3190 described above in reference to FIG. 31.

FIG. 33 further shows a second stage 3320 of user interaction that is after the user has received an indication that a version has been returned from the collaborator. In this stage, marker 3190 shown in FIG. 31 has been replaced by a different marker 3350 in order to indicate that the version associated with that marker has been returned. Different embodiments may indicate that the version has been returned in different ways (e.g., by changing the color of the marker, by changing the shaped of the marker, using a textual indication, etc.).

In some embodiments, in addition to the notification, project data is also received. Some embodiments allow a collaborator to modify the versions that have been checked out to the collaborator. In some embodiments, the collaborator and user may both have access to the same database such that the various modified versions are available to all collaborators. In addition, some collaborators may have access to only a portion of the database (e.g., particular versions, clips, locations, etc. of the project file). In some embodiments, various files (e.g., clips, project data, etc.) may be shared among users using some appropriate delivery method (e.g., e-mail).

Returning to FIG. 32, process 3200 then determines (at 3220) whether the version (or versions) has been accepted. Such a determination will typically be based on the user's review of the returned version (e.g., by viewing a preview of the returned version). Some embodiments may make the determination based on a selection received in some appropriate way. When the process determines that the version has not been accepted, the process continues to operation 3260, described below. Otherwise, the process unlocks (at 3230) the selected versions. In some embodiments, the unlocking includes setting various flags or other data fields regarding the versions. Various conceptual data structures used by some embodiments to implement such version management features are described below in reference to FIG. 34. One example way of reviewing a version for check in is described below.

FIG. 33 also shows a third stage 3330 of user interaction that is after the user has activated a pop-up menu 3360. Different embodiments may provide various different menu options. In some embodiments, a user may activate such a menu by, for example, performing a right click operation when the cursor is located over the marker 3350. In this stage, the user selects the "check-in" option from the menu. In this manner, the returned version is checked back in, and unlocked for editing by the user. In some embodiments, when a user rejects a version provided for check in, the checked-out version may also be unlocked for editing by the user. In either case, some embodiments may provide various dialog boxes to the user such that the user may enter information regarding the decision to accept or reject the version. Furthermore, some embodiments may automatically provide notification of the decision (e.g., though e-mail) to various other collaborators.

Process 3200 then updates (at 3240) the display and updates (at 3250) the project file based on the checked in version(s) in a similar manner to that described above in reference to operations 3050 and 3060 of process 3000. However, the display may typically be updated by removing a marker as described below.

Lastly, FIG. 33 shows a fourth stage 3340 of user interaction that is after the user has approved the checked-out version. In this example, marker 3350 has been removed from the display in order to indicate that the associated version has not been checked out.

Returning to FIG. 32, after updating (at 3250) the display, or determining (at 3220) that one or more versions have been rejected, process 3200 sends (at 3260) a notification to the collaborator indicating whether the returned version has been accepted or rejected. The notification may be sent in different ways in different embodiments (e.g., by e-mail, through the GUI when a user accesses a project file or media editing application, etc.).

One of ordinary skill in the art will recognize that the operations of process 3200 are conceptual and may not necessarily be performed in the order shown. For instance, in some embodiments, the process may not unlock the selected versions until after updating the display. Furthermore, different specific operations may be performed in different embodiments. Also, the process may not be performed as one continuous series of operations. In addition, the process could be implemented using several sub-processes, or as part of a larger macro-process.

IV. Software Architecture and Implementation

In some embodiments, the processes described above are implemented as software running on a particular machine, such as a computer or a handheld device, or stored in a computer readable medium. Sub-section IV.A below describes various conceptual data structures used by some embodiments to implement such software. Sub-section IV.B then describes a conceptual software architecture used by some embodiments to present the tools and features described above.

A. Data Structures

Figure 34:
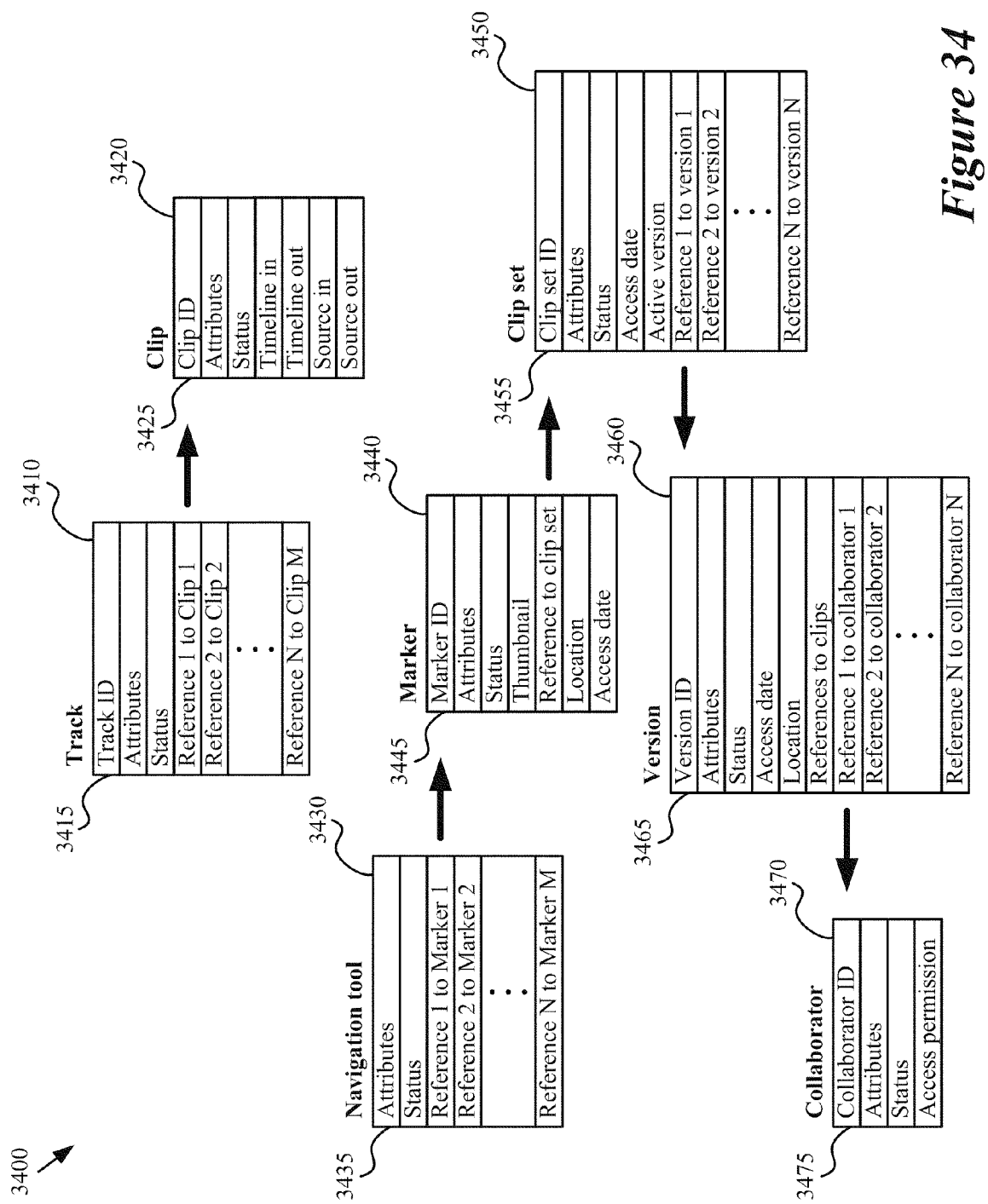
FIG. 34 illustrates an example data structure of a composite project file used by some embodiments to implement various tools and features of the media editing application.

FIG. 34 illustrates an example data structure of a composite project file 3400 used by some embodiments to implement various tools and features of the media editing application described above. As shown, the project file includes a track data element 3410. Such a track data element may be used to implement the video tracks, audio tracks, and/or other types of tracks (e.g., effects tracks, text overlay tracks, etc.) that may be included in a composite project. For example, the track data element could be used to implement a track such as track 670 described above in reference to FIG. 6. Although only one track data element is shown, a project will typically include multiple tracks, with each track corresponding to a different track data element. Each track data element includes multiple sub-elements 3415. These sub-elements may include data such as a track ID (e.g., "Audio Track 1"), track attributes (e.g., "audio", "video", etc.), and track status (e.g., "active", "inactive", etc.). In addition, each track data element includes one or more references to various clip data elements 3420.

Each clip data element 3420 corresponds to a media clip that is referenced by a track data element (e.g., clip 675 described above in reference to FIG. 6). Each clip data element includes various sub-elements 3425. The sub-elements may include data such as a clip ID (e.g., "clip 1"), clip attributes (e.g., "audio", "video", etc.), clip status (e.g., "active", "inactive", etc.), as well as other data (e.g., timeline in, timeline out, source in, source out, etc.). In some embodiments each clip data element may include one or more references to media content (not shown). Such media content may include video files, audio files, digital images, etc. In some embodiments, the media content may be stored externally to the project file. Alternatively, in some embodiments the media content may be stored within the project file.

In addition to the track and clip data elements 3410 and 3420, in some embodiments the project file includes a navigation tool data element 3430. Such a navigation tool data element may be used to implement the navigation tool of some embodiments (e.g., tool 710 described above in reference to FIG. 7). The navigation tool data element includes sub-elements such as tool attributes (e.g., display mode, display size, etc.) and tool status (e.g., "active", "inactive", etc.). Each navigation tool data element also includes one or more references to various marker data elements 3440.

Each marker data element 3440 corresponds to a navigation marker referenced by the navigation tool (e.g., navigation marker 720 described above in reference to FIG. 7). The marker data element 3440 may include various sub-elements 3445. These sub-elements may include a marker ID (e.g., "intro", "scene 1", etc.), marker attributes, marker status (e.g., "selected", "highlighted", "inactive", etc.), thumbnail image, location, and access date. In some embodiments, the thumbnail image may be stored externally to the project file and referenced by the marker data element 3440. In other embodiments, the thumbnail image may be stored in the project file. In addition, the marker data element includes a reference to a clip set data element 3450 in this example; however different types of locations (e.g., those described above in reference to FIG. 9) may be referenced in different embodiments. For instance, some embodiments may include a reference to a single clip, a reference to timeline in and out points, etc., depending on the type of navigable location used by the navigation tool. The access date sub-element may be used to generate the last in/first out stacks described above in reference to the navigation controls 1850 of FIG. 18.

The clip set data element 3450 includes several sub-elements 3455. In this example, the sub-elements include a clip set ID (e.g., "scene 1-take 1", "concert footage", etc.), clip set attributes, clip set status, access date and active version. The active version sub-element may be used to designate the currently-active version when more than one version is available for a project location. In addition, the clip set data element 3450 includes one or more references to a version data element 3460 in some embodiments.

The version data element 3460 includes various sub-elements 3465. The sub-elements in this example include a version ID (e.g., "scene 1-v1.1"), version attributes, version status (e.g., "modified since save", "checked-out", "available for check-in", etc.), access date, location, and references to clips. The access date may be used by some embodiments to generate the last in/first out stacks of the version management feature described above in reference to FIG. 27. The references to clips may include multiple clip references similar to clip references of the track data element 3410 and may reference clip data elements such as clip element 3420. In addition, the version data element of some embodiments includes one or more references to a collaborator data element 3470.

Each collaborator data element 3470 may include sub-elements such as a collaborator ID (e.g., "Ted", "Bill", etc.), collaborator attributes (e.g., "editor", "sound", "effects", etc.), collaborator status (e.g., "active", "former", etc.), and access permission. The collaborator data element 3470 may be used to implement feature such as those described above in reference to FIGS. 30-33.

One of ordinary skill in the art will recognize that project file 3400 is a conceptual representation only. Different embodiments may implement the data structures in various different ways. For instance, some embodiments may include various other elements in the project file (e.g., author name, project title, etc.). In addition, many of the example values are conceptual only and may be implemented in different ways in different embodiments. For instance, rather than a value such as "checked-out", a version status data element may include an alphanumeric string (or other data structure) that specifies the version status.

In addition, some embodiments may include different numbers of individual elements, different references and/or data in each element, and/or different structures. For instance, in some embodiments the navigation tool is implemented hierarchically, and thus a marker data element 3440 may reference a different navigation tool data element rather than a clip set data element (or other type of location data element). As another example, some embodiments may not include version data elements (i.e., some project files may not include version information). In such cases, the clip set data element 3450 (or other location data element) may refer directly to various clip data elements such as data element 3420 (or other elements as appropriate for the location type).

Furthermore, although various sub-elements are included in some data elements, these sub-elements may not always be populated with values or may not be populated with current values. For instance, the location sub-element of marker data element 3440 may depend on which version is of a location is active. In such a case, the clip set data element 3450 may be analyzed to determine the active version, the appropriate version data element 3465 may then be analyzed to determine the location of the active version (which may in turn depend on the clip references included in the version data element). At that point, the determined location may be populated through the other data elements (e.g., the clip set data element 3450 and marker data element 3440).

B. Software Block Diagram

Figure 35:
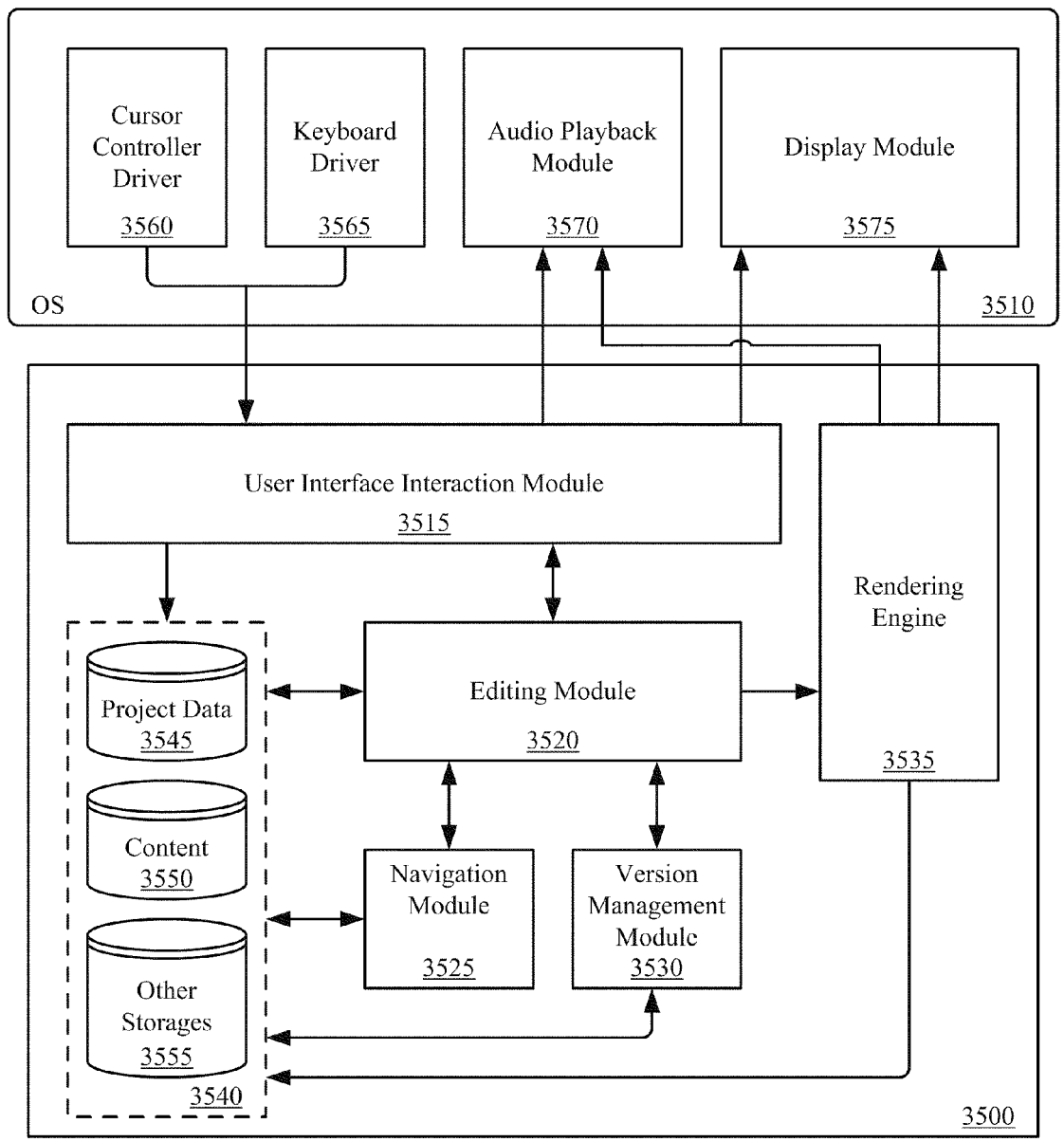
FIG. 35 conceptually illustrates the software architecture of the media editing application of some embodiments.

FIG. 35 conceptually illustrates the software architecture of an application 3500 of some embodiments for providing tools and features such as those described in the preceding sections. In some embodiments, the application is a stand-alone application or is integrated into another application (for instance, application 3500 might be a portion of a video-editing application), while in other embodiments the application might be implemented within an operating system. Furthermore, in some embodiments, the application is provided as part of a server-based (e.g., web-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

Media editing application 3500 includes a user interface interaction module 3515 for sending data to and receiving data from a user, an editing module 3520 for receiving and processing edits to a composite project, a navigation module 3525 for implementing the navigation tool of some embodiments, a version management module 3530 for implementing the version management features of some embodiments, a rendering engine 3535 used to generate image data and/or audio data for storage and/or playback, and a set of storages 3540 for storing data used by the application 3500. The set of storages 3540 includes storages for project data 3545, content data 3550, and other data 3555.

The operating system 3510 of some embodiments includes a cursor controller driver 3560 that allows the application 3500 to receive data from a cursor control device, a keyboard driver 3565 for that allows the application 3500 to receive data from a keyboard, an audio playback module 3570 for processing audio data that will be supplied to an audio device (e.g., a soundcard and speakers), and a display module 3575 for processing video data that will be supplied to a display device (e.g., a monitor).

A user interacts with items in the user interface of the media editing application 3500 via input devices (not shown) such as a cursor controller (e.g., a mouse, touchpad, trackpad, etc.) and/or keyboard. The input from these devices is processed by the cursor controller driver 3560 and/or the keyboard driver 3565, and passed to the user interface interaction module 3515. In addition, other embodiments may allow a user to interact with items in the user interface using other input devices (e.g., a microphone) that are processed by other drivers and/or software modules (e.g., a microphone driver and a voice-recognition module).

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, the present application describes the use of a cursor in the graphical user interface to control (e.g., select, move) objects in the graphical user interface. However, in some embodiments, objects in the graphical user interface can also be controlled or manipulated through other controls, such as touch control.

In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The user interface interaction module 3515 translates the data from the drivers 3560 and 3565 into the user's desired effect on the media editing application 3500. For example, when the user edits content in a display area of the media editing application, the user interface interaction module 3515 may translate these edits into instructions that are processed by the editing module 3520 in some embodiments. In other embodiments, the edits may be applied directly to project data 3545, or other data stored by the application 3500 in the set of storages 3540. An example of the user editing content is if the user trims a media clip in a display area of the media editing application 3500. The user interface interaction module 3515 also receives input data that is translated as instructions to preview visual content in a preview display area (for example, if a user clicks a play control while editing a media project).

Editing module 3520 of some embodiments processes edit instructions received from the user interface interaction module 3515 and data retrieved from the set of data storages 3540. Editing module 3520 may also create and/or update data stored within the set of data storages 3540 based on received instructions that affect the project data 3545, content 3550, or other stored data 3555. In addition, the editing module 3520 may send and/or receive instructions and/or data to and from the navigation module 3525 and/or version management module 3530 of some embodiments. Furthermore, the editing module 3520 may also send data and/or instructions to the rendering engine 3535 of some embodiments.

In some embodiments, the editing module 3520 may include various sub-modules. For instance, some embodiments may include a composite display area control module as a sub-module of the editing module 3520. Such a sub-module processes instructions received through the user interface interaction module 3515 and data retrieved from the set of data storages 3540. The composite display area control module may perform, for example, some or all of the operations of processes 1500, 1900, and/or 2600 in some embodiments. In addition, the composite display area control module may operate in conjunction with other modules (e.g., performing process 1500 in conjunction with the user interface interaction module 3515, performing process 1900 in conjunction with the editing module 3520, etc.).

The navigation module 3525 of some embodiments processes navigation instructions received through the editing module 3520. The navigation module also accesses and/or generates data (e.g., location data elements, access history data elements, navigation marker references, etc.) stored within the set of storages 3540. The navigation module 3525 may perform, for example, some or all of the operations of processes 1000, 1400, 1500, 1700, and/or 1900 in some embodiments. In addition, the navigation module may operate in conjunction with other modules (e.g., performing process 1400 in conjunction with the user interface interaction module 3515, performing process 1900 in conjunction with the editing module 3520, etc.).

The version management module 3530 of some embodiments processes versioning and/or collaboration instructions received through the editing module 3520. The version management module may also access and/or generate data (e.g., clip set data elements 3450, version data elements 3460, collaborator data elements 3470, etc.) stored within the set of storages 3540. The version management module 3530 may perform, for example, some or all of the operations of processes 2200, 2800, 3000, and/or 3200 in some embodiments. In addition, the version management module may operate in conjunction with other modules (e.g., performing processes 2200, 2800, 3000, and/or 3200 in conjunction with the navigation module 3525, etc.).

Rendering engine 3535 enables the storage or output of audio and video from the media editing application 3500. For example, rendering engine 3535 uses data about media objects in a video scene to render the video scene from the particular location, direction, etc. defined by a camera object. As such, the rendering engine receives, in some embodiments, data from the editing module 3520 so that a preview can be displayed. Data from the rendering engine 3535 (e.g., audio and video data of a video scene, preview data, etc.) is passed to the display module 3575 and/or the audio playback module 3570. The audio playback module enables audio playback from the media editing application 3500 on an audio device (e.g., a set of speakers or headphones). Display module 3575 enables the display of the media editing application 3500 on a display device (e.g., a CRT monitor, LCD screen, etc.). Alternatively, data may be passed from the rendering engine 3535 to the set of storages 3540 for later playback.

Although the application 3500 and its features have been described using several specific embodiments, other embodiments might implement the application or its features using different resources or by placing the various modules in different specific locations. For instance, while many of the features have been described as being performed by one module (e.g., the UI interaction module 3515 or navigation module 3525), one of ordinary skill in the art would recognize that a particular operation might be performed using multiple modules. In addition, although various specific communication pathways have been described (e.g., navigation module 3525 and version management module 3530 receiving instructions from the editing module 3520), one of ordinary skill in the art will recognize that various other pathways could be used (e.g., the navigation and version management modules receiving instructions directly from the user interface interaction module). Furthermore, the application 3500 may include various other modules than those shown (e.g., a collaboration module for managing collaboration among users).

One of ordinary skill in the art will recognize that the conceptual descriptions provided above in reference to FIGS. 34-35 may be implemented using different embodiments without departing from the spirit of the invention. For instance, the various storage modules 3545-3555 described above in reference to FIG. 35 may be implemented as a single storage element, where the various storage modules all exist at the same physical location, and are differentiated using some appropriate method. As another example, various storage modules 3545-3555 may be located externally to the application 3500 and accessed through a communication pathway (e.g., a bus). Section V below describes a process of some embodiments for defining and storing the software modules described above. Section VI then describes a computer system used by some embodiments to implement the various software modules and structures described above.

V. Process for Defining a Media Editing Application

Figure 36:
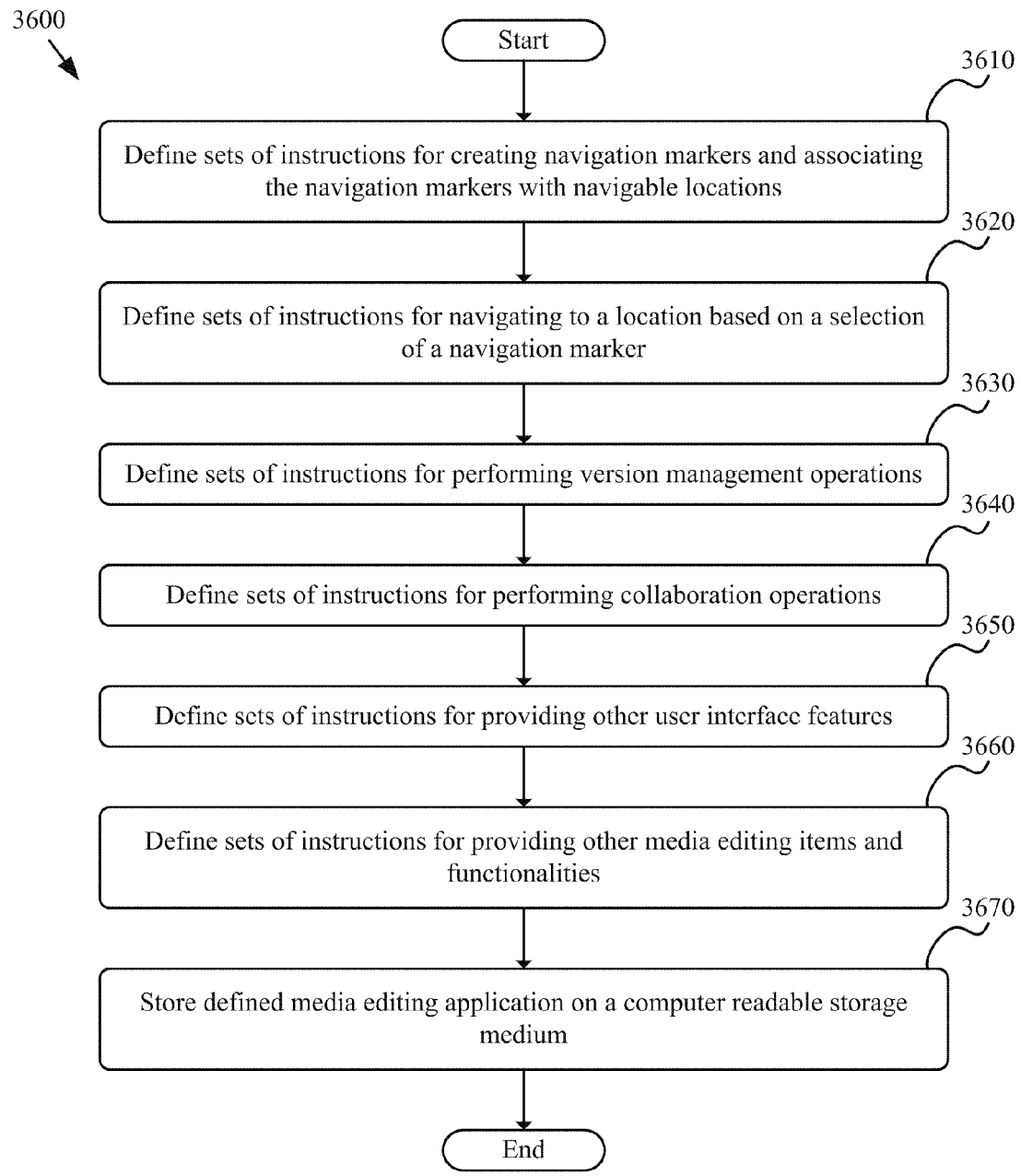
FIG. 36 conceptually illustrates a process used by some embodiments to define a media-editing application.

FIG. 36 conceptually illustrates a process 3600 of some embodiments for defining and storing a media-editing application of some embodiments, such as application 3500. Specifically, process 3600 illustrates the operations used to define sets of instructions for providing several of the elements shown in GUI 600 and performing various navigation, clip insertion, version management, and collaboration operations described above.

As shown, process 3600 begins by defining (at 3610) sets of instructions for creating (or instantiating) navigation markers (e.g., markers 720 described above in reference to FIG. 7) and associating the navigation markers with navigable locations (e.g., navigable locations 960-992 described above in reference to FIG. 9) of a media editing project. In some cases such sets of instructions are defined in terms of object-oriented programming code. For example, some embodiments may include sets of instructions for defining classes and instantiating various objects at runtime based on the defined classes. The process then defines (at 3620) sets of instructions for navigating to a location based on a selection of a navigation marker (e.g., as described above in reference to FIG. 15).

Next, the process defines (at 3630) sets of instructions for performing version management operations (e.g., the operations described above in reference to FIGS. 22-29). The process then defines (at 3640) sets of instructions for performing collaboration operations (e.g., the operations described above in reference to FIGS. 30-33).

The process then defines (at 3650) sets of instructions for providing various other user interface features for invoking and/or utilizing the navigation tool, clip insertion feature, version management feature, and/or collaboration feature. These user interface features may include items such as pop-up or drop-down menus (e.g., menu 1870, menu 1170, etc.), and/or other items (e.g., version display area 2510, section boundary indicators 2430-2440, buffer areas 2450-2460, etc.).

Next, process 3600 defines (at 3660) sets of instructions for providing other media editing items and functionalities. Examples of such editing items may include zoom, color enhancement, blemish removal, audio mixing, etc. In addition, various other media editing functionalities may be defined. Such functionalities may include library functions, format conversion functions, etc. The process defines these additional tools in order to create a media editing application that has many additional features to the features described above.

The process then stores (at 3670) the defined media editing application (i.e., the various sets of instructions) on a computer readable storage medium. In some embodiments, the medium is one or more of a solid-state device, a hard disk, a CD-ROM, or other non-volatile computer readable storage medium.

One of ordinary skill in the art will recognize that the various sets of instructions defined by process 3600 are not exhaustive of the sets of instructions that could be defined and stored on a computer readable storage medium for a media editing application incorporating some embodiments of the invention. In addition, the process 3600 is a conceptual process, and the actual implementations may vary. For example, different embodiments may define the various sets of instructions in a different order, may define several sets of instructions in one operation, may decompose the definition of a single set of instructions into multiple operations, etc. In addition, the process 3600 may be implemented as several sub-processes or combined with other operations within a macro-process.

VI. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 37:
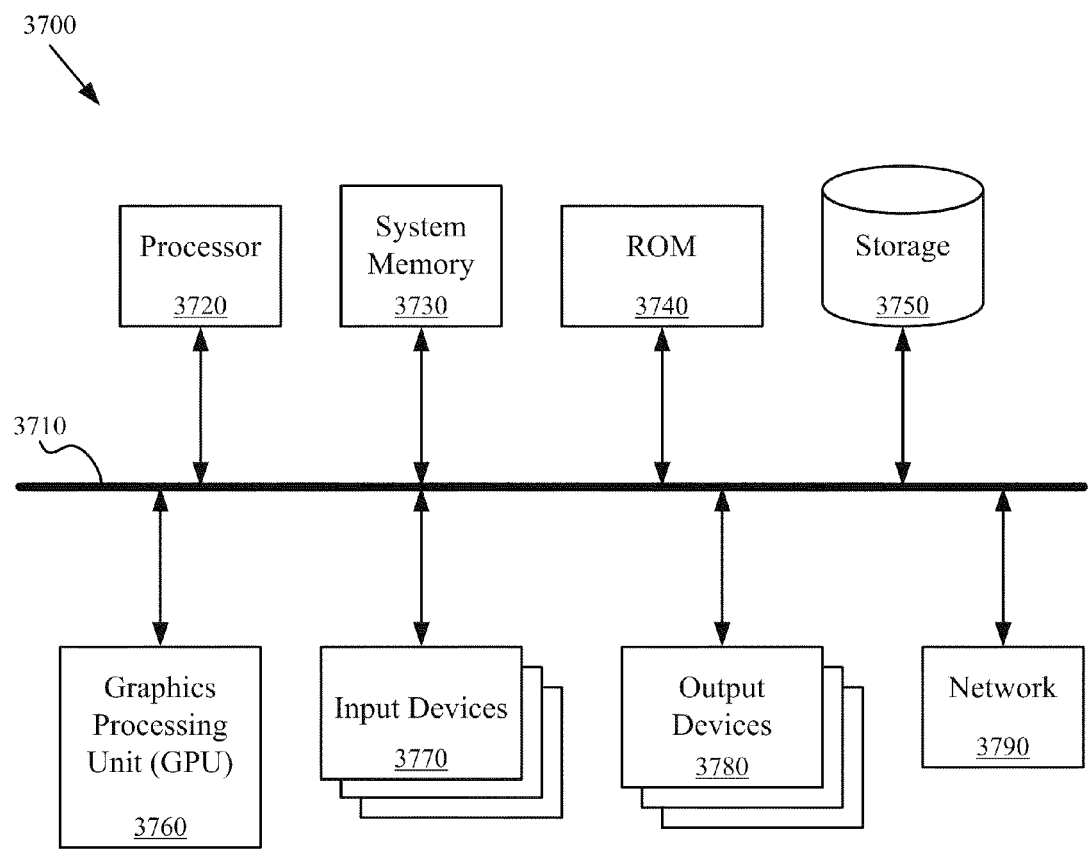
FIG. 37 illustrates a computer system with which some embodiments of the invention are implemented.

FIG. 37 conceptually illustrates a computer system 3700 with which some embodiments of the invention are implemented. For example, the system described above in reference to FIG. 35 may be at least partially implemented using sets of instructions that are run on the computer system 3700. As another example, the processes described in reference to FIGS. 10, 14-15, 17, 19, 22, 26, 28, 30, and 32 may be at least partially implemented using sets of instructions that are run on the computer system 3700.

Such a computer system includes various types of computer readable mediums and interfaces for various other types of computer readable mediums. Computer system 3700 includes a bus 3710, at least one processing unit (e.g., a processor) 3720, a system memory 3730, a read-only memory (ROM) 3740, a permanent storage device 3750, a graphics processing unit ("GPU") 3760, input devices 3770, output devices 3780, and a network connection 3790. The components of the computer system 3700 are electronic devices that automatically perform operations based on digital and/or analog input signals. The various examples of user interfaces shown in FIGS. 6-8, 11-13, 16, 18, 20-21, 23-25, 27, 31, and 33 may be at least partially implemented using sets of instructions that are run on the computer system 3700 and displayed using the output devices 3780.

One of ordinary skill in the art will recognize that the computer system 3700 may be embodied in other specific forms without deviating from the spirit of the invention. For instance, the computer system may be implemented using various specific devices either alone or in combination. For example, a local PC may include the input devices 3770 and output devices 3780, while a remote PC may include the other devices 3710-3760, with the local PC connected to the remote PC through a network that the local PC accesses through its network connection 3790 (where the remote PC is also connected to the network through a network connection).

The bus 3710 collectively represents all system, peripheral, and chipset buses that communicatively connect the numerous internal devices of the computer system 3700. In some cases, the bus 3710 may include wireless and/or optical communication pathways in addition to or in place of wired connections. For example, the input devices 3770 and/or output devices 3780 may be coupled to the system 3700 using a wireless local area network (W-LAN) connection, Bluetooth®, or some other wireless connection protocol or system.

The bus 3710 communicatively connects, for example, the processor 3720 with the system memory 3730, the ROM 3740, and the permanent storage device 3750. From these various memory units, the processor 3720 retrieves instructions to execute and data to process in order to execute the processes of some embodiments. In some embodiments the processor includes an FPGA, an ASIC, or various other electronic components for execution instructions.

The ROM 3740 stores static data and instructions that are needed by the processor 3720 and other modules of the computer system. The permanent storage device 3750, on the other hand, is a read-and-write memory device. This device is a non-volatile memory unit that stores instructions and data even when the computer system 3700 is off. Some embodiments of the invention use a mass-storage device (such as a magnetic or optical disk and its corresponding disk drive) as the permanent storage device 3750.

Other embodiments use a removable storage device (such as a floppy disk, flash drive, or CD-ROM) as the permanent storage device. Like the permanent storage device 3750, the system memory 3730 is a read-and-write memory device. However, unlike storage device 3750, the system memory 3730 is a volatile read-and-write memory, such as a random access memory (RAM). The system memory stores some of the instructions and data that the processor needs at runtime. In some embodiments, the sets of instructions and/or data used to implement the invention's processes are stored in the system memory 3730, the permanent storage device 3750, and/or the read-only memory 3740. For example, the various memory units include instructions for processing multimedia items in accordance with some embodiments.

In addition, the bus 3710 connects to the GPU 3760. The GPU of some embodiments performs various graphics processing functions. These functions may include display functions, rendering, compositing, and/or other functions related to the processing or display of graphical data.

The bus 3710 also connects to the input devices 3770 and output devices 3780. The input devices 3770 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 3780 include printers, electronic display devices that display still or moving images, and electronic audio devices that play audio generated by the computer system. For instance, these display devices may display a GUI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 37, bus 3710 also couples computer 3700 to a network 3790 through a network adapter (not shown). In this manner, the computer can be a part of a network of computers (such as a local area network ("LAN"), a wide area network ("WAN"), an Intranet, or a network of networks, such as the Internet. For example, the computer 3700 may be coupled to a web server (network 3790) so that a web browser executing on the computer 3700 can interact with the web server as a user interacts with a GUI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer.

These terms exclude any wireless signals, wired download signals, and/or any other ephemeral signals.

It should be recognized by one of ordinary skill in the art that any or all of the components of computer system 3700 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., the navigation tool, the version display area). However, one of ordinary skill in the art will realize that other embodiments might be implemented with other types of media editing applications with other types of features and components (e.g., other types of version display areas).

Moreover, while the examples shown illustrate many individual modules as separate blocks (e.g., the navigation module 3525, the version management module 3530, etc.), one of ordinary skill in the art would recognize that some embodiments may combine these modules into a single functional block or element. One of ordinary skill in the art would also recognize that some embodiments may divide a particular module into multiple modules. One of ordinary skill in the art would understand that the invention is not to be limited by the foregoing illustrative details, but rather is to be defined by the appended claims.

The invention claimed is:

1. A non-transitory machine readable medium storing a media editing application for execution by at least one processing unit, said application comprising a graphical user interface (GUI), said GUI comprising:
   a composite display area for displaying graphical representations of a plurality of media clips that are part of a plurality of sections of a composite media presentation that the application creates by compositing the plurality of media clips;
   a plurality of selectable navigation markers associated with the plurality of sections of the composite media presentation, wherein a first section comprises only one media clip and a second section comprises at least two media clips, wherein a selection of a navigation marker causes the composite display area to present the section of the composite presentation that is associated with the selected navigation marker; and
   a plurality of version indicators, each particular different version indicator displayed with a particular navigation marker that is associated with a particular different section of the composite media presentation for which one or more versions have been saved, each particular different version indicator for i) indicating whether the particular section has been modified, ii) providing an option to create a new version of the particular section, and iii) providing access to previously-saved versions of the particular section, wherein a first version of the second section comprises a first set of media clips to replace the two media clips, and a second version of the second section comprises a second, different set of media clips to replace the two media clips.

2. The non-transitory machine readable medium of claim 1, wherein the GUI further comprises a collaboration tool for (i) receiving input that specifies a collaborator of the composite media presentation and (ii) sending a particular version of the particular section to the collaborator of the composite media presentation.

3. The non-transitory machine readable medium of claim 2, wherein the collaboration tool is further for receiving the particular version of the particular section from the collaborator.

4. The non-transitory machine readable medium of claim 3, wherein the collaboration tool is further for (i) locking the particular section when the particular version is sent to the collaborator and (ii) unlocking the particular section when the particular version is received from the collaborator.

5. The non-transitory machine readable medium of claim 1, wherein the GUI further comprises:
   a version creation tool for creating a new version, wherein the option provided by the particular version indicator to create the new version is exercised through the version creation tool; and
   a version access tool for accessing previously-saved versions of a modified section, wherein the particular version indicator provides access to the previously-saved versions of the modified section through the version access tool.

6. The non-transitory machine readable medium of claim 1, wherein each version indicator that is associated with a modified section is graphically displayed in proximity of the selectable navigation marker corresponding to the modified section.

7. A method for providing a media-editing application for creating a multimedia presentation, the method comprising:
   providing a composite display area for displaying graphical representations of a plurality of media clips that are part of a plurality of different sections of a composite media presentation;
   providing a plurality of selectable navigation markers associated with the plurality of sections of the composite media presentation, wherein a selection of a navigation marker associated with a particular section causes the display of the media clips in the particular section within the composite display area; and
   providing a version management tool that comprises a separate selectable item for each navigation marker that is associated with a different section of the composite media presentation for which one or more versions have been saved, each selectable item for providing access to previously-saved versions of the corresponding different section of the composite media presentation,
   wherein a first section comprises one media clip and a second section comprises two media clips,
   wherein a first version of the second section comprises a first set of media clips to replace the two media clips, and a second version of the second section comprises a second, different set of media clips to replace the two media clips.

8. The method of claim 7, wherein each selectable item of the version management tool is further for:
   indicating whether the corresponding particular section has been modified; and
   providing an option to create a new version of the corresponding particular section.

9. The method of claim 8, wherein any modified version of the particular section is automatically saved as a temporary version.

10. The method of claim 7, wherein the graphical representations of the media clips in the composite display area span along a timeline and the different sections are associated with different positions along the timeline.

11. The method of claim 7 further comprising providing a collaboration tool for (i) receiving input that specifies a collaborator of the composite media presentation, (ii) sending a particular version of a section to the collaborator of the composite media presentation, and (iii) receiving the particular version of the section from the collaborator.

12. The method of claim 11, wherein the collaboration tool is further for (i) locking the section when the particular version is sent to the collaborator and (ii) unlocking the section when the particular version is received from the collaborator.

13. A non-transitory computer readable medium storing a computer program for execution by at least one processing unit, the computer program comprising sets of instructions for:
displaying a plurality of graphical representations of media clips along a timeline for a composite media presentation in a composite display area of a media-editing application;
displaying a plurality of selectable navigation markers associated with a plurality of navigable sections in the composite media presentation, each navigation marker associated with at least one version of a navigable section, wherein at least one of the sections comprises multiple media clips of the composite media presentation;
receiving a first user input to select a particular navigation marker, wherein the selection of the particular navigation marker with the first user input causes the display within the composite display area to scroll to a position along the timeline associated with the navigable section and the display of the media clips of a current version of the section in the composite display area; and
receiving a second user input to select the particular navigation marker, wherein the selection of the particular navigation marker with the second user input causes a version management feature to present a list of previously saved versions of the section associated with the particular navigation marker.

14. The non-transitory computer readable medium of claim 13, wherein the computer program further comprises sets of instructions for:
receiving a user input to select a particular version from the list of previously-saved versions; and
displaying the media clips of the particular previously-saved version of the section in the composite display area.

15. The non-transitory computer readable medium of claim 13, wherein the computer program further comprises a set of instructions for displaying a collaboration tool for (i) receiving an input that specifies a collaborator of the composite media presentation and (ii) sending a particular version of a section to the collaborator of the composite media presentation.

16. The non-transitory computer readable medium of claim 15, wherein the collaboration tool is further for receiving the particular version of the section from the collaborator.

17. The non-transitory computer readable medium of claim 16, wherein the computer program further comprises a set of instructions for displaying the collaboration tool when the particular version is received from the collaborator.

18. The non-transitory machine readable medium of claim 15, wherein the collaboration tool is further for (i) locking the section when the particular version is sent to the collaborator and (ii) unlocking the section when the particular version is received from the collaborator.

19. The non-transitory machine readable medium of claim 13, wherein the computer program further comprises a set of instructions for providing a version creation tool for saving new versions of different sections.

20. The non-transitory machine readable medium of claim 19, wherein the computer program further comprises a set of instructions for providing a version access tool for accessing the previously-saved versions of the different sections.

21. The non-transitory machine readable medium of claim 13, wherein the program further comprises a set of instructions for displaying an indication of whether a particular section has been modified.

22. A method for providing a media-editing application for creating composite presentations, the method comprising:
displaying a plurality of graphical representations of media clips along a timeline for a composite media presentation in a composite display area of a media-editing application;
displaying a plurality of selectable navigation markers associated with a plurality of navigable sections in the composite media presentation, each navigation marker associated with at least one version of a navigable section, wherein at least one of the sections comprises multiple media clips of the composite media presentation;
receiving a first user input to select a particular navigation marker, wherein the selection of the particular navigation marker with the first user input causes the display within the composite display area to scroll to a position along the timeline associated with the navigable section and the display of the media clips of a current version of the section in the composite display area; and
receiving a second user input to select the particular navigation marker, wherein the selection of the particular navigation marker with the second user input causes a version management feature to present a list of previously saved versions of the section associated with the particular navigation marker.

23. The method of claim 22 further comprising:
receiving a user input to select a particular version from the list of previously-saved versions; and
displaying the media clips of the particular previously-saved version of the section in the composite display area.

24. The method of claim 22 further comprising displaying a collaboration tool for (i) receiving an input that specifies a collaborator of the composite media presentation and (ii) sending a particular version of a section to the collaborator of the composite media presentation.

25. The method of claim 24, wherein the collaboration tool is further for receiving the particular version of the section from the collaborator.

26. The method of claim 25, wherein the computer program further comprises a set of instructions for displaying the collaboration tool when the particular version is received from the collaborator.

27. The method of claim 24, wherein the collaboration tool is further for (i) locking the section when the particular version is sent to the collaborator and (ii) unlocking the section when the particular version is received from the collaborator.

28. The method of claim 22 further comprising:
providing a version creation tool for saving new versions of different sections; and
providing a version access tool for accessing the previously-saved versions of the different sections.

29. The method of claim 22 further comprising displaying an indication of whether a particular section has been modified.

* * * * *